United States Patent [19]
Cohen et al.

[11] Patent Number: 5,359,712
[45] Date of Patent: Oct. 25, 1994

[54] METHOD AND APPARATUS FOR TRANSITIONING BETWEEN SEQUENCES OF DIGITAL INFORMATION

[75] Inventors: Jonathan R. Cohen, San Francisco; Michael Mills, Cupertino, both of Calif.

[73] Assignee: Apple Computer, Inc., Cupertino, Calif.

[21] Appl. No.: 839,620

[22] Filed: Feb. 21, 1992

Related U.S. Application Data

[63] Continuation-in-part of Ser. No. 696,353, May 6, 1991.

[51] Int. Cl.$^5$ .............................................. G06F 15/20
[52] U.S. Cl. .................................................. 395/161
[58] Field of Search ............... 395/133, 155, 161, 135, 395/138; 345/121, 122; 358/185, 214, 215, 216

[56] References Cited

U.S. PATENT DOCUMENTS

| | | | |
|---|---|---|---|
| 4,538,188 | 8/1985 | Barker et al. | 360/14.3 |
| 4,715,008 | 12/1987 | Jones | 364/563 |
| 4,752,836 | 6/1988 | Blanton et al. | 358/342 |
| 4,789,962 | 12/1988 | Berry et al. | 364/900 |
| 4,890,249 | 12/1989 | Yen | 364/578 |
| 4,922,238 | 5/1990 | Aoki et al. | 340/726 |
| 4,933,881 | 6/1990 | Schmidt | 364/525 |
| 4,954,966 | 9/1990 | Mooney et al. | 364/518 |
| 4,970,666 | 11/1990 | Welsh et al. | 364/522 |
| 5,051,929 | 9/1991 | Tutt et al. | 364/521 |

FOREIGN PATENT DOCUMENTS

0390041A3  10/1990  European Pat. Off. ........ H04B 1/20

OTHER PUBLICATIONS

"The Alternate Reality Kit-An Animated Environment for Creating Interactive Simulations", Randall B. Smith, IEEE Proceedings of Workshop on Visual Languages Dallas, Tex. Jun. 25-27, 1986, pp. 99-106.

"Autodesk Animator Reference Manual", Autodesk, Inc., Publication No. TAN889R.1, Aug. 25, 1989, pp. 7, 265-266.

Primary Examiner—Phu K. Nguyen
Attorney, Agent, or Firm—Blakely, Sokoloff, Taylor & Zafman

[57] ABSTRACT

A method and apparatus for generating and observing a transition between a first and second sequence of information. The invention is practiced on a computer controlled display system and a computer controlled sound generation system. The method includes providing the first stream and the second stream of information to the computer system; creating a template for modifying an audio signal during a transition from the first stream of information to the second stream of information; specifying the duration of the transition and specifying at least a portion of the first stream and a portion of the second stream for the transition; creating an audio transition using the audio template for modifying an audio signal and using the portion of the first stream and the portion of second stream. Another aspect of the invention includes a method for controlling the rate of transistion from the first stream of digital information to the second stream of digital information which method includes: providing the first stream of information and second stream of information to the computer system; providing a rate transition template for specifying the rate of transition during the transistion; specifying the duration of the transistion and at least a portion of the first stream and the second stream for the transition; creating the transition using the rate template and the portions of the first and second streams, wherein the rate transition template includes a visual representation of the rate of transition over the duration of the transition.

18 Claims, 32 Drawing Sheets

COMBINED SIGNALS AT 3 EXEMPLARY POINTS OF TRANSITION $a_{total} = .8 Y_1 (a_1) + .2 Y_2 (a_2)$ $b_{total} = .3 Y_1 (b_1) + .7 Y_2 (b_2)$ $c_{total} = .1 Y_1 (c_1) + .9 Y_2 (c_2)$

FAST SLOW FAST

HOLDS AT 1/4

HOLDS AT 1/2

HOLDS AT 3/4

AUDIO TEMPLATE
FADE 1 DOWN AND 2 UP

METHOD AND APPARATUS FOR TRANSITIONING BETWEEN SEQUENCES OF DIGITAL INFORMATION

CROSS REFERENCE TO RELATED PATENT APPLICATIONS

This application is a continuation-in-part of patent application Ser. No. 07/696,353, filed on May 6, 1991 for "Method and Apparatus for Transitioning Between Sequences of Images" by Jonathan R. Cohen and Michael Mills.

BACKGROUND OF THE INVENTION

1. Field of the Invention

The present invention relates to the field of editing data of sequences of digital information, e.g. video or audio, in particular, the transition between a first source sequence of information to a second source sequence of information.

2. Description of the Related Art

It is well known in the art that a static image, e.g. a photograph, can be converted into a digital representation of the static image. Similarly, it is well known in the art to convert dynamic images, e.g., video images, into a digital representation. Typically, in the digital representation on, for example, a computer system, the video image is captured as a sequence of static images. Each static image captures an instant in time of the video image. Movement is apparent to the viewer by the rapid display of the sequence of static images.

It is often the case where a first collection of images is contiguously merged with or transitioned into, a second collection of images. The mechanics of such a merging or transitioning of video images is described in more detail below in conjunction with specifically designed devices which perform this function. Common techniques known in the art that are used for creating a transition from one video image to a second video image are called "switches". Such "switches" include cuts, wipes, irises, fades and pushes. It should be noted that switching is used in the context of live television broadcasts; where, for example, during a newscast, when a switch is made from a newsperson reporting the weather to a newsperson reporting sports.

As described above, a video image in its digital representation is typically a sequence of static images. It is these sequences of static images which are combined to create a transition. A cut switch is illustrated in FIG. 1a. A first sequence of images is represented by 101 and a second sequence of images is represented by 102. A cut switch results in the sequence of images represented by 103. The sequence of images 103 is what a viewer of the images would see. Here, the sequence of images represented by 101 are sequentially contiguous with the sequence of images represented by 102. In a cut switch there is no overlapping of the two sequences of images. The transition effect is to abruptly change from a scene in the first sequence of images to a scene in the second sequence of images.

A wipe switch is illustrated in FIG. 1b. Here, the second sequence of images 102 overlays the first sequence of images 101, creating an overlay sequence of images represented by 105. The amount of overlap will increase over time, creating a gradual transition effect from the first sequence of images 101 to the second sequence of images 102. The transition effect is to wipe the images of the first sequence with the images of the second sequence. It is known in the art that the wipe switch may come from any direction, e.g. left to right, right to left, top to bottom or bottom to top.

An iris switch is illustrated in FIG. 1c. Here the first sequence of images 101 is seemingly taken over by the second sequence of images 102. The iris is used in the optical sense, as an opening up to obtain more light. In the sequence of images represented by 107, the second sequence of images 102 is displayed in the middle of the first sequence of images 101, illustrated as 108. Over time, the portion displaying the second sequence of images 102 expands until only the second sequence of images is displayed. The transition effect is the opening of an iris to display the second sequence of images. The initial opening of the iris switch may originate from any point on the display of the images.

A push switch is illustrated in FIG. 1d. Here the first sequence of images 101 is pushed out of view by the second sequence of images 102. In this example, the right most portion of the second sequence of images 102 appears to be pushing the left most portion of the first sequence of images 101, as illustrated in the sequence represented by 109. This occurs over time until the second sequence of images 102 is fully displayed. The transition effect is of the second sequence of images physically pushing the first sequence of images out of view (or off the screen). However, the push direction may alternatively be right to left, top to bottom or bottom to top.

A fade switch is illustrated in FIG 1e. Here, the first sequence of images 101 gradually fades to a predetermined color, e.g. black. As illustrated in the sequence represented by 120, a first static image 111 which is gray, is followed by an image 112 which is black. The sequence of images 110 will then continue with a gray image 113 until the second sequence of images 102 is displayed. The transition effect is to fade the first sequence of images to a predetermined color and then to immediately fade from the predetermined color to the second sequence of images.

A dissolve switch (not illustrated) is conceptually identical to a fade switch, except that the first sequence of images transitions directly into the second sequence of images rather than to an intermediate predetermined color.

Means for creating a transition effect or switch are known in the art. Such means include individually creating the static images for the switch from which the first and second image sequences are combined, and interpolation. Interpolation refers to creating a begin and end state for a transition and utilizing a processing means to determine the transition states in between. Known tools for creating a switch or transition effect that exist in the art are limited in that they perform only a specific effect or a set of pre-defined effects. Since the sequence of images is in a digital representation it would be useful to use a general purpose computer system to manipulate the data to create a transition between the sequence of images.

A step in this direction is found in a commercially available product known as the Video Toaster, manufactured and sold by NewTek, Inc. of Topeka Kans. The Video Toaster includes specifically designed video graphics chips and is designed to be used with a computer system known as the AMIGA System, available from Commodore Business Machines, Inc., of Westchester, Pa. The Video Toaster provides predefined switches, fading and other video editing capabilities. Additionally, the Video Toaster requires the use of at least two display devices. A first display device provides for a user interface to the video editing tools, while a second display device displays the program image.

The Video Toaster provides a user interface that is typical for switching devices. A user interface is the means by which a user interacts with a computer system or other device. Such a typical user interface for switching devices is as illustrated in FIG. 2. A first row of identifiers 201 provides for selection of a first input source, typically called a program source, a second row of identifiers 202 provides for selection of a second input source typically called a preview source, a manual T-Bar switcher 203 provides for switching from a-program source to a preview source and a take button 204, provides for initiating a pre-defined switch. The identifiers in row 201 and 202 are typically push buttons which illuminate when that source is selected. In FIG. 2, the button 205 representing program source 2 and the button 206 representing the preview source 4 are illuminated and thus selected. The buttons which are selected determine the sequence of images which will include a switch.

The video source represented by each of the identifiers are from independent video sources, e.g. a camera or VCR. Additionally, there may be a dedicated monitor for displaying the program source. The source itself would generally be viewable via a display such as a television or monitor. So in reference to FIG. 2 a source may be either a program or preview source. During a switch, the program source will transition to the preview source. A user may verify the switch in two ways. First, the monitor displaying the program source would now be displaying the new program (previously the preview) source. Additionally, the identifier representing the new program source would be illuminated (and the previous program source would not). In the interface the identifier representing the program source and the preview source, will be illuminated.

A cut switch as described above may be performed by depressing a button in the program row of the desired program source. A fade switch will occur by using the T-Bar switcher 203. This may typically happen by pulling the handle of the T-Bar switcher downward. In this way, the speed of the fade may be controlled. In some switch devices the switch itself defines the manner in which the switch will occur. With the aforementioned Video Toaster, the switch type may be chosen from a plurality of icons presented to the user. The user would typically position the cursor over the desired icon with a cursor control device, such as a mouse or track-ball, and click on the icon. Clicking refers to rapidly depressing and releasing a button (i.e. an electrical switch) associated with the cursor control device. By depressing the take or auto button, the switch would take place according to the selected switch effect.

The video switch interface described above is known to those skilled in the art of video switching. However, it is believed that this video switching interface is not well known to the average computer system user. As the use of video in computer systems is increasingly being used to convey information, a higher number of people will be required to perform video editing like functions. It would be desirable to provide a user interface to such a video switching system that is consistent with known user interfaces, e.g. the Macintosh ® interface, of the Macintosh family of computers (available from Apple Computer, Inc. of Cupertino, Calif.).

Further, a user of the Video Toaster and other known switching devices selects a transition effect by choosing a static icon representing the effect. It would be beneficial to provide a system where a transition effect can be chosen by a user in a What You See Is What You Get (WYSIWYG) fashion. WYSIWYG is a term that refers to a user interface. A WYSIWYG user interface allows for a user to visually see the effect of a performed operation. This allows the user to make more informed choices about alternative video effects. Although a static icon is useful when representing application software or a data file, it does not provide the user with the dynamic visualization needed to truly determine what the effect will be. WYSIWYG in this context also refers to the capability to view both the first source sequence of images and the second source sequence of images on the same display.

It is also significant that in the known prior art, no means are provided for a user to create a switch. The user is limited to the types of switches that are provided where each switch displays predetermined sequences of images which are displayed by selecting a particular button, such as button 205 or 206. As described above, the use of video in computer systems is emerging as a means of providing information. Thus, it is beneficial to the creator of that information to have the means to customize a switch to meet their particular needs.

The prior art methods for creating transitions typically do not include provisions for controlling the rate of transition during the transition in a manner which is intuitive and user friendly. This lack of control makes it difficult to reliably alter the rate of a transition during the actual transition (rather than the overall duration of the transition) and thus the rate of the transition is typically a steady rate which cannot be modified. Moreover, prior art systems for transitioning between sequences do not include a template for specifying the rate of transition and do not include a resource in the form of a rate transition template for specifying the rate of transition during a transition. Prior art systems also do not include audio templates for specifying the manner in which the audio signals from two movies or other streams of digital information containing audio information are combined in a transition.

It is an object of the present invention to provide a system where the rate of transition during a transition is controlled by a means which is user definable and is easily understandable by the user and thus facilitates manipulation of the rate of transition during a transition period. Moreover, it an object of the present invention to provide a system where the transition of audio information between two streams/sequences of digital information is controlled by an audio template which provides a means for user definition and tailoring of the audio transition effect.

It is an object of the present invention to provide a system where transition effects are presented in a WYSIWYG fashion and that provides a means for user definition and tailoring of a transition effect.

SUMMARY OF THE INVENTION

The present invention is practiced in a computer controlled display system and involves a method and apparatus for transitioning between two sequences of digital information which are typically stored in a computer system, such as in RAM, ROM or on mass storage, e.g. hard disk. The method involves a process for user definition and manipulation of a transition resource for defining the transition between one audio stream of information and another audio stream of information. The method also involves a process for user definition and manipulation of a rate of transition control means which specifies the rate of transition during the transition between the first sequence of information and the second sequence of information.

In general, the method of the invention involves several steps in transitioning from a first stream of digital audio information to a second stream of digital audio information, and these steps include: providing the first stream and the second stream to the computer system; creating a means for modifying an audio signal during the transition between the first stream and the second stream, such means typically being an audio template which specifies an envelope through which the audio signal is processed to provide a modification of the audio signal; specifying the duration of the transition and the portions of the first and second streams which will be combined during the transition; creating an audio transition using the means for modifying an audio signal and the portions of the first and second streams which were designated for combination; and finally combining the transition (which combines the portions designated for combination in the first stream and the second stream) with the remainder of the first stream and the second stream. In a typical embodiment, the end of the first stream and the beginning of the second stream are designated as the portions to be used for the transition such that the beginning part of the first stream of information plays first and then the transition occurs and finally the ending part of the second stream of audio information is played back. Of course, it will be appreciated that the method includes the possibility of playing only the transition or alternatively combining the transition information with only the first stream or the second stream. In a typical embodiment of the present invention, several audio templates are provided along with a visual representation of each audio template which indicates to the user of the computer system the manner in which the audio signals will be combined between the first stream and the second stream.

The present invention is practiced in a computer controlled display system for creating an audio transition between a first stream of audio information and a second stream of digital audio information. Of course, the invention may be used to combine a multi-track audio input, where more than two streams of audio information are present. This system includes a storage means for storing the first stream and the second stream as well as the storage means for storing transition information specifying how to combine at least a portion of the first stream and at least a portion of the second stream for the audio transition. The apparatus of the present invention further includes a processing means for combining the designated portions of the first and second stream according to the transition information stored in the computer system. It will be appreciated that the processing means is coupled to the storage means which contains the first and second digital audio information as well as the transition information. The system of the present invention further includes a sound generation means, such as a speaker and associated components, to produce the sounds of the combination of the portion of the first stream and the portion of the second stream which are designated for the transition.

The present invention also includes a method for controlling the rate of transition between a first sequence of digital information and a second sequence of digital information. Generally, this transition would occur between the first sequence and the second sequence although other possible locations of the transition exist. Accordingly to this method, the first sequence and the second sequence of digital information are provided to the computer system; a rate transition control means which specifies the rate of transition during the transition is stored in the computer system. This rate transition control means may comprise a graphical description of the rate transition during the transition and may further include a visual representation of the rate of transition which is displayed on the display system of the computer system. The visual representation will typically provide the user with information which is suggestive of how the rate of transition will be modified during the transition. The method of the present invention further includes the step of specifying the duration of the transition and specifying the portion of the first sequence and the portion of the second sequence which is used for the transition. The method also includes the step of creating the transition using the rate transition control means and the portions of the first and the second sequences such that a combination of those portions is made by the processing means of the computer system according to the rate transition control means and specifically the information specifying how the rate of transition changes during the transition. In one embodiment of the present invention, the rate transition control means provides information in a graphical manner which is used to map the current sample from the first stream of information and the current sample from the second stream of information to a corresponding location on a transition template which specifies how the transition will be made at that sample location.

DETAILED DESCRIPTION OF THE PREFERRED EMBODIMENT

Figure 1A:
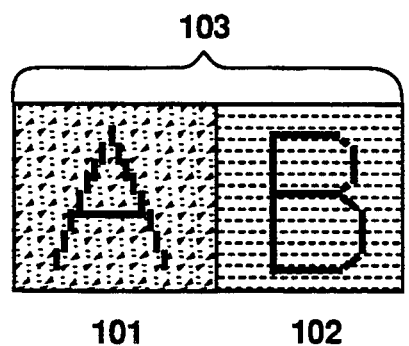
FIG. 1a illustrates prior art cut transition from a first sequence of images to a second sequence of images.
Figure 1B:
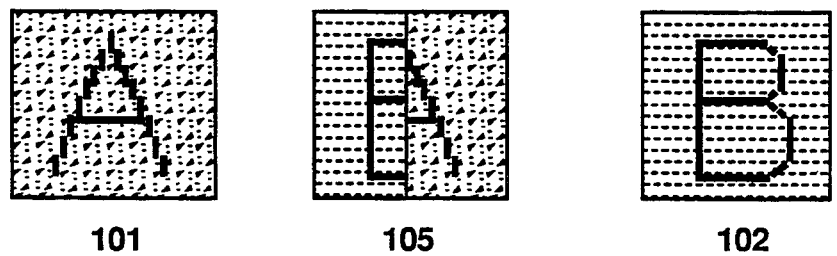
FIG. 1b illustrates prior art wipe transition from a first sequence of images to a second sequence of images.
Figure 1C:
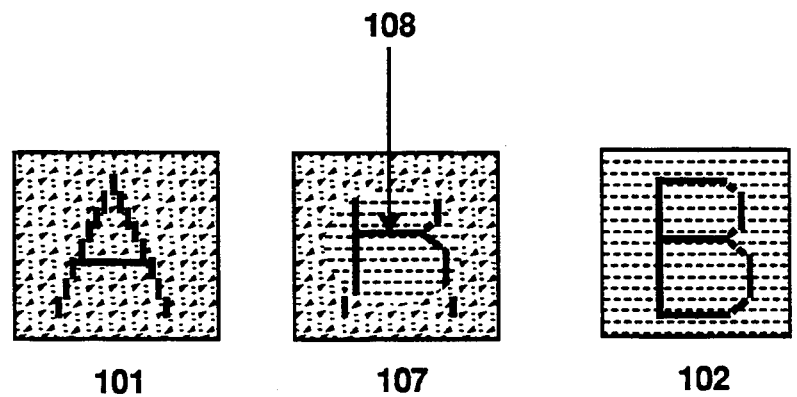
FIG. 1c illustrates prior art iris transition from a first sequence of images to a second sequence of images.
Figure 1D:
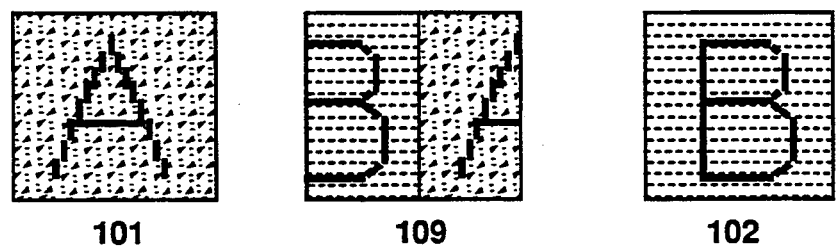
FIG. 1d illustrates prior art push transition from a first sequence of images to a second sequence of images.
Figure 1E:
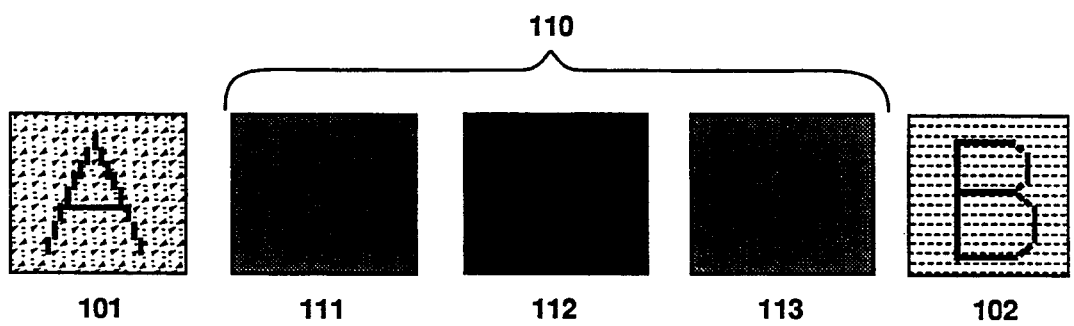
FIG. 1e illustrates prior art fade transition from a first sequence of images to a second sequence of images.
Figure 2:
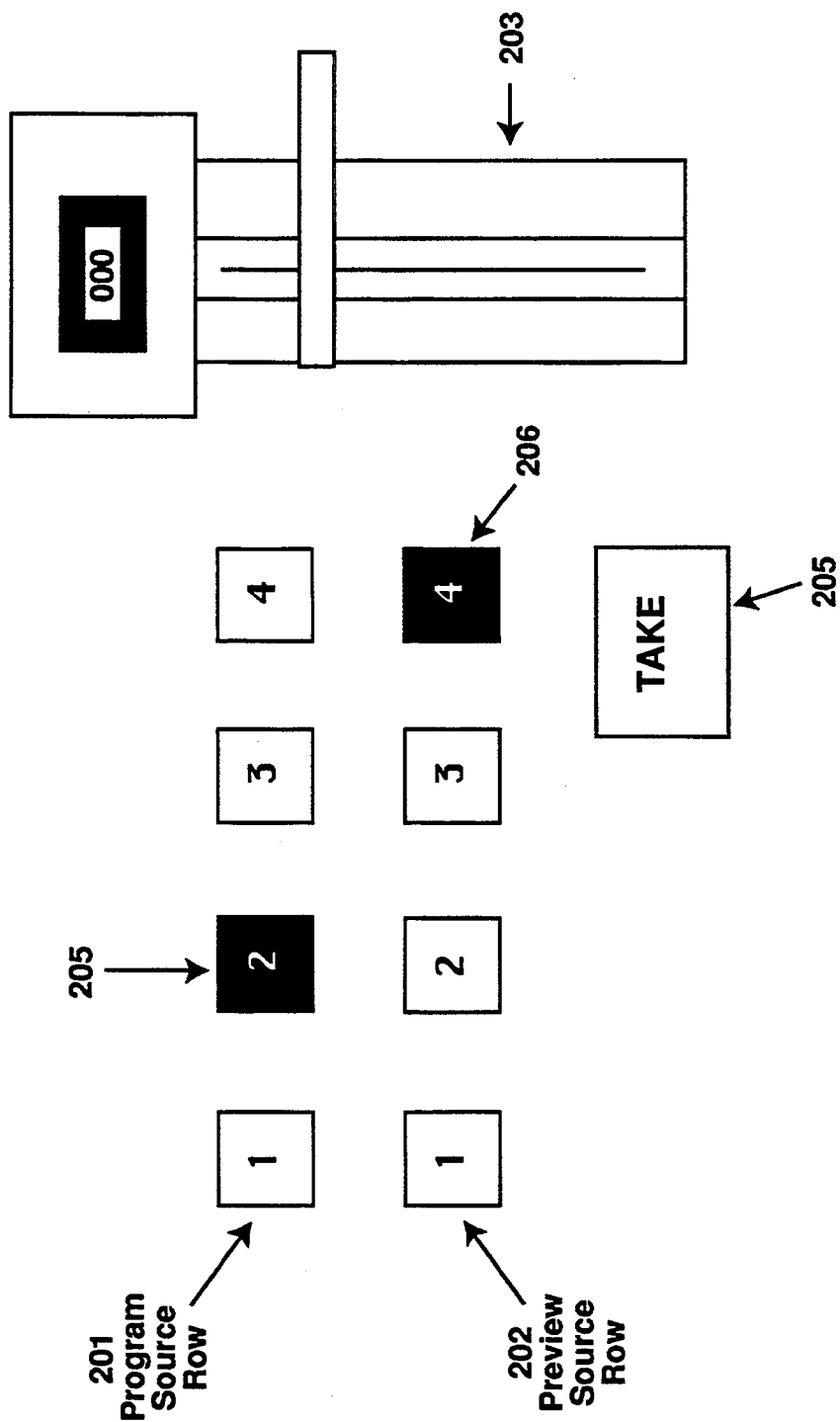
FIG. 2 illustrates a prior art user interface for a switching device.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

A method and apparatus for transitioning between two sequences of images stored in a computer system is described. In the following description, numerous specific details are set forth such as data structures and software code sections, in order to provide a thorough understanding of the present invention. It will be apparent, however, to one skilled in the art that the present invention may be practiced without these specific details. In other instances, well-known control logic and coding techniques have not been shown in detail in order not to unnecessarily obscure the present invention.

Overview of the Computer System of the Preferred Embodiment

The computer system of the preferred embodiment is described with reference to FIG. 3. The present invention may be implemented on a general purpose microcomputer, such as one of the members of the Apple ® Macintosh ® family, one of the members of the IBM Personal Computer family, or one of several work-station or graphics computer devices which are presently commercially available. Of course, the present invention may also be implemented on a multi-user system while encountering all of the cost, speed and function advantages and disadvantages available with these machines. In any event, a computer system as may be utilized by the preferred embodiment generally comprises a bus or other communication means 301 for communicating information, a processing means 302 coupled with said bus 301 for processing information, a random access memory (RAM) or other storage device 304 (commonly referred to as a main memory) coupled with said bus 301 for storing information and instructions for said processor 302, a read only memory (ROM)or other static storage device 306 coupled with said bus 301 for storing static information and instructions for said processor 302, a data storage device 307, such as a magnetic disk and disk drive, coupled with said bus 301 for storing information and instructions, a display device 322, such as a cathode ray tube, liquid crystal display, etc., coupled to said bus 301 for displaying information to the computer user, an alphanumeric input device 325 including alphanumeric and other keys coupled to said bus 301 for communicating information and command selections to said processor 302, a cursor control device 327, such as a mouse, track-ball, cursor control keys, etc., coupled to said bus 301 for communicating information and command selections to said processor 302 and for controlling cursor movement, and a video device 330, such as a VCR or Optical Disk player, said video device 330 coupled to a video processor/controller 331, where said video processor controller 331 is coupled to said bus 301. The video processor controller 331 performs analog to digital conversions. Such video processor controllers 331 are known in the art and perform the analog to digital conversion into a multiplicity of formats (including NTSC or PAL). Such video processor controllers 331 are commercially available from vendors such as Raster Ops of Santa Clara, Calif. Further, it is known in the art to output digital video signals directly from a digital video device. If such a device was utilized, a video processor controller may not be needed. Finally, it is useful if the system includes a hardcopy device 329, such as a printer, for providing permanent copies of information. The hardcopy device 329 is coupled with the processor 302, main memory 304, static memory 306 and mass storage device 307 through bus 301.

The preferred embodiment of the present invention is implemented for use on a Macintosh computer available from Apple Computer, Inc. of Cupertino, Calif.

In the preferred embodiment the first and second sequence of images that are being processed are stored on a storage device coupled to the computer system. The sequences of images may be stored in any of a plurality of digital video formats, e.g. the NTSC or PAL digital video formats. The format that the sequence of images is stored in is typically the same format in which it was created (there may be cases where the sequence of images has been reformatted prior to it utilization in the present invention). The preferred embodiment provides means for processing video data that is independent from the digital format that it is stored in.

Using the NTSC format as an example, 30 (thirty) frames are required for each second of video. A frame corresponds to an individual image in a sequence of images. A display screen is comprised of a plurality of picture elements (commonly referred to as pixels). A digital representation of a frame is a collection of data storage elements that are used to define the state of the pixels that make-up the image, as well as information concerning the duration a frame will be displayed. It should be further noted that typically, a sequence of images will also provide information concerning the video format that it is in. This is done so that a means for displaying the images may do so in a proper fashion (e.g. the computer system of the preferred embodiment displaying the proper number of frames per second).

User Interface

A user interface is the means by which a user interacts with a computer system. Known user interfaces utilize windows and icons in conjunction with a cursor control device. The cursor control device, commonly a mouse or trackball device, is used to position a cursor on a display. The mouse or trackball typically includes an electrical switch having at least two positions for generating signals to the computer to indicate a selection or other action by a user. The electrical switch is typically accessed via a button on the cursor control device. In order to avoid confusion with the use of the term "switch" as used elsewhere in this description in a transition context, the term button hereinafter will be used to denote the electrical switch. In any event, the combination of the windows, icons, and a cursor control device allows a user to operate in a visual "point and click" fashion rather then through the typing of terse computer commands. "Point and click" operation refers to positioning a cursor on a display so it is over a desired icon (the "point"), setting the button on the cursor control device into a second position (usually by depressing the button) and immediately resetting the button in a first position (usually by releasing the button). The "click" generally refers to tactile and audible feedback to the user on depressing and releasing the button.

An operation to invoke an application or gain access to a file directory is the "double click". The "double click" is similar to the "point and click" except that the button on the cursor control device is "clicked" twice in rapid succession.

Windowing systems provide the capability of displaying data in user-definable regions, which are usually rectangular portions of a display screen. Controls are typically provided to re-size and move windows within the confines of the physical display boundaries. Additional controls provide for scrolling data and/or a document through a data display area associated with the window. It is a feature of window systems to provide for multiple viewable windows within the confines of the physical display boundaries. The window system of the preferred embodiment further provides a feature whereby selected items from a first window may be moved to a second window.

Another aspect of the user interface of the preferred embodiment provides for pull-down menus. Such a pull-down menu is as described in U.S. Pat. No. Re. 32,632, entitled "Display System", Atkinson, assigned to the assignee of the present invention. In such a pull down menu system, the cursor is positioned in a predetermined menu area, where the predetermined area denotes a plurality of submenus. While the cursor is positioned in the predetermined area over the name of the desired submenu, a button associated with the cursor control device may be placed in a second (down) position causing the desired submenu to be displayed. The user may than position the cursor to the desired command within the submenu, wherein the command is invoked when the user places the switch associated with the cursor control device into the first (up) position.

The preferred embodiment makes extensive use of a cursor control device, icons, windows and pull down menus to enable an environment that is intuitively familiar to users of a Macintosh computer system.

Representations of Sequences of Images

The representation of a sequence of images as utilized by the present invention is described in co-pending application, Ser. No. 536,913, filed Jun. 8, 1990, entitled "Sequential Information Controller" assigned to the assignee of the present invention. As described in the co-pending application, the representation of the sequence of images is a "clip frame sequence", which is a collection of frames between a first selected frame and a second selected frame. This "clip frame sequence" may be a portion of a larger sequence of images. In any event, in the "clip frame sequence" the individual frames comprising the "clip frame sequence" are rapidly displayed at the NTSC rate of 30 frames per second, so that the first frame will follow the last frame creating a looping effect and thus causing the representation of the sequence of images to appear as a video output of the sequence of images. Further, the "clip frame sequence" may be selected and dragged across a display screen. A "clip frame sequence" has also been called a dynamic icon (dicon).

A "clip frame sequence" or dicon is also utilized when describing the transition. Briefly, utilizing a still frame displaying the number 1 (called a standard first image) to represent the first source image sequence and a still frame displaying the number 2 (called a standard second image) representing the second source image sequence, the two frames are transitioned to create a sequence of images, i.e. a "clip frame sequence". This is beneficial in that it allows a user to precisely determine the effect that a particular transition effect will have. Although still frames with the numbers 1 and 2 are utilized as the standard first image and the standard second image respectively, in the preferred embodiment, any two still frames, or any two sequence of images, which would convey the meaning of a transition from a first sequence of images to a second sequence of images, may be utilized without departing from the spirit and scope of the present invention. However, the use of still frames is preferred since it minimizes storage requirements (i.e. less space is required for storing a single frame as opposed to an entire sequence of images) for transition dicons.

General User Flow For a Transition

Figure 4:
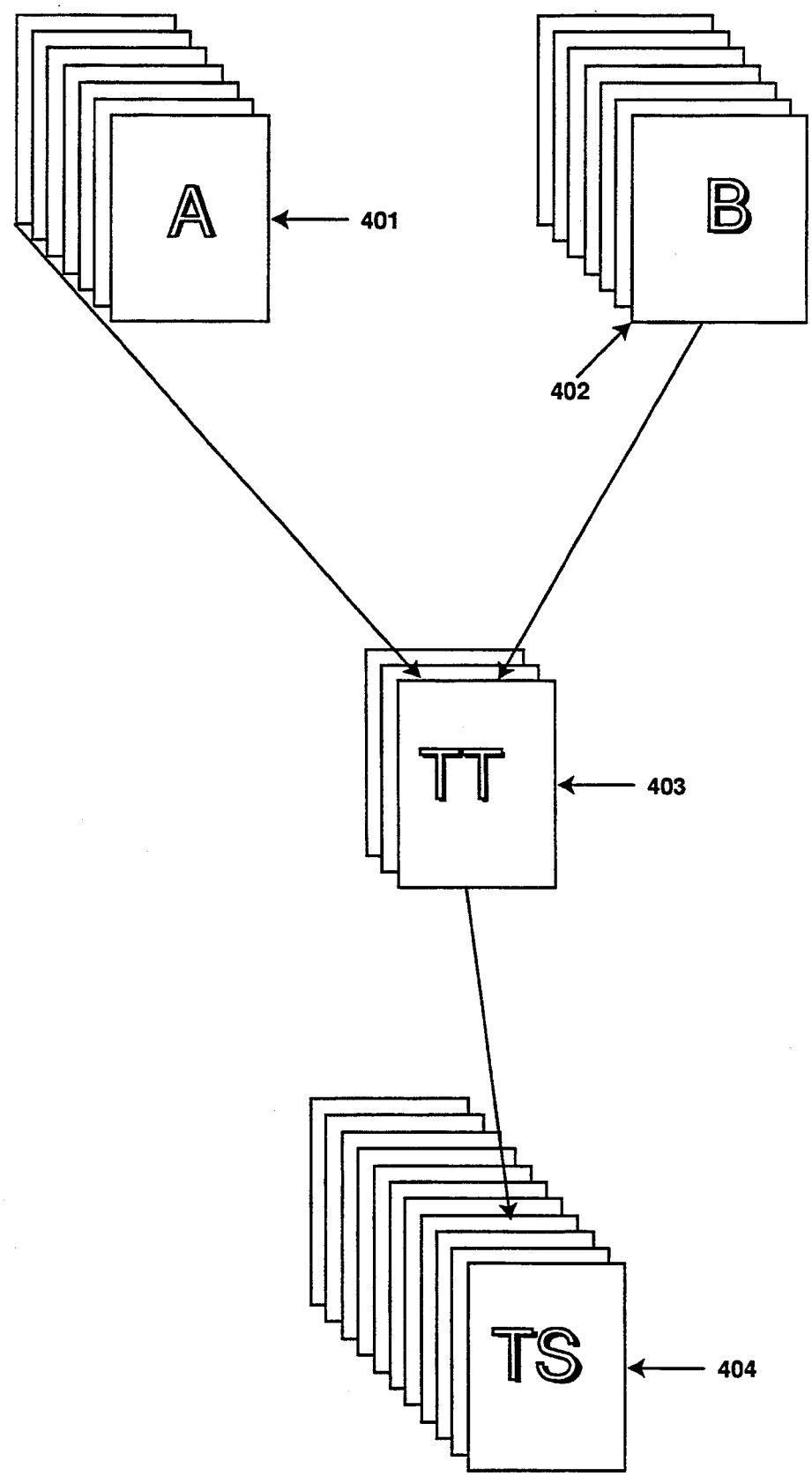
FIG. 4 illustrates the basic flow of a transition in the preferred embodiment of the present invention.

A basic flow for creating a transition in the preferred embodiment is depicted in FIG. 4. A first sequence of images 401 and a second sequence of images 402 are selected as the sources for the transition. A transition resource takes temporal and spatial information from a transition resource data element (i.e. a template definition) and processes them to create a transition template 403. A transition template is a third sequence of images. The transition resources then uses the transition template to create the desired transition sequence 404. The desired transition is a fourth sequence of images depicting the switching from the first sequence of images to the second sequence of images.

Figure 5:
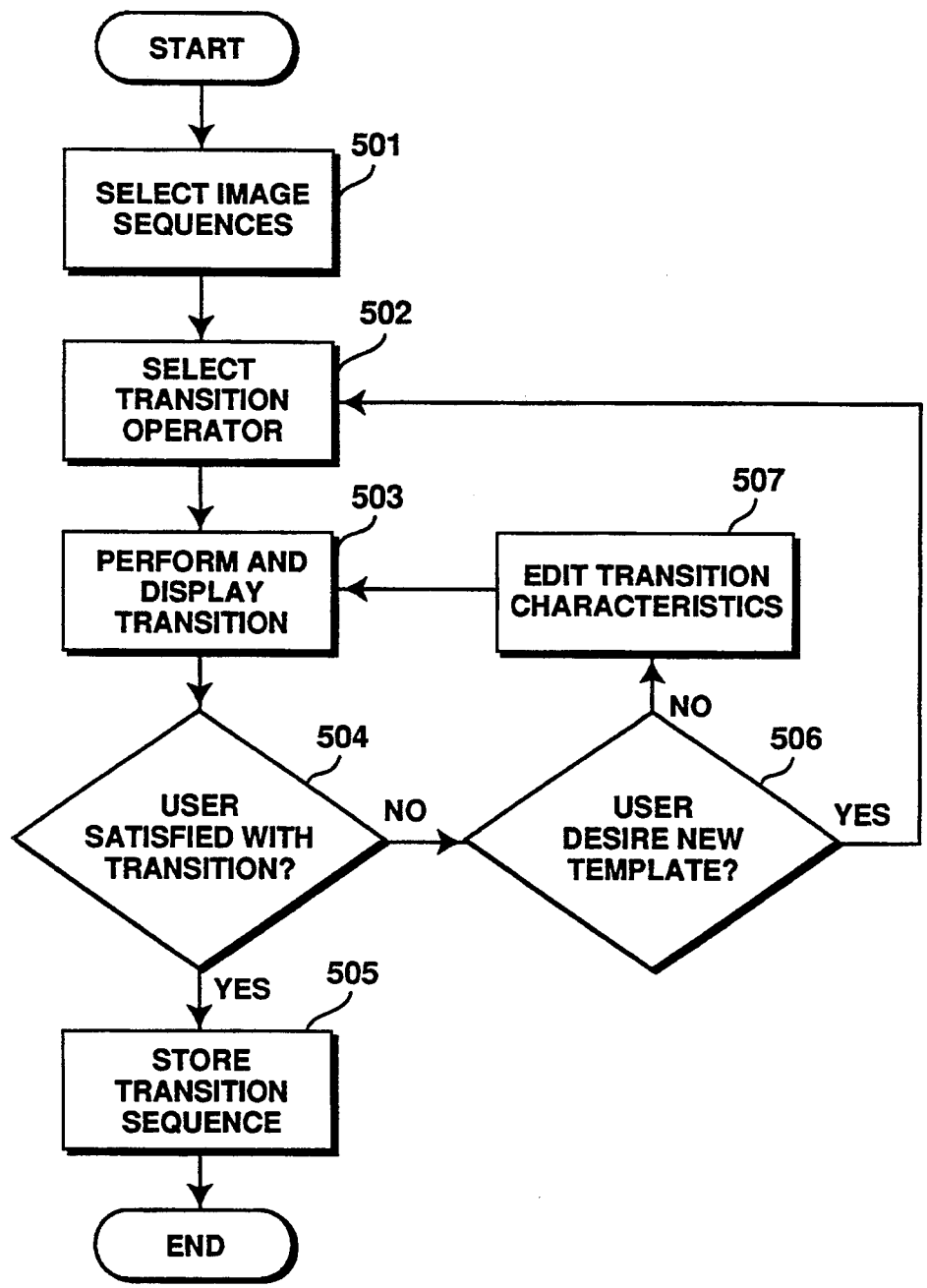
FIG. 5 is a flowchart providing the sequence of operations for performing a transition in the preferred embodiment of the present invention.
Figure 6:
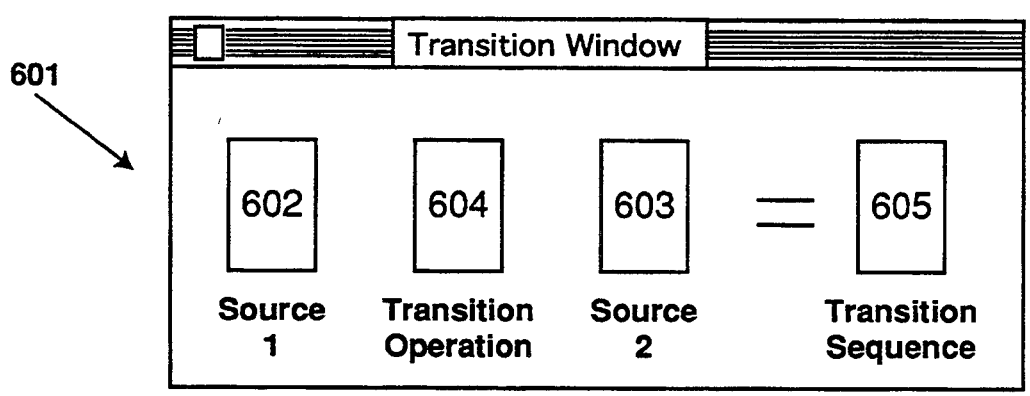
FIG. 6 illustrates a transition window for performing a transition in the preferred embodiment of the present invention.

The steps a user may take to utilize the present invention are illustrated in FIG. 5. Upon invoking the application software of the present invention, a user would be presented with a transition window 601, illustrated in FIG. 6. Invoking the application software occurs by "double-clicking" (described above) on an icon representing the application. In FIG. 6, a first predetermined area 602, is for placing and displaying a first sequence of images, a second predetermined area 603 is for placing and displaying a second sequence of images, a third predetermined area 604 is for placing and displaying a transition template and a fourth predetermined area 605 is for displaying the desired transition sequence. First, a user opens one or more windows that contains dicons for one or more sequences of images, step 501. Such a window that may be utilized is as described in co-pending application, Ser. No. 535,084, entitled "Direct Manipulation Visual Information Editor", filed Jun. 8, 1990, assigned to the assignee of the present invention. The user opens the window through an OPEN command found in the FILE pull down menu, using the technique for utilizing pull down menus described above. This technique is similar to that found in the Finder TM interface of the Macintosh computer, for opening flies. The user then selects the desired first and second sequences of images. This may occur by a well known selecting and dragging technique but may also be performed by other techniques, e.g. through a cut and paste operation. The selecting and dragging technique involves positioning a cursor, controlled by the cursor controlled device, atop the desired source sequence, placing a button associated with the cursor control device in a first down position (which will cause the selected sequence of images to be coupled to the cursor), moving (or dragging) and positioning the cursor onto the desired first or second predetermined area of the transition window 601, and releasing the button associated with the cursor control device into the second up position. The user then opens a window that contains identifiers for one or more transition sequences, step 502. The desired transition operator will be placed in the third predetermined area 604 of window 601. Thereupon, the preferred embodiment will automatically generate the desired transition, step 503, which will be displayed in area 605 of the window 601.

It should be noted that the steps 501 and 502 are interchangeable, i.e. the transition operator may be placed in the predetermined area before the source images sequences. It is only critical that data be in the predetermined areas 602, 603 and 604 before the transition step 503, is performed.

The user must then determine if they are satisfied with the transition, step 504. If they are satisfied with the transition, the transition is saved, step 505. If the transition is not satisfactory to the user, the user then decides if they desire to change the transition template, step 506, for a different transition effect. If a new transition template is desired, tile user would again select a transition operator, per step 502. If the user does not desire a new transition effect, the present invention provides a means in which the temporal or timing aspects of the transition may be edited, step 508.

In an alternative embodiment, the window 601 may define a plurality of rows, wherein each row defines areas identical in function to the areas 602, 603, 604 and 605. The user may follow the method described in FIG. 5 to create a plurality of transition sequences. A useful aspect of this embodiment is the ability to concurrently display a plurality of alternative transitions, whereupon the user may choose to save the most desirable of the transitions. It should also be noted that it is apparent from FIG. 6, and also from the description of the alternative embodiment, that the first source sequence of images and second source sequence of images and transition sequence are all viewed by the user from the same display means.

Figure 7:
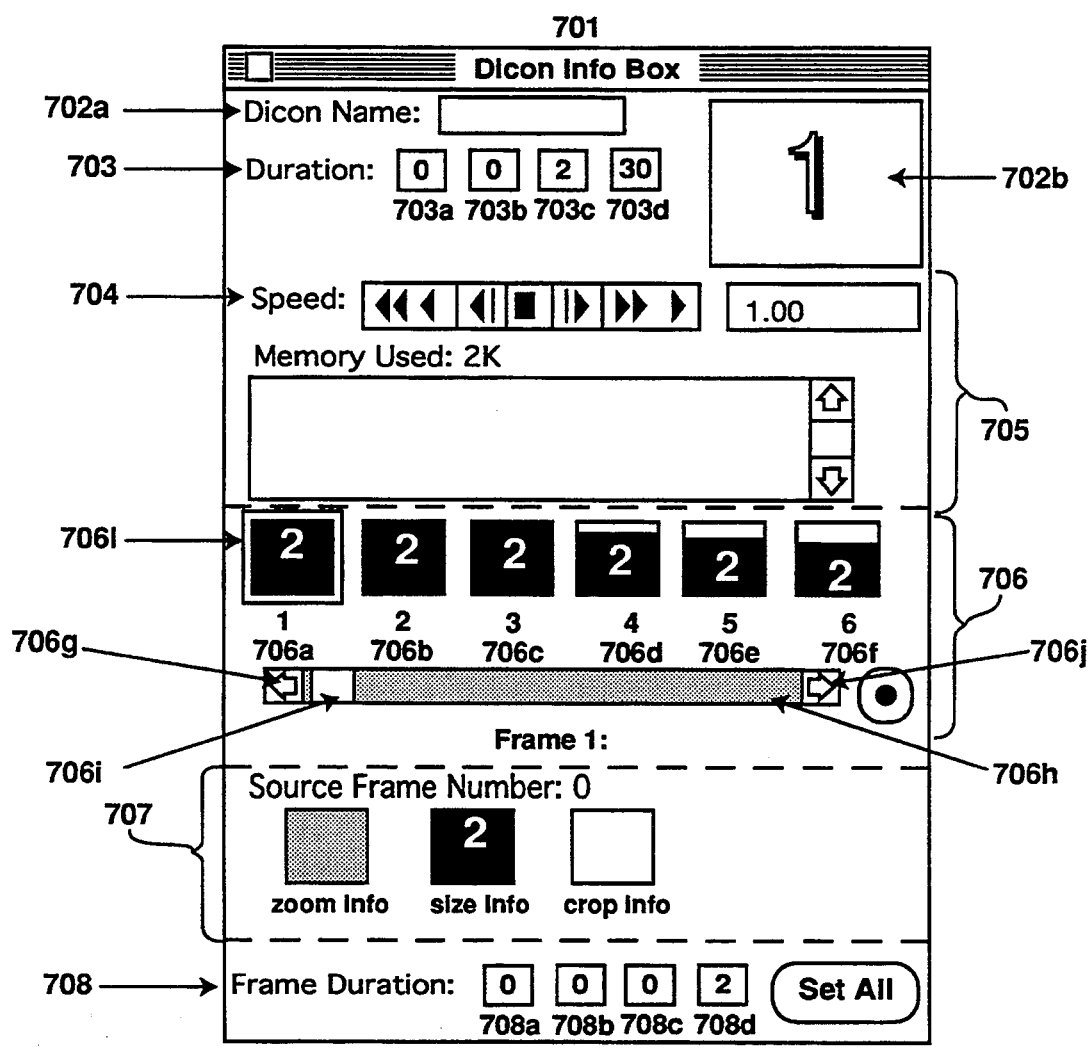
FIG. 7 illustrates a dicon information box window as may be utilized in the preferred embodiment of the present invention.

The preferred embodiment provides means by which a user may change the temporal or timing aspects of the transition template. This function is provided to the user within a menu option entitled GET INFO found in the EDIT pull down menus that is provided when the application is invoked. The display of a pull down menu and the selection of a menu option is as described above. Additionally, in the preferred embodiment, the GET INFO menu option may be directly accessed using the "command I" sequence of keystrokes. Upon choosing to change the temporal aspects of the transition, the user is presented with a dicon information box 701 as illustrated in FIG. 7 "©1991 Apple Computer, Incorporated" (17 U.S.G. 401). The dicon information box 701 provides information about the transition template currently chosen. It is important to note that the dicon information box may be used not only for transitions, but can be used to display information about and modify the temporal aspect of any sequence of images, e.g. a source sequence of images.

The present invention provides two ways by which the timing of a transition may be changed; changing the duration of the entire transition or changing the duration of a particular frame or set of frames within the transition. If the user increases the duration of the whole transition, the transition will slow down proportionally, for example a wipe right switch takes a longer time to move all the way across a screen. Likewise, if the duration is decreased, the entire transition will speed up proportionally.

If the user changes the duration of a particular frame, the particular frame is displayed for an increased/decreased length of time. This has the effect of increasing/decreasing the duration of the entire transition, because the times for the remaining frames remains the same. However, it would be apparent to one skilled in the art to design a system where if the user increases the duration of particular frame(s) of the transition template, the selected frame(s) will be displayed for a longer duration while the remaining frames will "speed-up" and if the duration of particular frame(s) is decreased, the remaining frames will "slow-down". The effect of the latter design would be to keep the transition duration the same.

Referring to FIG. 7, a first area 702 provides identification information concerning the transition, i.e. a textual name 702a and "clip frame sequence" 702b of the transition. A second area 703 provides a means for changing the duration of the entire transition. This area will be described in more detail below. Area 704 provides a means in which the transition sequence may be temporally scanned. The interface to the area 704 is described in greater detail in the aforementioned co-pending application Ser. No. 536,913 entitled "Sequential Information Controller" assigned to the assignee of the present invention. Area 705 provides information concerning the template definition, i.e. the amount of memory required to store the template 705a and comments about the transition 705b. An area 706 provides for the selection of a particular frame, an area 707 provides information on a selected frame and an area 708 provides for editing the temporal aspects of a selected frame.

Referring back to area 703, this area is used to change the duration of the transition. A first box 703a corresponds to hours, a second box 703b corresponds to minutes, a third box 703c corresponds to seconds and a fourth box 703d corresponds to "ticks". In the preferred embodiment a tick is equivalent to approximately 1/60th of a second, but it would be readily apparent to implement a tick as milliseconds, or any other useful measure of time (e.g. for a PAL sequence of images a measure of time of 1/25th of a second would be useful since it corresponds to a frame). A user may change the duration of a transition by positioning the cursor atop the desired box and "clicking" the button associated with the cursor control device. Upon clicking, the desired box will be displayed in inverse video and the time corresponding to that box may be changed. The user may then enter the desired duration for the transition. Upon positioning the cursor outside of the box and clicking, the desired temporal change will be undertaken. Other user interfaces for changing the duration for a transition may be utilized, e.g. by altering a sliding scale or moving the hands of a clock, without departing from the spirit and scope of the present invention.

Area 706 provides a means to select a particular frame. As illustrated in FIG. 7, six (6) frames, labeled 706a–706f, of the transition are displayed, each representing a particular stage of the transition. A selected frame has a border 7061 and it's reference number with respect to the frames 706a–706f is indicated in area 707. In FIG. 7, the frame 706a is selected. A user may select a frame by positioning the cursor atop the frame and clicking the button associated with the cursor control device, whereby the selected frame will be displayed with a border and its frame number displayed in area 707. A scroll bar 706g is provided whereby the transition template may be scrolled. The use of scroll bars is known to users of the Macintosh system. The entire length of the transition template is by definition the length of scroll area 706h so that the relative position of the displayed frames with respect to the entire transition template is provided by the scroll box 706i. Scrolling may be invoked by either dragging the scroll box 706i along the scroll area 706h or by use of the scroll arrows 706k and 706j, respectively. Dragging is accomplished in identical means as described above with respect to selecting source images. To scroll with a scroll arrow, the cursor is positioned atop either of the scroll arrows and the button associated with the cursor control device is placed in the first (down) position. So long as the button is in the first position, scrolling will occur. When the button associated with the cursor control device is released into the second up position, scrolling will terminate. Upon completion of scrolling, the six frames surrounding the location where the scroll box 706i is located, will be displayed in the areas 706a–706f.

Area 708 provides means for editing the temporal aspects of a selected frame. As described above, each frame represents a particular point in time of the sequence of images and that each frame typically represents 1/30th of a second of the video image. The area 708 allows for changing the time of a particular frame so that it may be displayed for a longer or shorter period of time. Thus, it is possible that a frame would be displayed for a greater duration than 1/30th of a second or whatever its standard display time is. The timing areas 708a–708d correspond to those in area 703a–703d, and operation is identical. As an example of changing a frame duration, if the desired transition is causing a titling effect (as will be described below), the point in time where the titles are on the center of the screen may be increased so that the titles will appear centered on the screen for a longer duration. It should also be noted that during the interpolation step the duration of the entire transition is altered to the extent of the change in the selected frame. Thus, both the duration of the transition and the duration of a particular frame are altered to create the desired transition.

Figure 8:
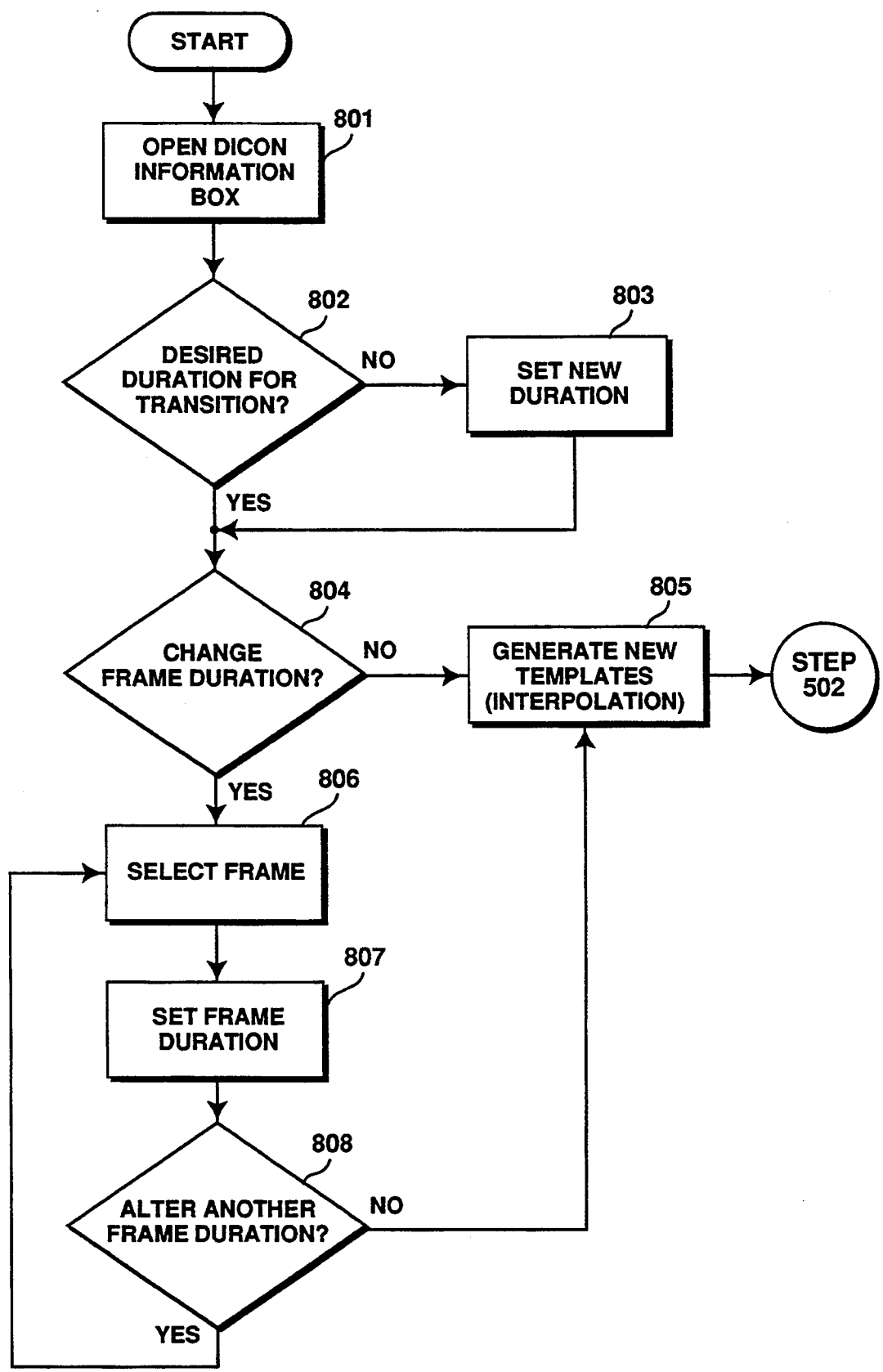
FIG. 8 is a flowchart providing the sequence of operations for changing the duration of a transition or the duration of a frame in the preferred embodiment of the present invention.

FIG. 8 illustrates how a user may typically alter the temporal aspects of a transition template. First, the user must open the dicon information box, step 801. This is accomplished in the manner described above. Next, the user must determine if it is desirable to alter the duration of the transition sequence, step 802. If it is desirable, a new duration is set, step 803. In any event, the next step will be to determine if the duration of any frame(s) is/are to be altered, step 804. If no frame duration is to be altered, the transition template is generated using the interpolation process described below, step 805. If a frame duration is to be altered, the desired frame is selected, step 806. This is accomplished in the manner described above. Once the desired frame is selected, the frame duration is then set, step 807. Once this is completed, the user determines if other frame durations are to be altered, step 808. If no other frame durations are to be altered, than the interpolation process is invoked, step 808. If other frames are to be altered, the desired frame must be selected, step 806, the duration set, step 807 and repeated until all the desired frames are similarly processed.

Referring back to FIG. 5, once the editing of the temporal parameters are completed, step 508, the transition is again performed and displayed, step 503.

Key Color Selection

A second means by which the user may alter the transition is through the selection of one or more key colors. A key color is one that is masked from the source image before it is combined with other source images and a transition template. Another way of thinking of it is that it becomes a transparent color.

A user may select a key color by using a selection tool. In the preferred embodiment Macintosh system, tools for selecting data objects are provided. One such tool is the selection rectangle. The selection rectangles operates by positioning the cursor at the upper left most point of the rectangle with the cursor control device and placing the button associated with the cursor control device in a first (down) position. With the button still in the down position, the cursor is positioned to the lower right most point of the rectangle. While the rectangle is being created, a dashed outline is displayed showing the boundary of the rectangle. When the button associated with the cursor control device is released into the first position, the selection rectangle is completed and the colors within the rectangle are added to the color selection list for that source image sequence.

Key color selection may also occur by other means, e.g. providing a menu to the user at which the user can select the desired key colors. Such other means would provide equivalent function to that found in the present invention.

A natural extension of a key color list is to act as a filter, i.e. one where a first predetermined pixel value is converted into a second predetermined pixel value. For example, a pixel value that is a gray-scale may be converted into a pixel value that represents color. Such an application would be particularly useful when "colorizing" black and white movies that have been digitized.

Transition Template

In the preferred embodiment, a transition template defines how each pixel in each frame of a transition sequence is to be treated. Like the source image sequences, the transition template may be stored on a storage device coupled to the computer system. As will be discussed in greater detail below, a frame in the transition template corresponds to one or more frames in the source sequences of images and defines how the pixels in the corresponding frames are to be treated.

The transition template is used to create a transition sequence frame by following a rule that if a pixel in a transition template frame is in a first state, the corresponding pixel in the corresponding frame of the first sequence of images is displayed, if the pixel in the transition template is in a second state, display the corresponding pixel in the corresponding frame of the second sequence of images, otherwise use a combination of information from corresponding pixels of both sequences of images to create the pixel to be displayed.

Figure 9A:
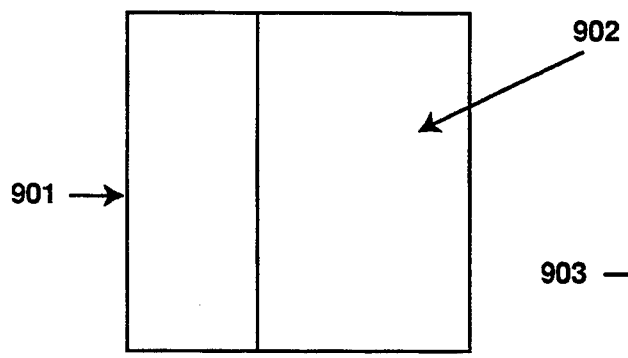
FIGS. 9a–9c illustrate a transition template for a wipe transition as may be utilized in the preferred embodiment of the present invention.
Figure 9B:
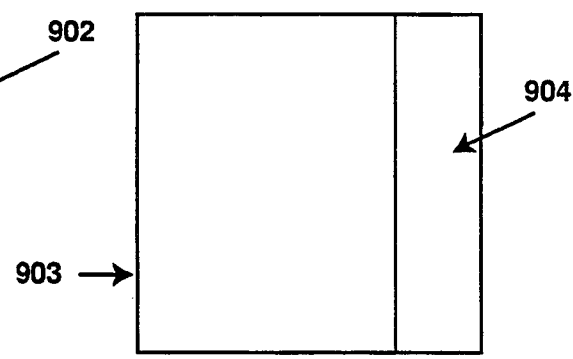
Figure 9C:
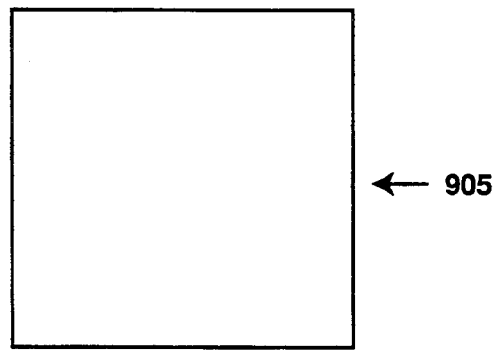

A transition template is illustrated in FIG. 9a-9c. In FIG. 9a a black area 901 comprises approximately ⅓ and a white area 902 comprises ⅔ of the display area. As described above, using a rule that a black pixel represents displaying the second source sequence of images, the FIG. 9a would be displaying ⅓ of a frame of the second source sequence of images while the remaining display would be the leftmost ⅔ of a frame of the first source of images. In FIG. 9b, ⅔ of the template is black area 903 and ⅓ is white area 904. Thus, in FIG. 9b, the display would have ⅓ showing a frame from the first source sequence of images and ⅔ showing a frame from the second source sequence of images. Finally, in FIG. 9c, the entire template is black area 905 indicating that only a frame of source image sequence 2 would be displayed.

A special use of the transition template is to create fades or dissolve transitions. The transition template is generated in a monochrome or grayscale format. So, to produce one transition frame from a frame from the first source sequence of images (call it i1_1), a corresponding frame from the second source sequence of images (call it i2_1), and transition template frame tt_1, where tt_1 has grayscale pixels, a second rule is as follows: for each pixel in tt_1, calculate the percentage of black it contains (call it p%) then use 1-p% of the color value of the corresponding pixel from frame i1_1, and use p% of the color value of the corresponding pixel from frame i2_1.

For example, to create a fade to black over 30 frames, the second source sequence of images would be 30 black frames (or one black frame, reused 30 times). The first frame of the transition template is all white, the second frame is a very light grey, the third is a bit darker gray, the 15th is a medium grey, the 25th is a dark grey, and the 30th is black. At the first frame of the transition, each pixel in the transition template is 100% white, so for each pixel in the first frame of the transition we would use 100% of the color value of the pixels from the first source sequence of images and 0% of the color values of the pixels from the second source sequence of images. But at the 15th frame of the transition, each pixel in the transition template is 50% grey—that means at each pixel in transition frame 15 we would use 50% of the color value of the corresponding pixel in the first sequence of images and 50% of the color value of the corresponding pixel of the second sequence of images. At the 30th frame of the transition only the second sequence of images is displayed, i.e. 100% of the second source sequence of images, and 0% of the first source sequence of images, since the values of the pixels in the transition template at frame 30 are 100% black.

This same transition template would be a dissolve transition if the second source sequence of images was other than a single color, e.g. another sequence of images. Here, the first sequence of images would dissolve into the second sequence of images.

The case where transition templates only contain two-value (black-or-white-only) pixels, is just a subcase of the more general grayscale transition template—each pixel of a two-value transition template copies either 0% or 100% of the corresponding image pixels to a transition frame.

The creation of a transition template may occur in different ways, but two are typical. First, since any sequence of grayscale images may act as a transition template, any means by which a sequence of images can be created can be used as a transition template. For example, a sequence of images that was created by a prior transition, may be used as a transition template. The second way is through the use of a transition resource. The transition resource is discussed in greater detail below.

Timing Aspects of a Transition

A transition takes place over a predetermined period of time. As described above, the preferred embodiment utilizes a transition template and uses its information to generate the frames for a transition sequence.

The user controls the transition template in order to determine the transition effect between the two sources. In the preferred embodiment, a last part of a first source sequence of images (source sequence A) is combined with a first part of a second source sequence of images (source sequence B). For example, if source sequence A is a 10 second sequence and source sequence B is a 5 second sequence and the transition template takes two seconds, the last 2 seconds of source sequence A will be combined with the first 2 seconds of source sequence B. The resulting sequence of images resulting from the merging of Source sequence A with Source sequence B would last 13 seconds.

Figure 10A:
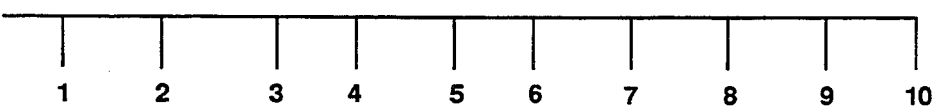
FIGS. 10a–10b illustrate the timing of a transition sequence as may be utilized in the preferred embodiment of the present invention.
Figure 10B:
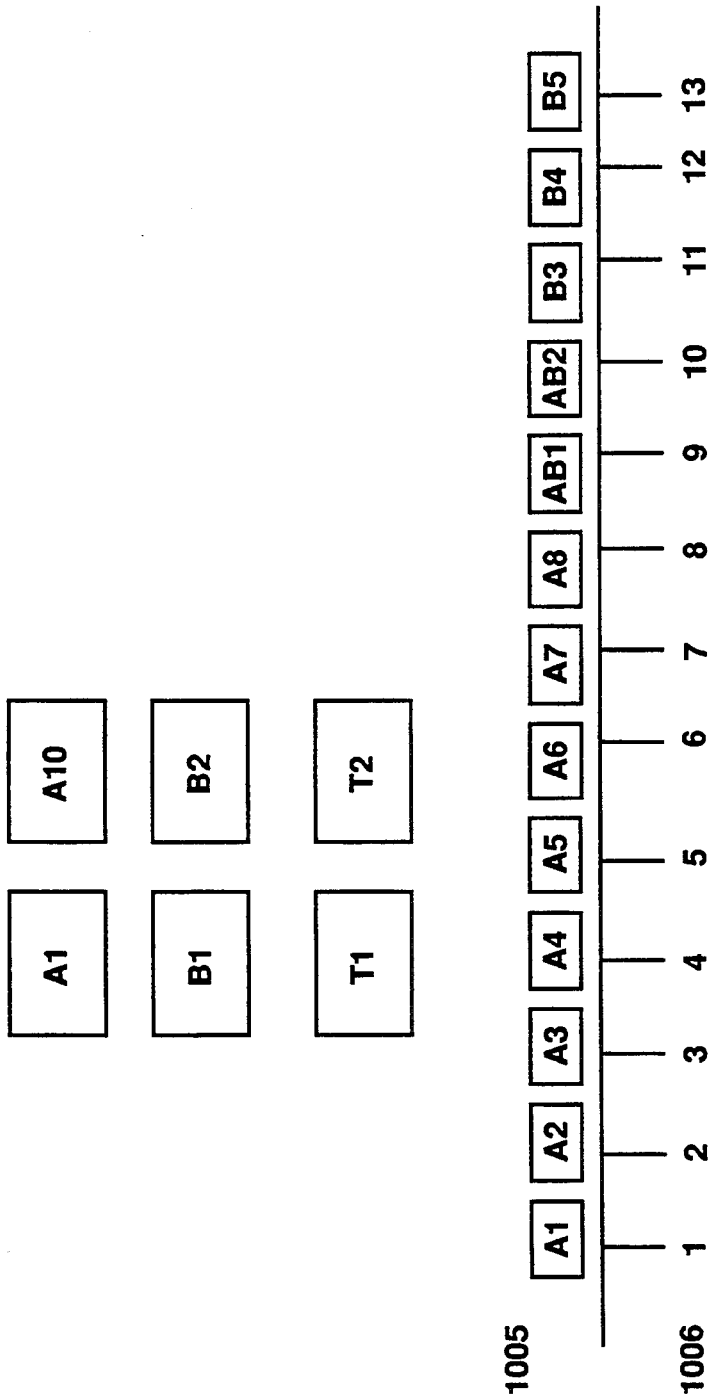

This is further illustrated by the timelines in FIGS. 10a-10b. In FIG. 10a a source sequence A 1001 is a 10 second sequence, source sequence B 1002 is a 5 second sequence and transition template 1003 is a 2 second sequence. For simplification and clarity, each one second clip of the sequences 1001, 1002, 1003 is represented in FIG. 10a-10b as a single frame. Each of the single frames in FIGS. 10a-10b represents 1 second of video and may be comprised of 30 frames (in accordance with the NTSC standard) or 25 frames (in accordance with the PAL standard). In any event, source sequence A 1001 is comprised of 10 frames labeled A1-A10, source sequence B 1002 is comprised of 5 frames labeled B1-B5 and transition template 1003 is comprised of 2 frames labeled T1-T2. A timeline 1004 is also provided to denote the duration of a frame and/or sequence of images.

FIG. 10b illustrates a transition sequence of the preferred embodiment. As described above, a last part of the first sequence of images (here source sequence A) is combined with a first part of the second sequence of images (here source sequence B), the duration equaling the duration of the transition template. The frame A9 and B1 are combined based on the contents of transition template frame T1 to create transition sequence frame AB1. Likewise, the frame A10 and B2 are combined based on the contents of transition template frame T2 to create transition sequence frame AB2. The resulting merged sequence of images 1005 would consist of frames A1-A8, AB1-AB2 and B3-B5 and as illustrated by a timeline 1006, would have a total duration of 13 seconds.

In some instances the total duration of frames in a source sequence of images will be less than the total duration of frames in the transition template. In these instances, there will be reuse of frames from the source sequence of images which has less duration than in the transition template. In the preferred embodiment a technique where each frame is used once, and when all frames have been used, the last frame is reused, has been employed. For the first source of images, each frame is used once, and the last frame is repeated, but for the second source of images, the first frame is reused for a sufficient amount of time until the rest of the frames can be used once. Alternatively a technique whereupon the reuse of each frame is averaged over the required reuse time may be utilized. For example if the first source sequence of images takes up 5/30th of a second and has 5 frames and the transition template takes up 15/30th of a second and is comprised of 15 frames, each frame in the first source sequence of images is used 3 times. Utilization of alternative reuse schemes would not depart from the spirit and scope of the present invention.

It should be noted that if the first source sequence of images is a still image, i.e. consisting of a single frame, this image is repeatedly combined with the second source sequence images for the duration of the transition template. If both the first and second source sequences are still images, the images would be combined as defined by the transition template, to create a transition sequence of images.

There may also be cases where a single transition frame corresponds to more than one frame in a source sequence of images. This may occur for example when a first source sequence of images is in NTSC format (30 frames per second) and the second source sequence of images is in PAL format (25 frames per second). This may also occur when a source sequence of images is created and the duration of a frame in the transition template has been altered, thus creating a frame in the sequence that is displayed for a longer (or shorter) period of time than the remainder of the frames. In these instances, a transition template is created that accommodates for these deviations by either the addition, omission or extension of duration of template frames.

It should be noted that due to the fact that the data is in a digital representation, where each frame is stored separately, it would be apparent to one skilled in the art to transition from the first source sequence of images to the second source sequence of images, at different points of the respective sequences. Thus it would be apparent to be able to transition, for example, in the middle of the first source sequence of images and the middle of the second source sequence of images.

Figure 10C:
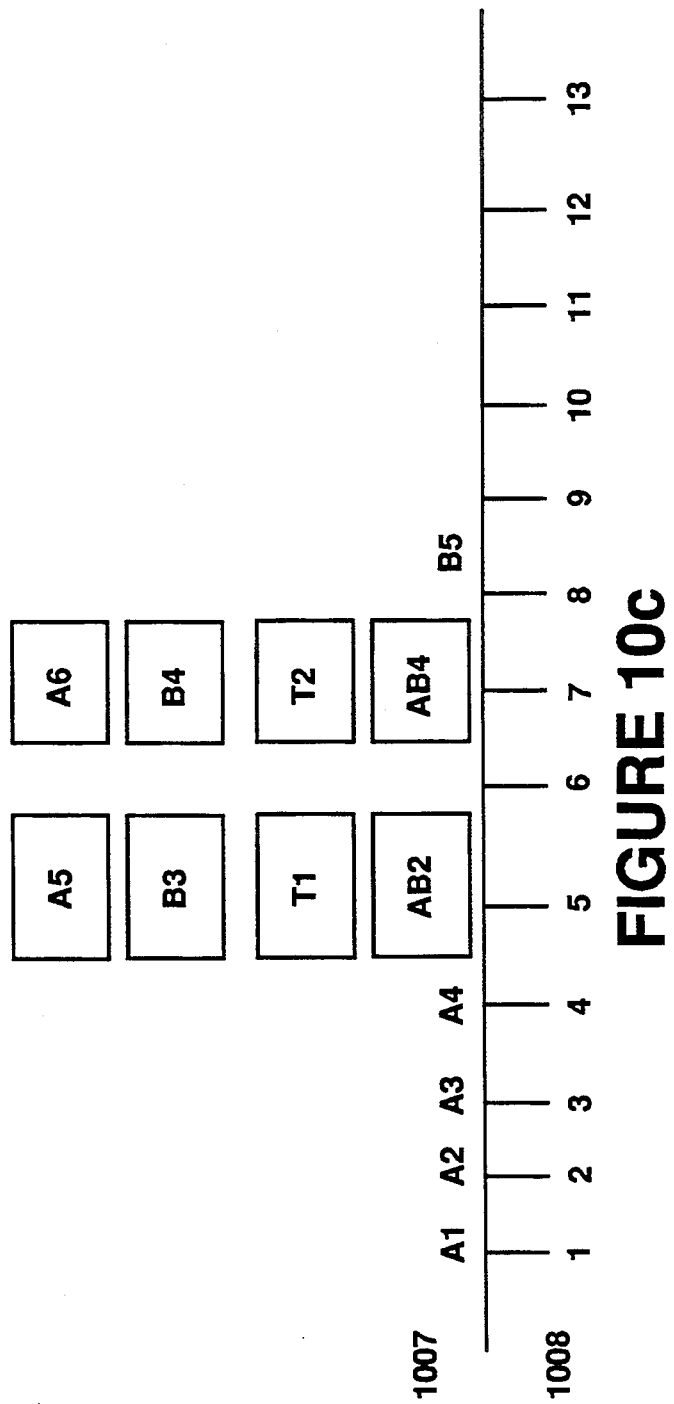
FIG. 10c illustrates the timing of a transition sequence as may be utilized by an alternative embodiment of the present invention.

The timing of such a transition is illustrated in FIG. 10c. In FIG. 10c, the transition is occurring starting at frame A5 of source sequence A and starting at frame B3 of source sequence B. The frame A5 and B3 are combined based on the contents of transition template frame T1 to create transition sequence frame AB3. Likewise, the frame A6 and B4 are combined based on the contents of transition template frame T2 to create transition sequence frame AB4. The resulting merged sequence of images 1007 would consist of frames A1-A4, AB3-AB4 and B4 and as illustrated by a timeline 1008, would have a total duration of 7 seconds.

Description of the Transition Resource

The preferred embodiment Macintosh system makes extensive use of shared software tools. Collectively, these tools are termed resources. Resources may be utilized by any software program which has access to them. Resources include application code, menus, fonts or icons. The concept of resources is described in greater detail in the publication "Inside Macintosh" a publication of Addison Wesley Publishing Company, Inc. and are well known to programmers of Macintosh compatible software. In the present invention a transition resource provides for the creation and modification of transition templates. The transition resource of the preferred embodiment is comprised of a data structure and application code which provides for the creation of transition templates and transition sequences. It should be noted that that the transition resource is used to create a transition template dynamically. The transition template is created dynamically in order to save storage space in the computer. This is particularly useful when a user is using many transition templates. A transition template is generated as a result of initiating a transition between a standard first image and a standard second image to create a transition dicon. The transition resource further allows for the modification of a transition from both a temporal and spatial viewpoint.

To utilize the transition resource, a transition resource "type" is defined. Type is a term familiar to those skilled in the art of software programming and refers to characteristics of data, e.g. an integer or character value. The transition resource type provides a consistent format through which the underlying application code which provides for the creation of transition templates can be shared. Thus, a data element of the type transition resource defines a transition.

The underlying application code of the transition resource processes a data element of the type transition resource utilizing three fundamental operations; selection, mapping and interpolation, all of which are described in greater detail below. Briefly, selection is the choosing of regions within areas representing a source sequence of images, i.e. source image areas, which will be combined to create a transition sequence. Mapping is the placement source image areas at locations in relation to an area representing what will be viewed by the user as output, i.e. an output image area. Interpolation is the estimation of intermediate states of selected regions and source images areas both temporally and spatially.

The transition resource type is described with respect to Chart A.

CHART A

```
Line No.
1      type 'TRNS' {
2          byte;                                    // bitdepth
3          byte firstOnTop = 0, secondOnTop = 1;// who uncovers whom
4          integer;                                 // width
5          integer;                                 // height
6          integer = $$Countof(Image1RectList);
7          array Image1RectList {                   // image 1 trajectory
8              Rect;
9          }
10         integer = $$Countof(Image2RectList);
11         array Image2RectList {                   // image 2 trajectory
13             Rect;
13         }
14         integer = $$Countof(TransitionList);
15         array TransitionList {
16             integer = $$Countof(TweenList);
17             array TweenList {
18                 switch {
19                 case RectTween:
20                     key integer = RectTweenKey;
21                     integer;            // dissolves
22                     integer;            // dissolves
23                     integer;            // dissolves
24                     Rect;
25                     Rect;
26                 case IrisTween:
27                     key integer = IrisTweenKey;
28                     integer;            // dissolves
29                     integer;            // dissolves
30                     integer;            // dissolves
31                     Point;
32                     integer;
33                     Point;
34                     integer;
35                 case PolyTween:
36                     key integer = PolyTweenKey;
37                     integer;            // dissolves
38                     integer;            // dissolves
39                     integer;            // dissolves
40                     integer = $$Countof(StartPointList);
41                     array StartPointList {
42                         Point;
43                     }
44                     array EndPointList {
45                         Point;
46                     };
47                 };
48             };
49         };
50     };
```

Chart A illustrates the transition resource type definition as utilized by the present invention. In the preferred embodiment Macintosh system, the REZ programming language may be used to define resources. The REZ programming language is a PASCAL derivative, which was developed by Apple Computer explicitly for the definition of resources. Other computer systems may require the use of other programming languages to define resource equivalents. Such use of other programming languages would not depart from the spirit and scope of the present invention. As discussed above, the transition resource utilizes information provided by a transition definition to create a transition template. The data to be provided in the transition definition must be in a proper format and of a proper type (e.g. an integer, array, etc. ) to create a transition template. The resource transition resource type of Chart A illustrates the format that a transition resource data element must be in. It would be apparent to one skilled in the art to utilize an alternate format, without departing from the spirit and scope of the present invention.

Referring again to Chart A, the name of the resource is found on line 1. Here, the name of the resource is "TRNS". Lines 2-3 are used to provide optimization information to the underlying application code that is processing the transition resource data type. On line 2, the data provided will signal whether the transition template to be generated will contain dissolve values. If there are no dissolve values, that portion of the application code is bypassed. On line 3, a determination of which of the two sequence of images is "on top" when the two are overlaid within an output image area, is made (the output image area is described in more detail below with respect to lines 4-5). Selected regions of the source image area that are "on top" are displayed within the output image area when no dissolve parameters are defined (what happens when dissolve parameters exist is described in more detail below with respect to color mapping). The "on top" determination minimizes processing by presuming that the entire source image area that is not "on top" is selected. Thus, selection of objects from both source image areas is not required. For example, an iris-out switch would be defined with the second sequence of images "on top". In an iris out the second sequence of images grows outward from a predetermined point to cover the output image area and overlay the first sequence of images. In an iris-in, the first sequence of images is "on top". In an iris-in the first sequence of images contracts inwards towards a point uncovering the second source sequence of images.

Lines 4-5 define the base dimensions of the output image area. The output image area provides two functions; it represents the area or "movie screen" through which the sequence of images are viewed, and its definition provides a frame of reference for interpolating selected objects. In the preferred embodiment, the output image area is a rectangle, but alternative shapes would not depart from the spirit and scope of the present invention. Such alternative shapes would be provided by modifying the underlying code which interprets lines 2-5. In any event, the output image area is an area on a coordinate plane, e.g. an X-Y plane, through which the transition sequences of images of the preferred embodiment, may be displayed on a display device. It should be noted that only when a source image area (described below) or a portion of a source image area, overlays an output image area, may it or a portion of it, be displayed.

The values defined on lines 4 and 5 do not reflect actual dimensions of a source sequence of images. A transition will be displayed using the dimensions of either the first or second source sequence of images. As described above, these values act as base reference points to which values provided later, e.g. in the description of the selection objects, are relative. For example, if a the values in lines 4 and 5 define a rectangle of dimensions 80×60 and a selection object defines a start rectangle of dimensions 20×15, it is apparent that the selection objects comprises an area that is 25% that of the output image area. Thus, if the true sequence of images has dimensions 100×100, the selection object would thus maintain the relationship and comprise 25% of the true sequence of images. This is done in order to support source sequences of images or an output sequence of images, of any dimensions.

As described above, the transition sequence will be displayed with the dimensions of either the first or second source sequence of images. In the preferred embodiment, the first source sequence of images and the second source sequence of images need not have the same dimensions. In such situations, the present invention detects the different dimensions and provides means for allowing the user to decide which of the source sequence of images will define the dimensions for the output sequence of images.

Lines 6-9 require information concerning a first source image area and lines 10-13 require information concerning a second source image area. This information includes the shape and dimensions of the source image area, and its trajectory, i.e. whether the source image area moves through the output image area. Generally, a source image area will have a rectangular shape that will correspond to the output image area. From a conceptual viewpoint, a source image area represents an area through which portions of frames within a sequence of images may be selected for viewing. As described above, the entire source image area of one sequence of images is selected while only a portion(s) of the other source image area is/are selected. As will be discussed below in greater detail with respect to mapping, a source image areas position may change over time. When portions of a source image area overlay with the output image area, they may be viewed depending on other criteria defined by the transition resource.

The lines 15-50 are used to define a selection object list for the transition. The selection objects will be applied to the source image area that is "on top" (see line 3). The data structure of the object list is a TransitionList array of TweenList array elements, i.e. it is an array where the elements themselves are arrays. With this structure, the TransitionList array elements are processed sequentially in time, while the Tweenlist array elements, i.e. the "primitive" objects, are processed concurrently in time.

Three "primitive" objects are defined; RectTween (for a rectangle starting at line 19), IrisTween (for an iris starting at line 26), and PolyTween (for a polygon starting at line 35). These "primitive" objects in turn further utilize other application code which performs the transitioning functions of selection, mapping and interpolation, which are described below. A transition definition will define one or more "primitive" objects.

The "primitive" objects as implemented in the preferred embodiment, utilize the Macintosh QuickDraw tools and the premises upon which QuickDraw operates. QuickDraw tools provide an easy means for performing highly complex graphic operations very quickly. The QuickDraw toolkit is described in detail in the aforementioned Inside Macintosh publication. It should be noted that QuickDraw allows for the definition of a plurality of different object types. Utilization of such alternate object types may be easily incorporated into the present invention through their definition within the "TRNS" resource type. Other geometric objects not defined by Quickdraw may also be utilized, e.g. COONS patch. Moreover, the utilization of any means for creating objects, e.g. QuickDraw equivalents, or a specifically created object editor, would not depart from the spirit and scope of the present invention.

Figure 11:
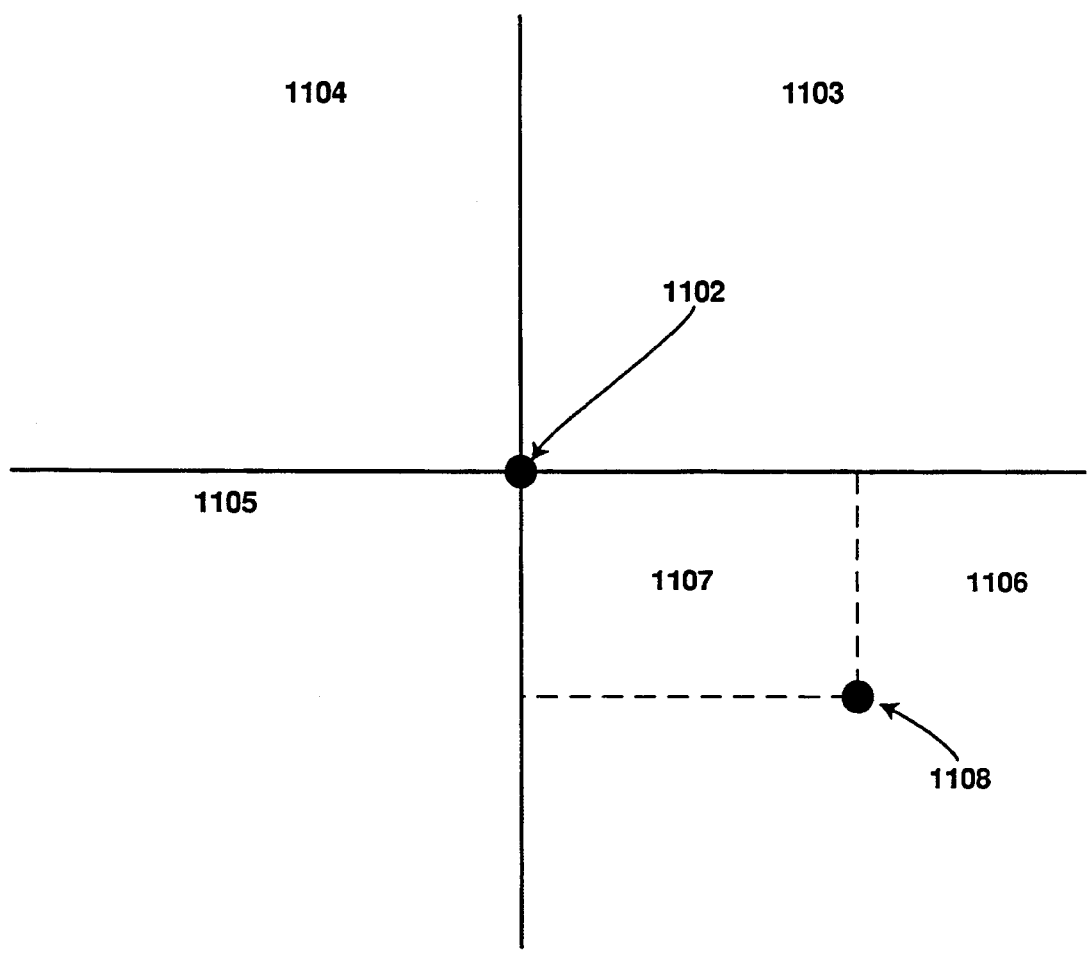
FIG. 11 is an X-Y coordinate plane describing the spatial reference that may be utilized in the preferred embodiment of the present invention.

The QuickDraw tools operate with respect to a two-axis, X-Y coordinate system. In FIG. 11, an X-Y coordinate plane 1101 is illustrated. Based on historical practice, the X-Y coordinate plane for graphical applications is defined so that in the Y coordinate, all values above the X-axis are negative and all values below the x-axis are positive. In the preferred embodiment, the unit of measure of the coordinate plane is pixels. The point 1102 of the coordinate plane 1101 represents the point (0,0) on the plane 1101. Thus, the coordinate plane 1101 can be viewed as having an upper right quadrant 1103, an upper left quadrant 1104, a lower left quadrant 1105 and a lower right quadrant 1106. The values in the upper right quadrant 1103 will have a width value of greater than or equal to zero and a height value of less than or equal to zero, in the upper left quadrant 1104 will have a width value of less than or equal to 0 and height value of less than or equal to zero, values in the lower left quadrant 1105 will have width values of less than or equal to zero and height values of greater than or equal to zero and values in the lower right quadrant 1106 will have width values greater than or equal to zero and height values greater than or equal to zero. In the upper right quadrant 1103 of the coordinate plane a rectangular area 1107 is defined. It should be noted that a rectangle in a coordinate plane system can be defined by two points; the rectangular area 1107 is defined by a top left point 1102 (0,0) and a bottom right point 1108. In the preferred embodiment, the bottom right point 1108 is at location (80,60).

In the preferred embodiment, objects and regions are internally converted to percentages of the output image area, with a specified start point. This allows for the use of interpolation algorithms that are independent of the actual source image or output image area geometries. This is accomplished by conceptually treating the definition of the output image area as a denominator and the definition of an object as a numerator. For example, if the output image area is defined as a rectangle, with a top left point of (0,0) and a bottom right point of (80,60) and a region referring to the upper left quarter would be defined with a top left point of (0,0) and a bottom right point of (20,15), would be internally transformed to describe a rectangle with a top left point of (0,0) and a bottom right point of (0.25, 0.25). The internal transformation is accomplished by treating the definition of the first rectangle as having dimensions 80×60 and the region having dimensions 20×15 and determining the relationship, i.e. the percentage of size, between the two.

Each of the "primitive" objects utilizes a QuickDraw data type. The RectTween "primitive" utilizes the QuickDraw RECT data type. The RECT data type is comprised of two sets of data items which represent two points on an X-Y coordinate system described above. A first set of data items represents the upper left most point while the second set of data items represent the lower right most point. Two RECT data definitions are required (SEE LINES 24–25), which represent the begin and end state of the object. As discussed above, the data provided in the RECT data definitions will be in relationship to the source image.

For IrisTween, a POINT data type along with an integer representing a radius are used to define a circle. Again, two circles are defined, the first at lines 31–32 and the second at lines 33–34. The two circles represent the begin and end state of the object and are defined in relationship to the source image.

For PolyTween, the POINT data type is used to define a set of points which make up a polygon. Again, two polygons are defined, the first at lines 41–43 and the second at lines 44–46. The two polygons represent the begin and end state of the object and are defined in relationship to the source image.

In each of the "primitive" object definitions, three integer dissolve values are defined. The dissolve values provide the information necessary for determining a pixel value, when the pixel will be derived from combining corresponding pixels from the two source image sequences. For example, with respect to RECTWEEN, on lines 21, 22 and 23, the integer value on line 21 represents a begin state, the integer value on line 22 represents an end state, and the integer value on line 23 represents a denominator value to which the values on lines 21 and 22 are associated. The denominator value allows for creating end states of fractional values where a combination of the pixels are being displayed. This allows for using a second transition in a transition list to complete the switch from the first sequence of images to the second sequence of images. The dissolve values only have meaning when a numerator value is combined with a denominator value. The generated values represent the object index as described above, where a 0 value represent showing the pixels from the first sequence of images and a 1 value represents showing pixels from the second sequence of images.

As an example of use of the dissolve values, suppose the value on line 21 is 0, the value on line 22 is 1 and the value on line 23 is 1. At the beginning of the transition the object index value is the value of line 21 divided by the value of line 23 or 0/1 or 0. Thus, only the pixel values from the first sequence of images are used to determine the value of a displayed pixel during the transition. At the end of the transition, the object index value is the value of line 22 divided by the value of line 23 or 1/1 or 1. Thus, only the pixel values from the second source sequence of images are used to determine the value of a displayed pixel during the transition. If the value on line 23 is 2, at the end of the transition, the object index value would be ½, thus the pixel value as displayed would be based on ½ the pixel value from the first source sequence sequence of images and ½ the pixel value from the second source sequence of images.

An analogy to the resource type definition is the structured data type. Structured data types are utilized in the PASCAL and C programming languages. A structured data type is typically comprised of several fields of different data types (e.g. integer, real or array) and has the attributes of being user definable and dynamic. The structured data type is dynamic in that a data element of that type may only have access to certain fields defined by the data type. The access to those fields being dependent on the value of a predefined key value. Similarly, the transition resource type definition describes a plurality of "primitive" transition types (or data types). The actual transition characteristics would be dependent on particular keys, in this case the names of the "primitive" transition types.

The transition resource definition is useful in that it provides a means by which objects can be dynamically defined. What is required is the definition of a data element of the transition resource type.

The transition resource type described in Chart A, is specific in the sense that objects may be selected from only one of the source image areas. A transition resource type may be defined so that selection may occur from both source image areas or a transition resource type may be defined so that different selection objects may be utilized.

An alternative means for creating a transition resource rather than using a resource type as described above would be to provide a graphical editor, e.g. much like those found in Draw or Paint software applications. Such alternative means for creating a transition resource may simplify the creation of a transition resource.

Transition Resource Data Element

A transition resource data element is a data item that is of the type TRNS. The specific data format of a transition resource data element is illustrated in Chart B.

```
                        CHART B
1    resource 'TRNS' (Transition name,"Transition name",
                     purgeable/nonpurgeable) {
2           Pixel Depth,
3           Source Image that is on Top,
4           Width of output image frame,
5           Height of output image frame,
6           { { First Source Image Area Begin State}, { First Source
Image       Area End State },
7           { { Second Source Image Area Begin State}, { Second
Source      Image Area End State },
8           {
9                  Object List
10          };
11   };
```

On Line 1, the resource type specification as well as the resource name are provided. Also, there is a purgeable/nonpurgeable selection. This refers to whether or not the code may be purged from memory when it is no longer executing. Line 1 provides information that is common to data elements for resources and is a format well known to developers of Macintosh compatible software.

Line 2 specifies the pixel depth. Pixel depth is a signal that the transition data element includes dissolve data. It is desirable to designate that a transition does not include dissolve data, since it will cause the transition resource sequence Application code to bypass processing concerning fades or dissolves. Line 3 specifies which source image will be "on top". Typically, source image 2 will overlay source image 1, but there may be circumstances where it would be advantageous where the source image 1 would overlay source image 2 (e.g. see the description of an iris-in transition below).

Line 4 specifies the width and line 5 the height of the output image area, measured in pixels. Typically, the width will be 80 and the height 60. As described above, the output image area as utilized here merely provides a frame of reference to the which the pixels in the source image area relate. Line 6 defines the object for source image 1 and line 7 defines the object for source image 2. The objects for source image 1 and source image 2 define trajectories of the respective source images through the output image pseudo-rectangle. As described above, trajectory refers to the visually apparent movement of the source image through the output image pseudo-rectangle.

Line 8 represents the beginning of the object list. The object list defines the geometric shapes from which regions will be selected for display from both the first and the second source image areas. The geometric shape chosen will dictate the data that would be provided.

For a rectangle, the object definition would look as follows:

```
RectTween {
        Begin Dissolve Numerator Value,
        End Dissolve Numerator Value,
        Dissolve Denominator Value,
        {Begin State of Rectangle}
        {End State of Rectangle}
        }
```

For an iris, the object definition would look as follows:
```
IrisTween {
        Begin Dissolve Numerator Value,
        End Dissolve Numerator Value,
        Dissolve Denominator Value,
        Begin State of Iris,
        End State of Iris
}
```

The state of the Iris would be defined as a Point, i.e. {x-coordinate, y-coordinate} and a radius. An example for a circle with radius 1 would be {0,0},1.

For a polygon, the object definition would look as follows:
```
PolyTween {
        Begin Dissolve Numerator Value,
        End Dissolve Numerator Value,
        Dissolve Denominator Value,
        Begin state of polygon,
        End state of polygon}
```

The state of the polygon would be defined in terms of a set of points. The points would be connected sequentially to define the desired polygon.

Charts C–E described below with respect to specific examples of transitions exemplify transition resource data elements.

As described above, the basic flow of creating a transition template involves the steps of selection, mapping and interpolation. Individually, each of these steps are known in the art of switching. Collectively, they have not been used together in the manner of the present invention. These steps are described in greater detail below.

Selection

Figure 12A:
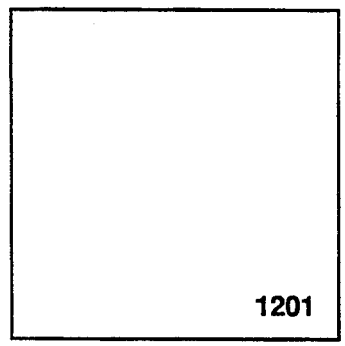
FIG. 12a illustrates a source image area as may be utilized in the preferred embodiment of the present invention.
Figure 12B:
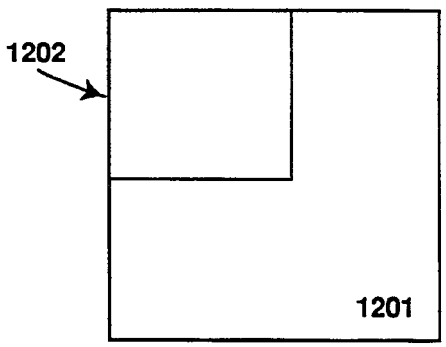
FIGS. 12b–12e illustrates selected regions of a source image area as may be utilized in the preferred embodiment of the present invention.
Figure 12C:
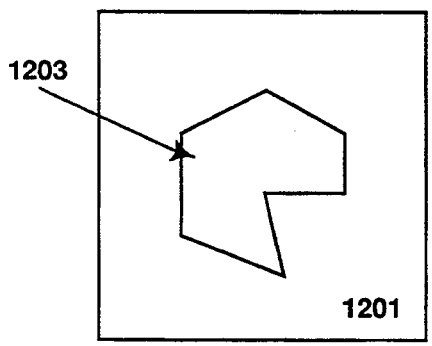
Figure 12D:
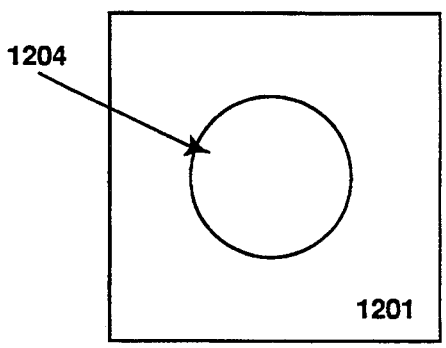

Selection is the process in which regions of a source image area are defined. The source image area to which regions are selected is determined by the "on top" parameter (line 3 of Chart A). Recall that except in the cases where dissolve parameters are defined, the selected regions of the source image area that is "on top" and within the output image area, will be displayed. Selection occurs during the creation of the transition template. In the preferred embodiment, selection is determined in two separate ways, by region and by color. FIG. 12a–12f illustrate concepts with regards to selection by region. FIG. 12a illustrates a source image area 1201. A source image area 1201 is a predefined area which represents a source sequence of images to be displayed. Two source image areas are defined by the transition resource type at lines 6–13 of Chart A. FIG. 12b illustrates a selected region, i.e. rectangle 1202.

Figure 12E:
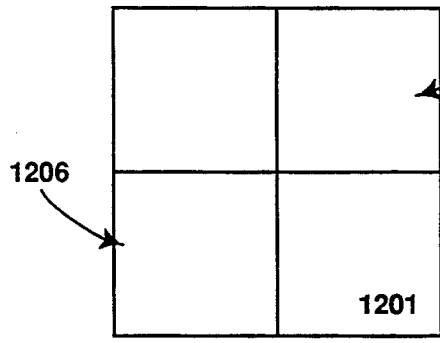
Figure 12F:
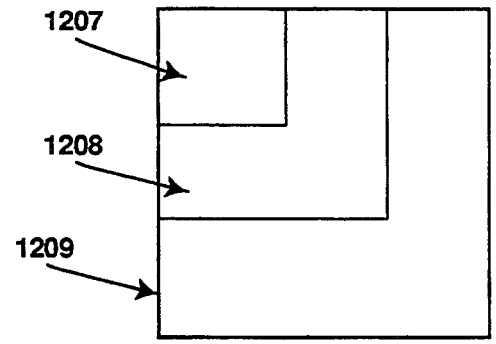
FIG. 12f illustrates an object in a beginning, intermediate and end state as may be utilized in the preferred embodiment of the present invention.

As described above, a selected region is by definition, portions of the source image area that may be displayed. A selected region is comprised of one or more objects; in effect, selection objects create selected regions of the source image area. In FIG. 12b the object is a rectangle, but may be other geometric shapes including polygons (Polygon 1203 illustrated in FIG. 12c) or ovals (Oval 1204 illustrated in FIG. 12d). FIG. 12e illustrates a selection region of two objects (rectangles 1205 and 1206).

Selected regions (via their corresponding selection objects) may vary over time. This enables various other types of special transitions. The variance over time is accomplished by defining a begin and an end state for an object via a selection object. Thus, in FIG. 12f, a rectangle 1207 defines a begin state of an object, rectangle 1208 defines an intermediate state of the object and rectangle 1209 defines the end state of the object. The rectangle 1208 was defined during the interpolation process which is described in more detail below. In the case of an opening iris (an "iris switch"), a selection object will comprise a first circle having a typically small diameter (begin state) and a second circle which typically has a diameter that is much larger than the source image area (end state).

In the preferred embodiment, the above definition applies to and is utilized by all source image sequences. A related concept is that of the output image area. As described above, the output image area is defined as the area through a sequence of images may be displayed. Only when a selected region of a source image area overlays the output image area, may that selected region be displayed. Thus, even though a selection object is larger than the output image area, only the portion within the output image area may be displayed. Within the output image area, the merging of the portion of the first sequence of images which will be transitioned, the portion of the second sequence of images which will be transitioned and the transition template will occur to create a third sequence of images (the transition sequence).

Selection by color is done "negatively". In selection by color, a list or range of colors is specified. As discussed above, this is accomplished by using a "selection rectangle" on an area of the source image so that all colors within the selection rectangle are placed on the color selection list. The colors on the selection list are termed key colors. Any pixel with a color value that matches a color from the list is removed from the selection region. For example, if the color selection list of source image 2 contains the color blue, all the blue pixels of a selected region of source image 2 are masked out so that the corresponding pixels from source image 1 are displayed. In other words, the blue pixels in the selected region of source image 2 are treated as being transparent.

However, it would be apparent to one skilled in the art to use selection by color "positively". A positive use would only allow the pixels of a source image that are on the color selection list to be displayed and all other pixels would be masked out. It would also be apparent to one skilled in the art to provide for the color selection list to change over time.

Interpolation

Interpolation refers to the process where intermediate states of 1) a selection region, via a selection object, 2) the trajectory of a source image area and 3) dissolve values are defined. In the interpolation process of the preferred embodiment, for most types of transitions interpolation occurs over time. In the case of a dissolve or fade switch the interpolation occurs over time, space and color.

As a video image is a sequence of static images, movement or animation can be perceived through changes in size or position of an object. The interpolation process takes as input the object definitions, (i.e. the begin and end states of the selection object) and processes them to define intermediate states for the objects. For example, if an object is defined as a rectangle with a begin state that has dimensions of 10—10 and an end state of 20×20, intermediary states would include rectangles with dimensions 11×11, 12×12, 13×13, etc. until the end state of 20×20 is reached. The exact number of intermediate states that are created is dependent on the interpolation method, the duration of the transition and on user defined parameters, e.g. extending the duration of particular frames. Typically, the begin state will be at time 0 and the end state will be at the end of the transition duration. For example, if the transition duration X is 3 seconds, based on the NTSC standard of 30 frames per second, 90 frames must be created (or interpolated). During the 90 frames, intermediary states of an object(s) are created in equal parts so that the transition occurs smoothly. Techniques for creating a smooth interpolation are known in the art. These intermediary states are recalculations of the position of the object in terms of the X-Y coordinates described above and with respect to the beginning and ending states of the object.

In the preferred embodiment, the default time for a transition is 2 seconds (or 60 NTSC frames). Thus, during the interpolation process, the time parameter will be 2 seconds. However, this parameter may be altered through the methods described above for changing the durations of the entire transition or an individual frame within the transition. Although the preferred embodiment utilizes a linear interpolation algorithm, other non-linear algorithms may be utilized without departing from the spirit and scope of the present invention. Such non-linear algorithms may create such effects as accelerated transitions at beginnings, ends or during the middle of a transition sequence.

Mapping

Mapping take either of two forms: spatial or by color. Spatial mapping refers to the placement of the source image areas in relation to the output image area. Spatial mapping allows arbitrary regions of source material to be placed at a particular location in the output image area while color mapping provides for determining pixel values when the two source image areas overlap within the output image area.

For spatial mapping, in many transitions, the first source image area and the second source image area completely overlay the output image area and the determination of which images are displayed depends on the "on top" parameter and the selected regions. However, as described above, the source image area has a trajectory defining a begin state and an end state. Thus, the source image area mapping with respect to the output image area, may change over time. For example, in a left to right push switch the first source image area moves from left to right while simultaneously the second source image area moves into the space vacated by the first source imaged area. This has the effect of the second sequence of images "pushing" the first sequence of images out of the output image area.

The source image area may be defined to create a push effect in any direction. Thus, the spatial mapping may cause movement of the source image that goes from left to right, right to left, up to down, down to up, or diagonally. As with selected regions, intermediate source image areas are created via interpolation throughout the transition.

Color mapping occurs when material from two sources overlaps in the output image area and dissolve parameters are defined. In color mapping the dissolve parameters of a selection object are interpolated in the manner described above to create an object index associated with each intermediate state (or frame of the transition template). The preferred embodiment utilizes a rule that if source A's object index is 1.0 and source sequence B's object index is 0, source A is visible. If A's object index is 0 and B's object index is 1.0, object B is visible. If each object index is 0.5, each pixel from the two sources is combined and the average color is determined—this is a cross-fade. In the simplest fade, where image B gradually becomes visible through image A, the selected region is the entire source image area. The spatial mapping of the respective source image areas is directly to the output image area. The index for rectangle A starts at 1.0 and gradually decreases to 0), while the index for rectangle B starts at 0 and gradually increases to 1.0.

It should be noted that other rules, e.g. if the object index is 1 the first sequence of images is displayed, may be employed without departing from the spirit and scope of the present invention.

Specific Examples of Transitions

What follows are specific examples of transitions that are utilized within the preferred embodiment. However it should be noted that it would be readily apparent to one skilled in the art that the methods and techniques described above may be used equally with digital audio data. Typically, the frames comprising a sequence of images also contains digital audio data. Thus, the digital audio data may be manipulated in a manner as described above with respect to digital video data. Examples of audio transitions would include fading up and down during the transition (analogous to a fade switch) or a cut from the audio data corresponding to the first source sequence of images to audio data corresponding to the second source sequence of images (analogous to a cut switch).

A Wipe Switch in the Preferred Embodiment

A wipe switch appears as a directional sweeping over of a first image source with a second image source. In a wipe switch the first image source remains static on the display area while the second image source overlays the display area from a predetermined direction, over time. For example, in a left to right wipe, the first source image will be displayed. At a first instant in time of the transition, the left most portion of the second source image will overlay the left most portion of the first source image. As the transition continues, more of the second source image will overlay the first source image, from a left to right direction. This will continue, until the entire first image is overlaid and the transition is complete.

A transition resource data item that defines such a wipe from left to right switch is illustrated in Chart C.

| CHART C |
|---|
| Line No. |
| 1     resource 'TRNS' (WipeLeft,"WipeLeft",purgeable) { |
| 2       1, |
| 3       secondOnTop, |
| 4       80, |
| 5       60, |
| 6       { {0,0,60,80}, }, |
| 7       { {0,0,60,80}, }, |
| 8       { |
| 9         RectTween { |
| 10           0,0,0, |
| 11           {0,−81,60,−1}, |
| 12           {0,0,60,80} |
| 13         }; |
| 14       }; |
| 15     }; |
| 16   }; |

It should be noted that a wipe may occur from any direction. For example to create a right to left wipe, the transition resource data item would simply change the positioning and/or state of the selection region.

For the transition to occur, a portion of the first sequence of images is chosen to merge with a portion of the second sequence of images to create a third sequence of images (the transition sequence). With respect to Chart C, line 2 indicates that the transition is not a dissolve and line 3 indicates that the second sequence of images is on top and thus the selection objects to be later defined will relate to the second source image area. Lines 4–5 define the base dimensions of the output image area. Line 6 defines a first source image area without a trajectory while line 7 defines a second source image area without a trajectory. Thus, in this instance there will be no interpolation of the source image areas. At line 9, a selection object is defined. Here the selection object is a RECTWEEN. The RECTWEEN selection object defines no dissolve values, so no object indices need be created through interpolation. The RECTWEEN selection object does defined a begin state (line 11) and an end state (line 12). Thus, interpolation of the selection object from its begin to end state occurs. As noted above, the duration of the transition will be a default of 2 seconds.

As there is no trajectory for the source image areas, the mapping of the respective source image areas is directly overlaying the source image area. Finally, wipe transition is created by merging the chosen portion of the first sequence of images, the chosen portion of the second sequence of images and a transition template generated in the selection, interpolation and mapping steps described above, to create the third sequence of images (i.e. the transition sequence).

An Iris Switch in the Preferred Embodiment

An Iris switch is an analogy to an opening of a lens iris, e.g. in the human eye or in a camera. It refers to the gradual opening of a visual aperture. Here, in the simplest form, the visual aperture is a circle where the first source sequence of images will be static (in the sense of translational movement) within the output image area. Over time, the aperture size, e.g. radius, will increase, displaying more of the second source sequence of images, until the transition is completed.

An Iris-out switch transition resource type data element is illustrated in Chart D1.

CHART D1

| Line No. | |
|---|---|
| 1 | resource 'TRNS' (IrisOut,"IrisOut",purgeable) { |
| 2 | 1, |
| 3 | secondOnTop, |
| 4 | 80, |
| 5 | 60, |
| 6 | { {0,0,60,80}, }, |
| 7 | { {0,0,60,80}, }, |
| 8 | { |
| 9 | { |
| 10 | IrisTween { |
| 11 | 0,0,0, |
| 12 | {30,40}, |
| 13 | 0, |
| 14 | {30,40}, |
| 15 | 50 |
| 16 | }; |
| 17 | }; |
| 18 | }; |
| 19 | }; |

An Iris-in is similar to an Iris-out except that the first sequence of images contracts to a predetermined point, exposing the second sequence of images. The begin state of a selection object, i.e. a circle with a sufficiently large radius, for the first source image area encompasses the entire source image area. The end state is a circle with a zero radius. The interpolation will cause the selection object of the first source image area to diminish to zero. Chart D2 illustrates an Iris-in transition resource data element.

CHART D2

| Line No. | |
|---|---|
| 1 | resource 'TRNS' (IrisIn,"IrisIn",purgeable) { |
| 2 | 1, |
| 3 | firstOnTop, |
| 4 | 80, |
| 5 | 60, |
| 6 | { {0,0,60,80}, }, |
| 7 | { {0,0,60,80}, }, |
| 8 | { |
| 9 | { |
| 10 | IrisTween { |
| 11 | 0,0,0, |
| 12 | {30,40}, |
| 13 | 50, |
| 14 | {30,40}, |
| 15 | 0 |
| 16 | }; |

-continued

CHART D2

| Line No. | |
|---|---|
| 17 | }; |
| 18 | }; |
| 19 | }; |

A Fade/Dissolve Switch in the Preferred Embodiment

An alternative use of the transition template would provide for fade. A fade transition occurs where the first source sequence of images gradually turns to (i.e. fades to) a predetermined color (e.g. black). Alternatively, the fade may be from the predetermined color to a second source sequence of images.

As described above, a fade switch merely utilizes a frame of a predetermined color as one of the source sequences of images. The transition template utilized is a series of frames going from white to black, with various shades of gray in between.

A dissolve switch would operate identically, except that the second source sequence of images would be an actual video sequence rather than a frame of a predetermined color.

A data element for the resource transition is described in Chart E.

CHART E

| Line No. | |
|---|---|
| 1 | resource 'TRNS' (Dissolve,"Dissolve",purgeable) { |
| 2 | 8, |
| 3 | secondOnTop, |
| 4 | 80, |
| 5 | 60, |
| 6 | { {0,0,60,80}, }, |
| 7 | { {0,0,60,80}, }, |
| 8 | { |
| 9 | { |
| 10 | RectTween { |
| 11 | 0,1,1, |
| 12 | {0,0,60,80}, |
| 13 | {0,0,60,80} |
| 14 | }; |
| 15 | }; |
| 16 | }; |
| 17 | }; |

A Push Switch in the Preferred Embodiment

A push switch involves movement of the source image area in relation to the output image area. The effect is that the second source sequence of images pushes the first sequence of images out of the viewable display. What occurs is that the mapping of the source image area to the output image area changes over time. In the previously described switches, no such changes occur.

What occurs is that the mapping of the image area for the first sequence of images moves in a predetermined direction out of the output image area. The space vacated by the first sequence is consumed by the second source sequence of images. For example, if the first sequence of images is moving down, the bottom of the first sequence of images would move out of the bottom of the output image area, while the bottom of the second sequence of images would move into the top of the output image area. The same would would true for bottom to top, left to right or right to left push transitions.

A data element defining a push transition is described in Chart F.

CHART F

| Line No. | |
|---|---|
| 1 | resource 'TRNS' (PushDown, "PushDown",purgeable) |
|  | { |
| 2 | 1, |
| 3 | secondOnTop, |
| 4 | 80, |
| 5 | 60, |
| 6 | { |
| 7 | {0,0,60,80}, |
| 8 | {60,0,120,80}, |
| 9 | }, |
| 10 | { |
| 11 | {−60,0,0,80}, |
| 12 | {0,0,60,80}, |
| 13 | }, |
| 14 | { |
| 15 | }; |
| 16 | }; |

A Multi-Object Switch in the Preferred Embodiment

Multi-Object regions can be defined to create custom transitions. For example, a barn door transition would require the definition of two objects, e.g. rectangles, each having a begin and an end state. Here, a left rectangle may have begin state (top left: 0, 0; bottom right: 1.0, 0) and end state (top left: 0, 0; bottom right: 1.0, 0.5); while the right rectangle may have begin state (top left: 0,1.0; bottom right: 1.0, 1.0) and end state (top left: 0, 0.5; bottom right 1.0, 1.0).

In this example, the "barn doors" would reveal the first source sequence of images, so that when closed, the second source sequence of images would be displayed. Each of the doors would essentially be a simultaneous wipe, that terminated in the middle of the output image area. Chart G1 illustrates a barn door data element.

CHART G1

| | |
|---|---|
| 1 | resource 'TRNS' (BarnDoors,"BarnDoors",purgeable) { |
| 2 | 1, |
| 3 | secondOnTop, |
| 4 | 80, |
| 5 | 60, |
| 6 | { {0,0,60,80}, }, |
| 7 | { {0,0,60,80}, }, |
| 8 | { |
| 9 | RectTween { |
| 10 | 0,0,0, |
| 11 | {0,−81,60,−1}, |
| 12 | {0,0,60,40} |
| 13 | }; |
| 14 | RectTween { |
| 15 | 0,0,0, |
| 16 | {60,81,60,161}, |
| 17 | {60,41,60,121} |
| 18 | }; |
| 19 | }; |
| 20 | }; |
| 21 | }; |

The preferred embodiment further allows for the interpolation of multiple selections sequentially in time as well as sequentially in space. One example of this would be a version of the barn door wipe just discussed—say the left "door" closed first, then the right "door" after (compared to both of them closing at once, concurrently in space). The left door closing takes place over the first half of the transition time, the right door closing takes place over the second half of the transition time. This effect is created by defining a first rectangle with a start state at the extreme left and an end state in the middle of the output image rectangle followed by a rectangle with a start state at the extreme right with an end state in the middle of the output image rectangle. Such a data element is illustrated in Chart G2.

CHART G2

| | |
|---|---|
| 1 | resource 'TRNS' (BDLR,"BDLR",purgeable) { |
| 2 | 1, |
| 3 | secondOnTop, |
| 4 | 80, |
| 5 | 60, |
| 6 | { {0,0,60,80}, }, |
| 7 | { {0,0,60,80}, }, |
| 8 | { { |
| 9 | RectTween { |
| 10 | 0,0,0, |
| 11 | {0,−81,60,−1}, |
| 12 | {0,0,60,40} |
| 13 | }}, |
| 14 | { |
| 15 | RectTween { |
| 16 | 0,0,0, |
| 17 | {60,81,60,161}, |
| 18 | {60,41,60,121} |
| 19 | }}; |
| 20 | }; |
| 21 | }; |
| 22 | }; |

Titling in the Preferred Embodiment

Titling may be accomplished by using any type of transition. One common form of titling is to see a sequence of images, e.g. credits in a move, scrolling through the another sequence of images. This type of titling is accomplished in the preferred embodiment by using a wipe transition resource which wipes the second source of images completely across the first source of images within the output image area. This differs from the wipe described above in that the second source sequence of images would roll completely through the output image frame, rather than stop when it overlays the first source sequence of images. The second source sequence of images would have the desired titling. As is common in titling, e.g. when the credits are shown at the end of a movie, the first source images are displayed "underneath" the titling. This may be accomplished by selecting all colors except the coloring of the lettering in the title frames. As described above, colors that are selected become transparent when combined with the first source sequence of images and the transition template to create the transition. Such titling transition data element is illustrated in Chart H. In Chart H the titling would roll from the top of the display area down through the bottom.

CHART H

| | |
|---|---|
| 1 | resource 'TRNS' (Titling,"Titling",purgeable) { |
| 2 | 1, |
| 3 | secondOnTop, |
| 4 | 80, |
| 5 | 60, |
| 6 | { {0,0,60,80}, }, |
| 7 | { {0,0,60,80}, }, |
| 8 | { |
| 9 | RectTween { |
| 10 | 0,0,0, |
| 11 | {61,80,121,80}, |
| 12 | {−61,80,−1,80} |
| 13 | }; |

-continued

CHART H

```
14
15        };
16      };
17    };
```

A second effect that may be useful for titling is to keep certain portions of the title on the screen for a longer period of time, e.g. the title of a move. This can be accomplished simply by determining the location in the transition template where the title would be centered, and extending the duration of that frame. The steps to accomplish this were described above with reference to the dicon information window.

Combining Transitions

Besides multiple objects, multiple transitions can be coupled together to create a single, transition. For example, a fade to black from a first sequence of images (creating a first half of the target transition) can be combined with a fade from black to a second source sequence of images (creating a second half of the target transition) so that a smooth transition from the two source sequence of images is enabled. An example of this would be when a single sequence of images needs to be broken-up into two sequences of images. This type of transition may be particularly useful when a sequence of images is interrupted due to a exhaustion of storage media (e.g. end of tape) or when there will be a known pause or break in the sequence of images.

This will involve the following steps:
1. Use light to dark fade transition resource to create an intermediate sequence of images and a first source sequence of images and a single frame darkened frame as a second source.
2. Use light to dark fade transition resource to create a target sequence of images using single darkened frame as first source and intermediate sequence of images as the second source.

Figure 13:
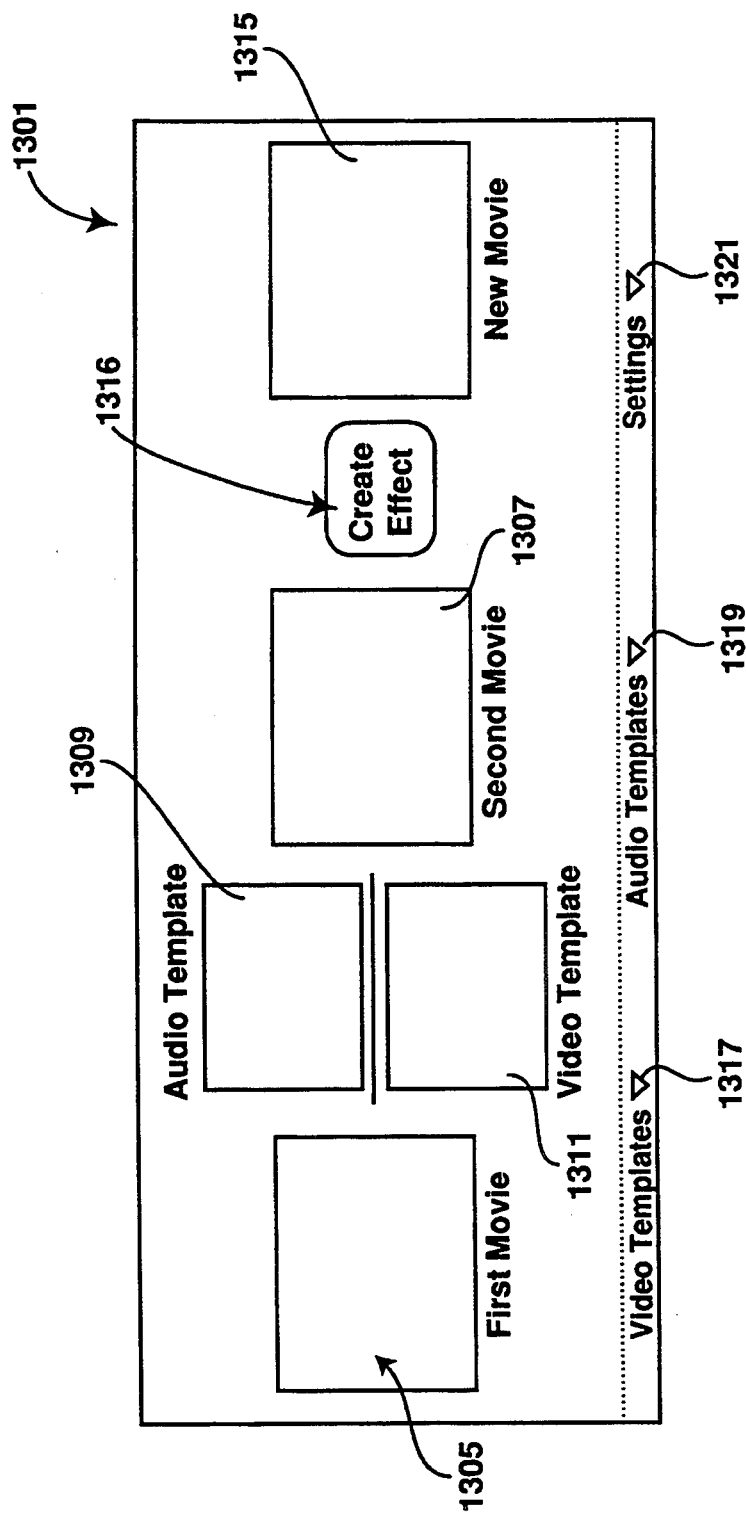
FIG. 13 shows a transition window containing an audio template window and a video template window.

The invention provides an improved method for controlling the transition of audio information when transitioning between a first stream of audio information and a second stream of audio information. Typically, this information is in the form of digital audio information which may be digitally created or digitized analog audio information. The invention provides a method and apparatus for controlling the audio transition by a template which describes the manner in which the audio signals of the two streams are modified during a transition between the first stream and the second stream of audio information. In a manner similar to the templates described above, the audio template is a resource which specifies the temporal modifications occurring to the audio signals during the transition. The resource may be used by a user to create transitions with the exact template or by modifying the template to create a modified resource. The resource is available for use generally for creating many different transitions between different audio signals and may be reused as often as is necessary; in this sense the resource acts as a generic system tool. FIG. 13 shows a transition window 1301 which contains an audio template window 1309; this audio template window 1309 receives an iconic and animated representation of the audio template which is selected to control the transition between the first movie and the second movie; it will be appreciated that the first movie and the second movie may each comprise audio and video information or merely audio information. The transition window 1301 further includes a video template window 1311 for receiving an iconic and animated representation of a video template to describe the manner in which the video transition occurs between the first movie and the second movie. Also shown in window 1301 is a first movie window 1305 and a second movie window 1307 for receiving a dicon representing the first movie and a dicon representing the second movie into the two respective windows 1305 and 1307. The create effect button 1316 causes the computer system to create the transition between the first movie and the second movie by using the audio template to compute the audio transition and by using the video template to create the video transition both of which are combined into a new movie containing at least the transition and often including a portion of the first movie as well as a portion of the second movie. The video template has been described above and the following description will focus on aspects relating to the audio template. It will appreciated that the transition window 1301 is typically displayed on a display means such as a video display which is coupled to the computer controlled display system of the present invention. Also shown in FIG. 13 are buttons 1317, 1319 and 1321 each of which when activated cause a menu to appear for their respective items. In particular, the video template button 1317 when activated causes the display of a menu containing various video templates which are available for selection, which menu may be displayed in a window such as the window 1435 which contains various different video templates (see FIG. 14b).

Figure 14A:
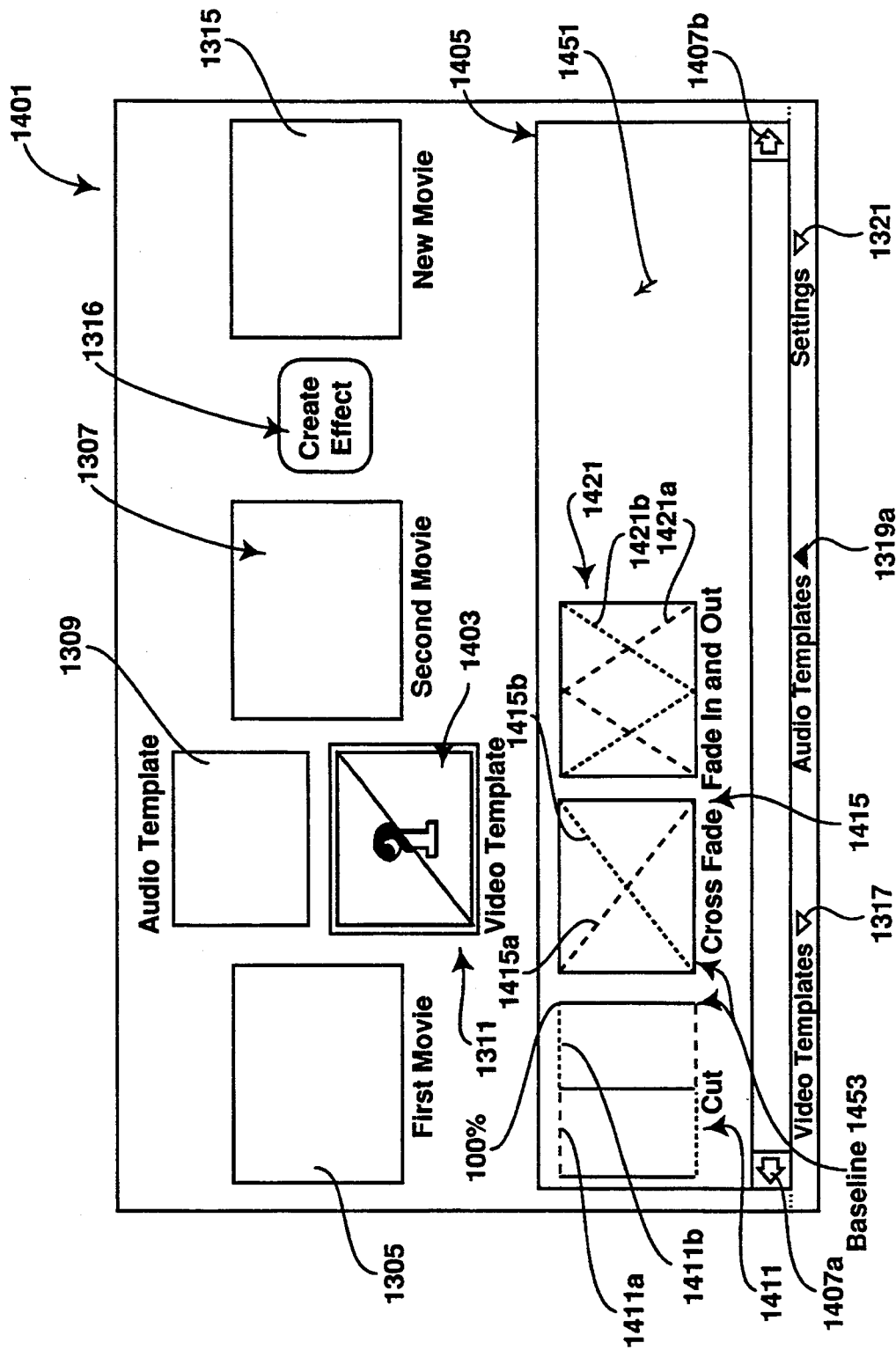
FIG. 14a shows a transition window with representative audio templates.
Figure 14B:
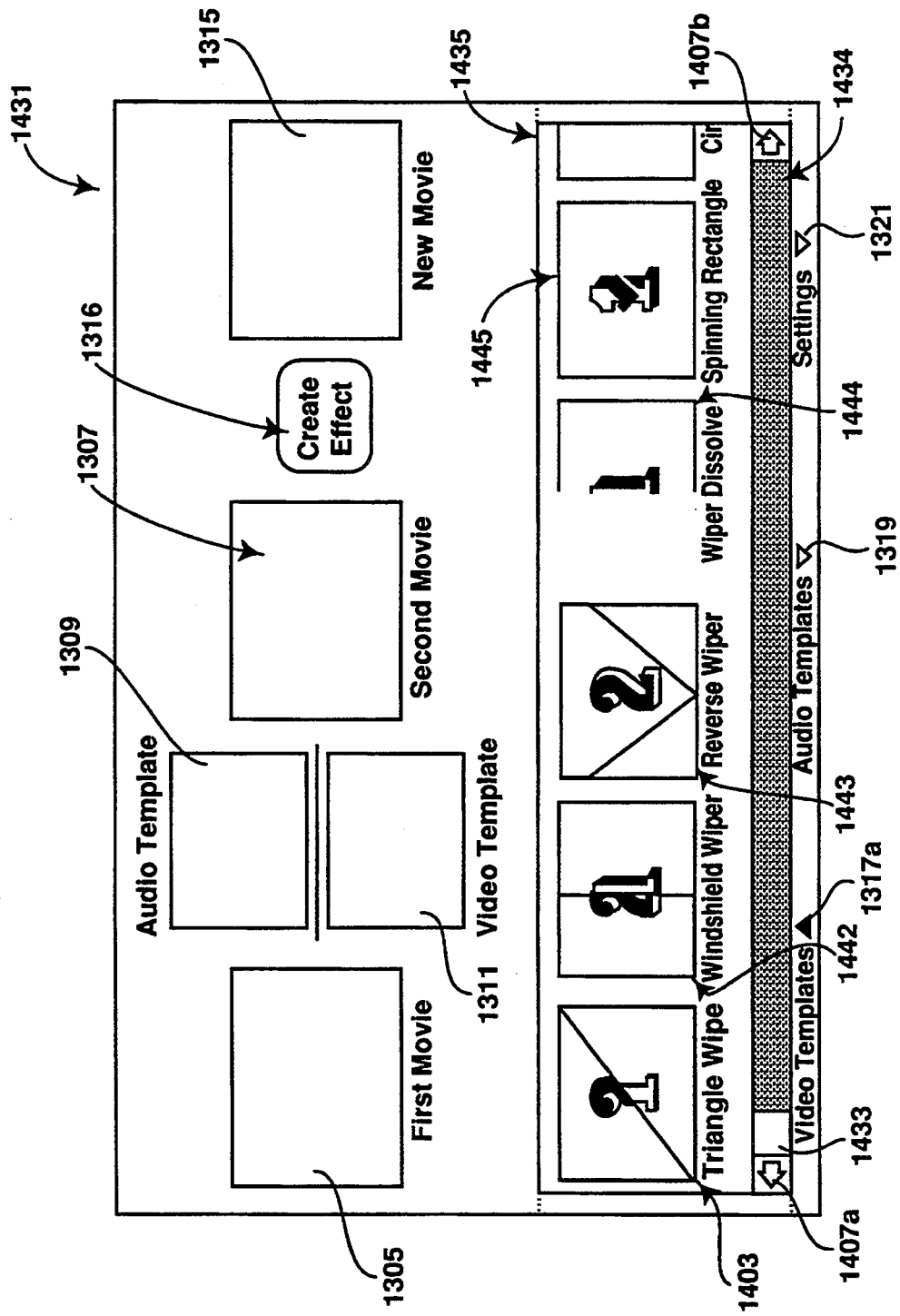
FIG. 14b shows a transition window with representative video templates.

FIG. 14a shows a transition window 1401 containing a menu window 1405 which contains some of the various possible audio templates which may be selected by the user in transitioning from the first movie to the second movie. As noted above, this menu window 1405 may be activated by selecting the audio templates button 1319 to cause the window to appear. This selection may occur by placing the cursor 1451 over the button 1319 and signalling to the computer to make the selection (this signal may occur by pressing a button on a mouse or other means described and referred to above). Note that when the audio templates menu window 1405 is displayed that the button for getting the audio template window has changed to an up arrow 1319a as shown in FIG. 14a. Other template menus may be selected by activating the appropriate button such as the video templates button 1317. Also note that a video template 1403 has been selected by placing an iconic representation of that template into the video template window 1311 as shown in FIG. 14a. This occurs in the normal fashion of placing the cursor over the iconic representation of the video template (which may be obtained by bringing up the video template menu 1435 as shown in FIG. 14b) and selecting the iconic representation and dragging that representation into the video template window 1311. The computer system of the present invention can easily differentiate between a video template and an audio template by noticing the data type of the template. This allows the computer to reject any attempt to place an audio template into the video template window 1311 and similarly prevents the user from placing a video template into the audio template window 1309. The template menu window typically includes scrolling arrows 1407a and 1407b which allow the user to scroll through the various templates which are displayed within the window when the window can not show all of the the possible available templates, which situation exists in the video template menu window 1435 shown in FIG. 14b.

Figure 15A:
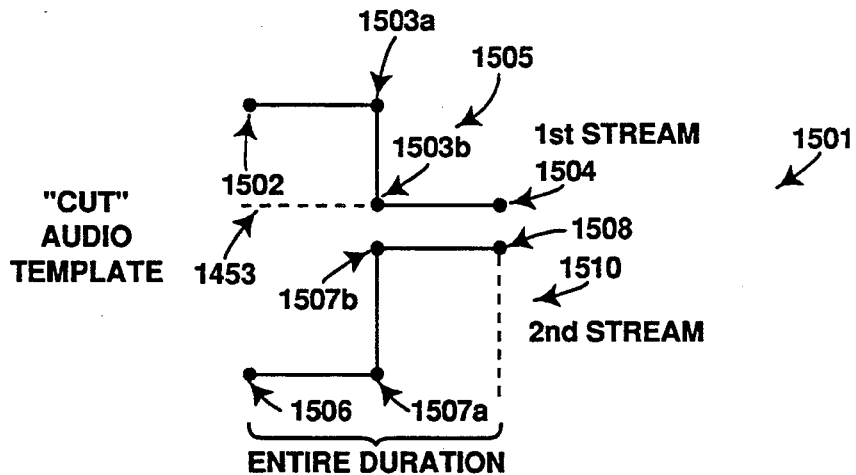
FIG. 15a shows the two components of the "cut" audio template, one component for the first audio stream and the other component for the second audio stream.
Figure 15B:
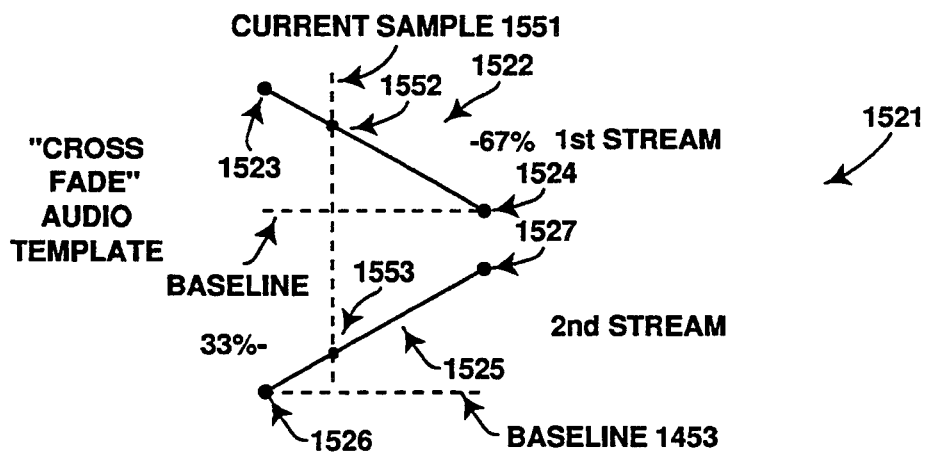
FIG. 15b shows the two components of the "cross fade" audio template.
Figure 15C:
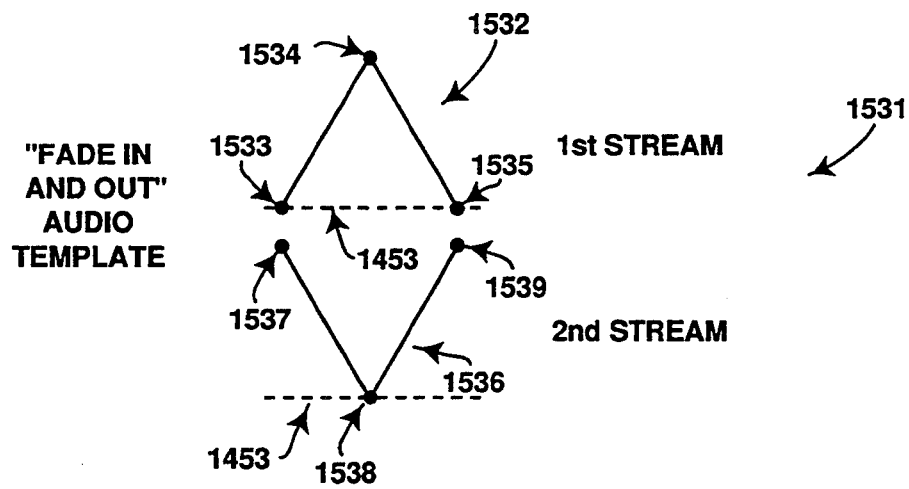
FIG. 15c shows the two components of the "fade in and out" audio template.

The audio template menu window 1405 includes three different ionic (and have visual) representations of audio templates, implemented as audio transition resources, which will be described in detail below. The iconic representation shows a graph in this embodiment, and, in another embodiment described below, a color enhanced, animated visual and auditory representation is used for each template. These three audio transition templates are the cut audio template 1411, the cross fade audio template 1415, and the fade in and out audio template 1421. Each of these templates has two separate curves for controlling the two different streams of audio information. As shown in FIG. 14a, the cut audio template includes curves 1411a and 1411b, wherein the curve 1411a (shown as a dashed line where the dashes are longer than the dashes for the dashed line for the curve 1411b) applies to the first audio stream of information and the second curve 1411b applies to the second stream of audio information. Each of these curves may be considered an envelope through which the audio information is analyzed and modified in the manner described below. Similarly, the cross fade audio template 1415 includes two curves 1415a and 1415b. The two different curves of each of these audio templates shown in window 1405 are shown separately in FIGS. 15a, 15b and 15c. In particular, FIG. 15a shows the two curves of the cut audio template, where curve 1505 is the same as curve 1411a and curve 1510 is the same as curve 1411b. Similarly, curve 1522 is the same as curve 1415a and curve 1525 of FIG. 15b is the same as curve 1415b of FIG. 14a. Finally, FIG. 15c shows the two different curves for modifying the first and the second stream for the fade in and fade out audio template 1421 of FIG. 14a.

Each audio template includes not only its visual (iconic) representation but also an auditory representation in the sense that two standard audio streams may be provided for testing/hearing the effect of the audio template. These two standard audio streams may be any two streams of audio information which produce two different sounds which can be easily distinguished; it should be relatively easy to distinguish between the two sounds in order to indicate to the listener what effect the audio transition has. In a preferred embodiment, these two different streams are audio information of a person singing the number "1" for the first stream and another person singing the number "2" for the second stream. The user may hear and test the audio template by activating the play mode of the template. In the preferred embodiment this is done by "double clicking" the desired iconic representation of the audio template. Double clicking involves positioning the cursor over the desired representation (e.g. cut template 1411) and then rapidly pressing a button twice while the cursor is over the representation. This causes the two standard test streams to be played aloud through the selected audio template. This method of testing a template is also used for testing the video templates and the rate transition templates described below.

The manner in which these templates are created and the manner in which they modify the audio stream of information will now be described. The cut audio template 1501 includes the curve 1505 which is specified by a transition resource and the curve 1510 which is specified by a second transition resource (although these two resources would normally be stored and handled together as one resource). The curve 1505 connects the points 1502, 1503a, 1503b, and 1504, and these points may be used to specify the curve of 1505 in a transition resource for the audio template by specifying the points and the slopes or intercepts of the lines connecting the points in the manner well known in the prior art. The height of a point along the curve 1505 above the baseline 1453 represents the percentage of the first audio stream which is used in the combination of the first and second stream for the transition. Similarly, for the second stream the height of a point along the curve 1510 above the baseline 1453 will determine the percentage of the second stream of audio information which is provided in the combination of the first and second stream at each sample point. This is also show in FIG. 14a for the cut template 1411 where the base line 1453 is shown at the bottom of the cut template: and the notation "100%" is shown at the top of the cut template 1411. Thus, it will be appreciated that in the first half of the cut audio template the first stream of audio information is applied 100% to the combination and the second audio stream is applied 0% such that the combination during the first half of the transition will be only 100% of the first stream of audio information. During the second half of the transition, 0% of the first stream is applied to the combination and 100% of the second stream is applied to the combination such that 100% of the second stream is applied as the only output from the system such that none of the first stream is heard during the second half of the transition. It will be appreciated that the transition curve is applied during the entire duration of the transition such that the location of the current sample of the audio stream is applied relative to its location to the template curve. For example, if the current sample is 50% through the stream of information (where 0% indicates the beginning of the stream and 100% indicates the end of the stream) then the point which is 50% along the transition template curve is used to determine the template's "y" value which represents the height or percentage of the template curve which is used to modify the audio value by taking that percentage of the audio value at that current sample point.

This is shown also in FIG. 15b which illustrates a current sample 1551 and its intersection along the juxtaposed (in time) audio templates 1522 and 1525 for the first stream and the second stream of audio information. As shown in FIG. 15b, the current sample 1551 in the two streams has an intersection at point 1552 for the first stream and point 1553 for the second stream, and these intersections indicate a value (height value) of 67% for the current sample in the first stream and 33% for the current sample in the second stream such that the combined audio signal during the transition at this point in the transition will be 67% of the audio information from the first stream and 33% of the audio information from the second stream. It will be appreciated from FIG. 15b that these height values were calculated from the respective baseline 1453 shown in FIG. 15b.

The next sample after sample 1551 will use something less than 67% (e.g. 66%) of the audio value in the first stream and something correspondingly more than 33% (e.g. 34%) of the second stream for the combined (resultant) value. It will be understood that the percentage is multiplied against the audio value to obtain a modified audio value (e.g. 50% of 200 = 100, where 200 is the original audio value in the sample). It can be seen from the cross fade template that the first stream starts at 100% at the beginning of the transition and smoothly (e.g. slope of 1) decreases to 0% at the end of the transition, while the second stream starts at 0% at the beginning of the transition and smoothly increases to 100% at the end.

Figure 22:
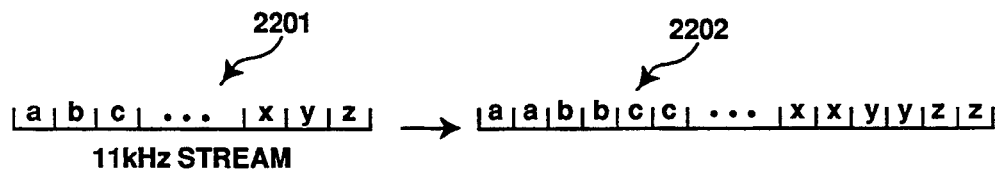
FIG. 22 shows the process the invention uses to convert from audio data having one format to audio data having another.

It will be appreciated that each sample in both streams is processed relative to its location in the stream. Consequently, the invention takes into account the sample rate of the digital audio information in order to assure that both streams have the same resolution in order to properly combine the signals over time. In the typical embodiment of the invention, the invention attempts to preserve the higher resolution when presented with two streams having different parameters in terms of resolution. For example, if one stream of audio information has a sampling rate at 11 kHz (see stream 2201) and the other audio steam is at 22 kHz then the invention merely doubles each sample (e.g. sample "a" or "b", etc.) in the stream having a resolution of 11 kHz so that the resulting stream (see stream 2202) is equivalent to the 22 kHz audio stream which has twice as much resolution. This is shown in FIG. 22, where each sample is repeated once, the copy being placed just after the original. Similarly, if one stream of audio information contains 8 bit values in the other stream contains 16 bit values, then the 8 bit stream is modified by adding eight least significant bits in order to preserve the higher resolution 16 bit audio stream. In the preferred embodiment, the first stream is in stereo and the second stream is in stereo and consequently the first stream contains a left audio stream and a right audio stream and the same is true for the second stream. If one stream in either the first or second stream is mono, then the mono channel is duplicated to two channels to provide the same mono stream for combination with the two stereo streams in the second stream of audio information. It is noted that, as an alternative, the invention may use the lower resolution as the common standard and thus, in the case of 11 kHz and 22 kHz streams, every other sample in the 22 kHz stream would be discarded (or every two samples would be averaged); in the case of 8 bit and 16 bit streams, the 8 least significant bits of each 16 bit value are removed from each sample in the 16 bit stream.

It will be appreciated that the present invention proceeds through each stream sample by sample and computes the modified audio value based on the template resource for each sample. Given the audio template 1522 for the first stream as shown in FIG. 15b, it can be seen that each succeeding sample (moving from left to right) will receive a slightly lower percentage and thus the first stream of audio information will have its values gradually reduced from a maximum of 100% all the way to 0% since point 1524 is on the base line as show in FIG. 15b and as shown in FIG. 14a (see cross fade audio template 1415). Similarly, each succeeding sample in the second stream, where the cross fade audio template is used, will receive a slightly increasing percentage due to the increasing nature of the audio template 1525 show in FIG. 15b. In a typical embodiment, a segment of the first stream which is within the transition portion of the stream is processed by determining the resultant audio value from the template and a similar size segment from the second stream is similarly processed using the template for the second stream and then the first stream's resultant value and the second stream's resultant value for each sample within the segment is added to obtain the combination, and then the invention proceeds to process a further segment of the first stream and a further segment of the second stream until all audio samples within the transition portion of the streams have been processed.

Many techniques may be used to implement the audio templates described above, including a resource as described above for the audio template in which key points describing the curve, along with slopes for lines interconnecting the key points, may be used to define the audio curves which serve as an "envelope" for the audio signal which are used to modify the audio signal. Alternatively, a function in $x$ and $y$ may be provided for describing the audio template curve. Using well known programming techniques, if key control points are used to define the shape of the curve and straight lines (or well known curves) interconnect these key control points, one could easily allow the user to modify the shape of the curves by changing the location of the control points to thereby modify the audio template, making the audio template user modifiable.

It will be appreciated that the visual representation of the audio template, such as the audio template 1415 shown in window 1405, provide the user with feed back about the properties of the audio template as well as the likely result of using the template. Moreover, the two sample audio sounds which are used to test the effect of the audio template (e.g. the first stream containing a person signing "1", "1", . . . and the second stream containing a person signing "2", "2", . . . ) provide the user with an auditory feedback about the properties of the audio template. As described above, the user selects the desired audio template by positioning the cursor 1451 over the representation of the desired audio template in the template menu window 1405, selecting the representation and by moving the cursor while keeping the representation selected (e.g. keeping a mouse button depressed to keep the representation selected while moving the mouse which moves the cursor) thereby moving a copy of the audio template out of the menu window 1405 and over into the audio template window 1309.

Figure 19A:
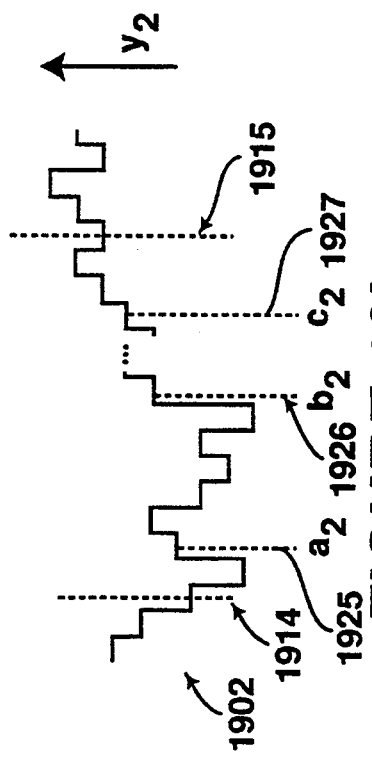
FIGS. 19a, 19b, 19c, 19d, 19e and 19f show a particular embodiment of the present invention in which the information from a rate transition template is mapped to a transition template in order to create the transition between two sequences of information according to the rate transition template.
Figure 19B:
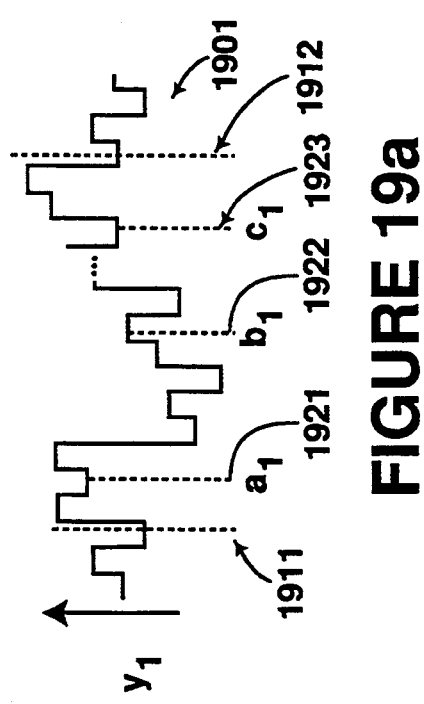
Figure 19C:
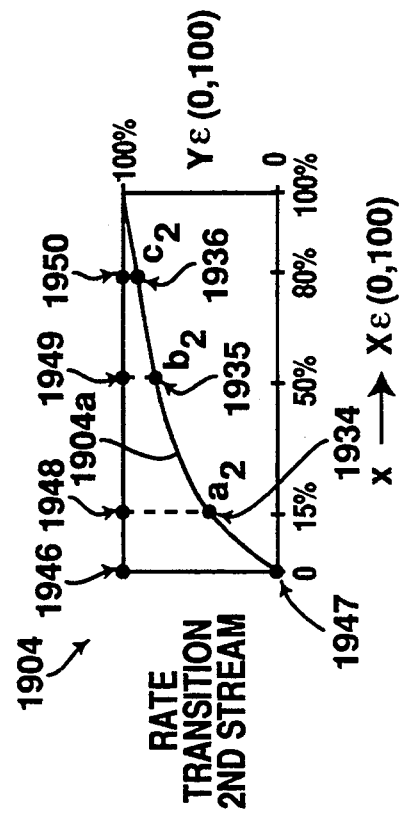
Figure 19D:
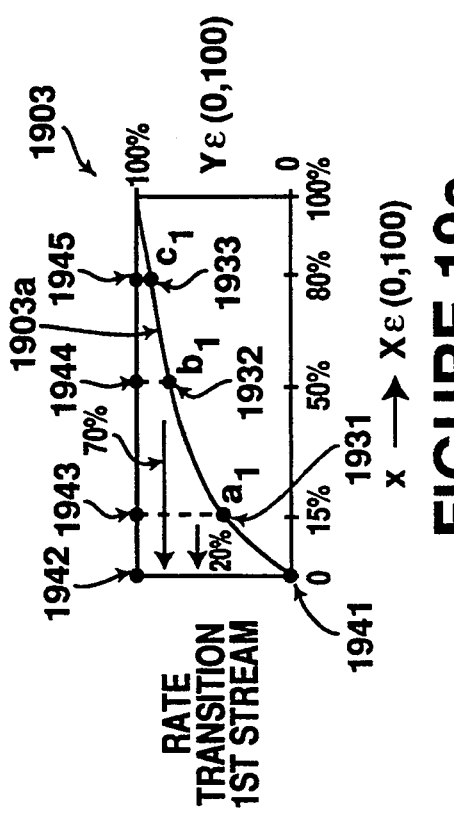
Figures 19E, 19F:
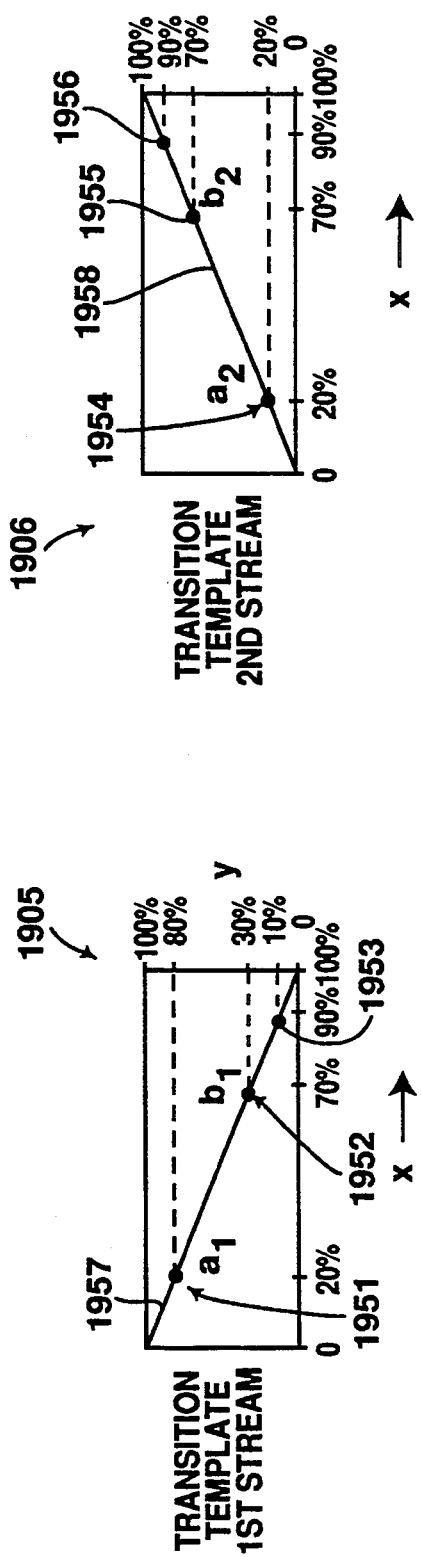
Figure 20:
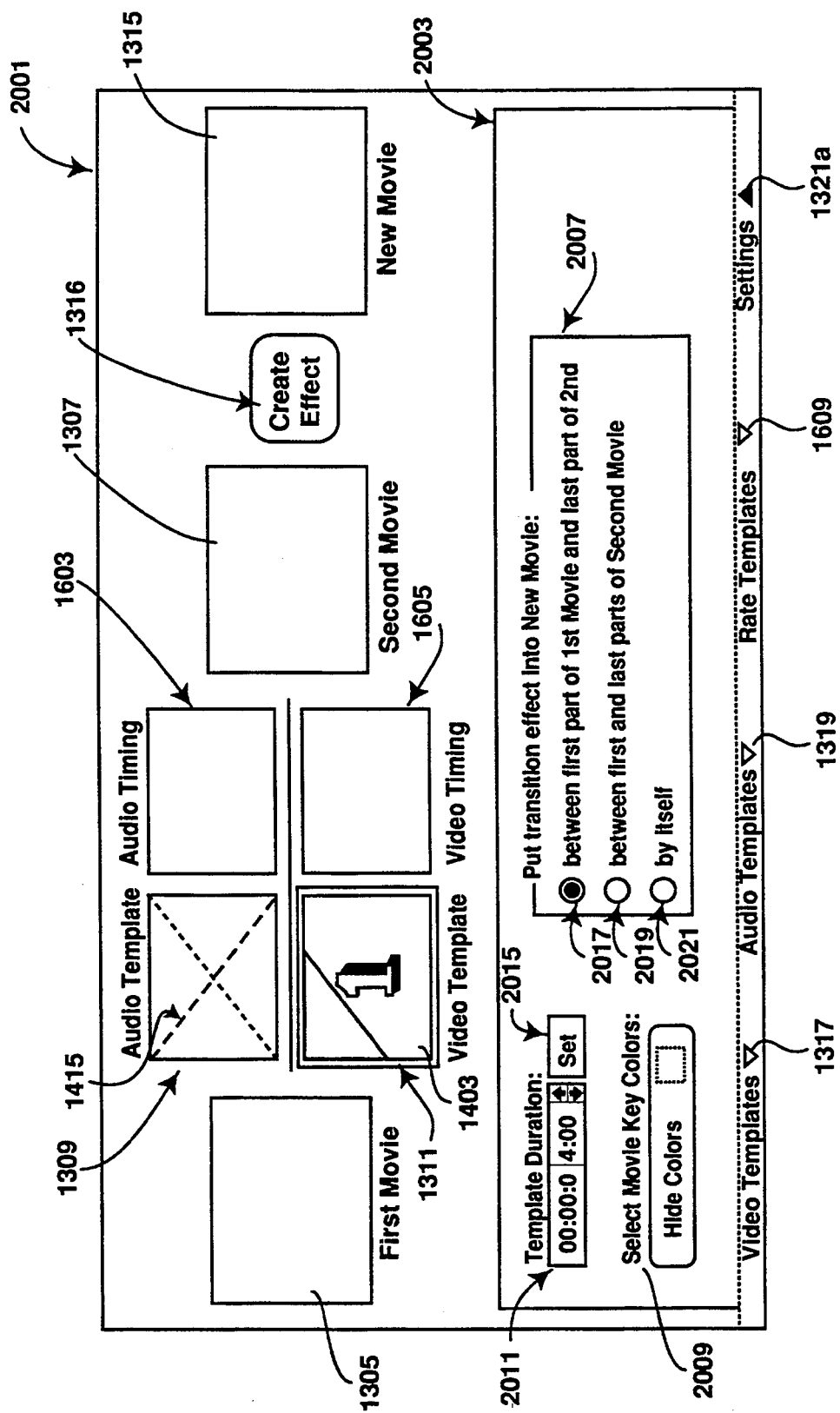
FIG. 20 shows a transition window containing controls for placing the transition into a sequence of digital information.

FIG. 20 shows another aspect of the present invention by showing the settings window 2003 which includes means for modifying the duration of the template and for controlling the location of the transition relative to the first and second streams or sequences of digital information. That is, the settings window 2003 allows the user to control the duration of the template and to determine whether the transition is between the first and second streams or between the beginning and end of the first stream or between the beginning and end of the second stream or some place else or by itself. The user make typically specify the duration of the template by typing into the duration window 2011 or by using the arrows to the right hand side of that window in order to set the duration of the template. Once the user is satisfied with the time which was entered into the window 2011, the user activates the set button 2015 by positioning the cursor over that button and activating a switch to indicate the activation of the set button 2015. In a similar manner, the user activates buttons 2017, 2019 or 2021 depending on where the user desires to place the transition within the two streams of digital information. The computer system of the present invention merely locates the resulting transition values determined in the manner described above next to the portion of stream of information where the transition was excerpt from. This may be observed from FIG. 19 which shows two audio streams of information, each of which has a portion designated for use during the transition and each of which has temporal portions outside of that designated portion which will not be used for the transition. The user may be presented with a time line of the audio streams or video streams (available in the prior art) and may select a portion which will be used for the transition and the remaining portion may be merged with the transition or discarded.

Figure 23A:
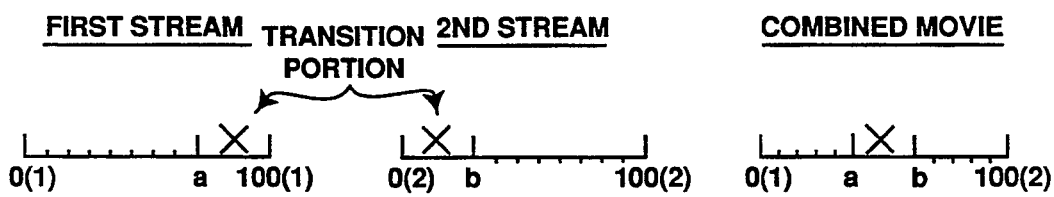
FIGS. 23a, 23b, 23c and 23d show various ways of combining the first and second streams (of audio, video or both) and various ways of positioning the transition.
Figure 23B:
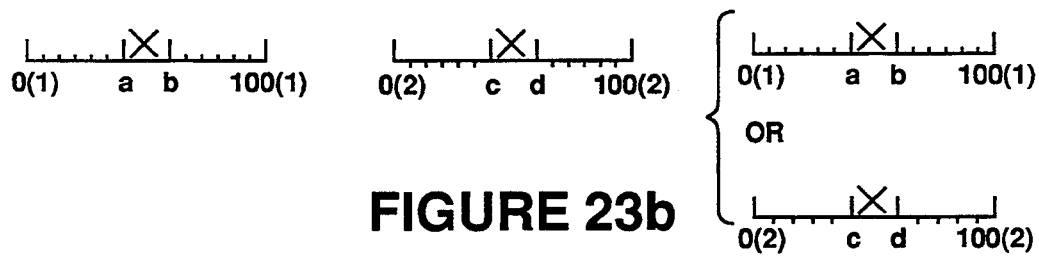
Figure 23C:
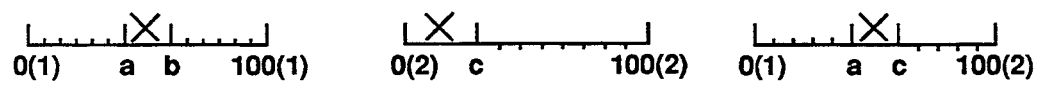
Figure 23D:
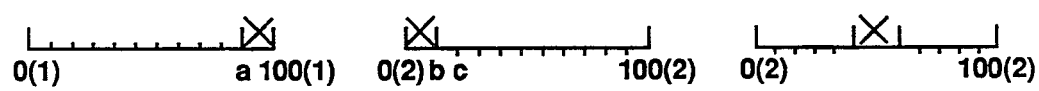

In a default mode of the present invention, the user sets the duration and that duration specifies a certain period of time which will be taken from the end of the first stream of information and from the beginning portion of the second stream of information, those two portions being used for the transition. The transition will then be determined according to the present invention and the transition which results will be merged between the first part of the first stream of information which was not selected for use during the transition and the second part of the second stream which was not selected for use during the transition. This default mode, shown in FIG. 23a, may be selected by activating the button 2017 shown in FIG. 20. Alternatively, the user may position the transition between first and last parts of the second stream (see FIG. 23d); this occurs by selecting the button 2019 shown in FIG. 20. In this mode, the user will typically create the transition out at the ending part of the first stream and the beginning part of the second stream in the manner described above except that the resulting transition will be sandwiched between the first and last parts of the second stream of information by merely placing the resulting transition stream into the middle of the second stream of information using well known audio and video data manipulation techniques. Alternatively, the combination shown in FIG. 23c may be achieved by placing the portion designated as the first stream which is to be used to compute the transition within the first stream (merely by moving the pointer to the stream to the proper location within the stream before computing the transition). This causes the frames/samples within the designated portion to be used for the transition portion itself and then the combination is made by joining the first stream up to point "a" of FIG. 23c to the resulting transition and joining the portion of the second stream after point "c" to the end of the resulting transition. It will be appreciated by those in the art that many digital processing techniques are available for editing streams of audio or video information and that these techniques may be utilized in conjunction with the methods and apparatus described for providing audio and video transitions.

Figure 3:
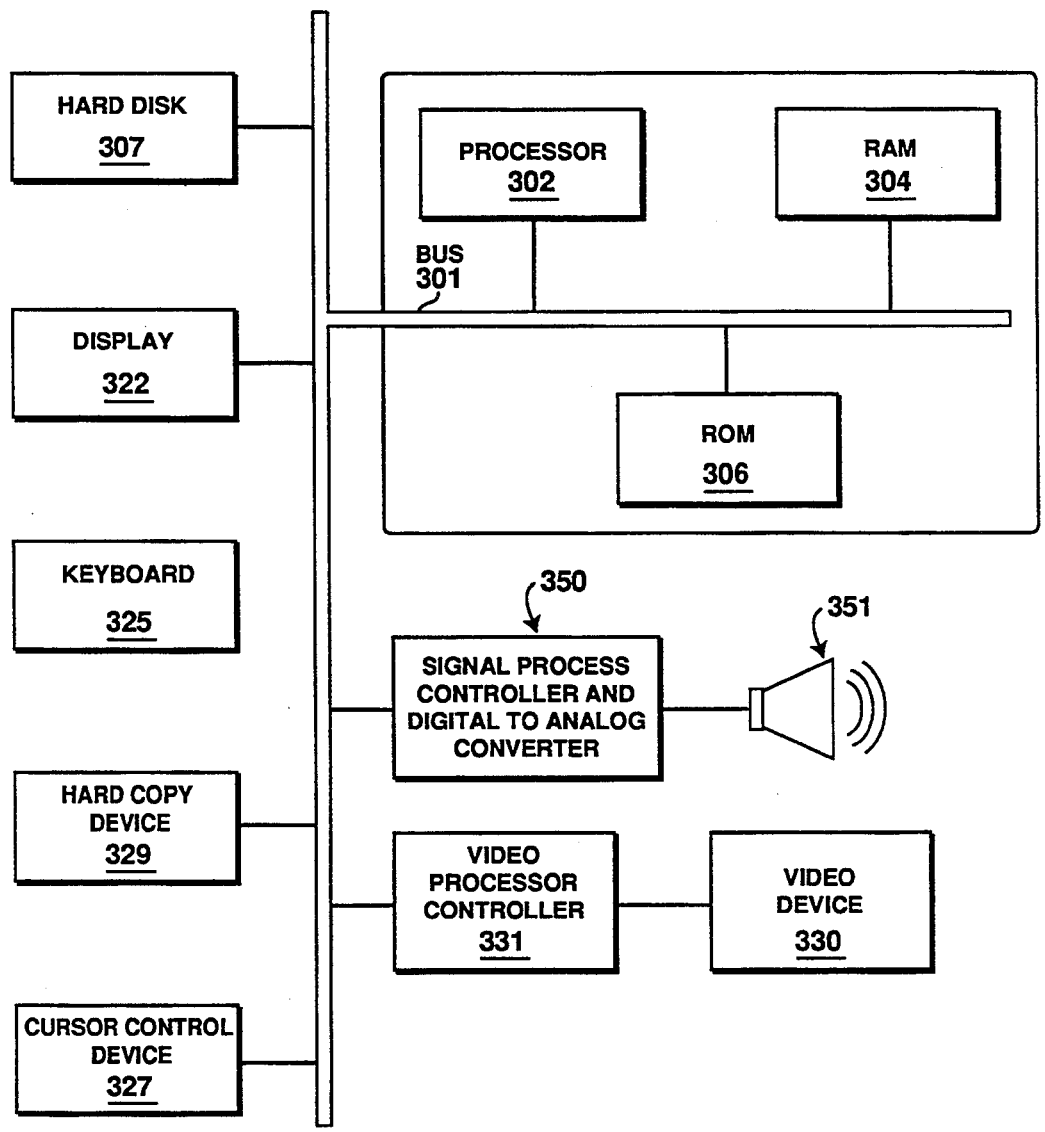
FIG. 3 illustrates a computer system as may be utilized by the preferred embodiment of the present invention.

It will be appreciated that the first and second audio streams as well as the audio transition template may be stored in memory means such as the hard disk 307 or the RAM 304 or the ROM 306 shown in FIG. 3. It will also be appreciated that the processor the 302 provides the processing means for computing the transition by combining, according to the selected templates, the designated portion of the first stream and the designated portion of the second stream which are to be used in the transition, and the processing means will control a sound generation means such as a speaker 351, which sound generation means is coupled to the bus 301 by well known signal processing controllers 350.

Figure 24:
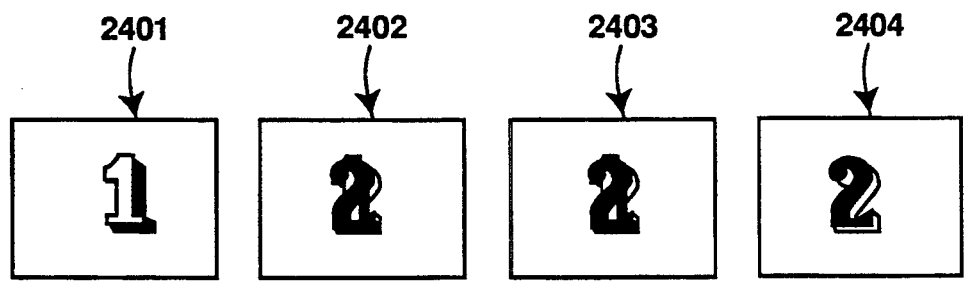
FIG. 24 shows samples, in various temporal states, of the preferred visual representation of the audio templates of the present invention.
Figure 25:
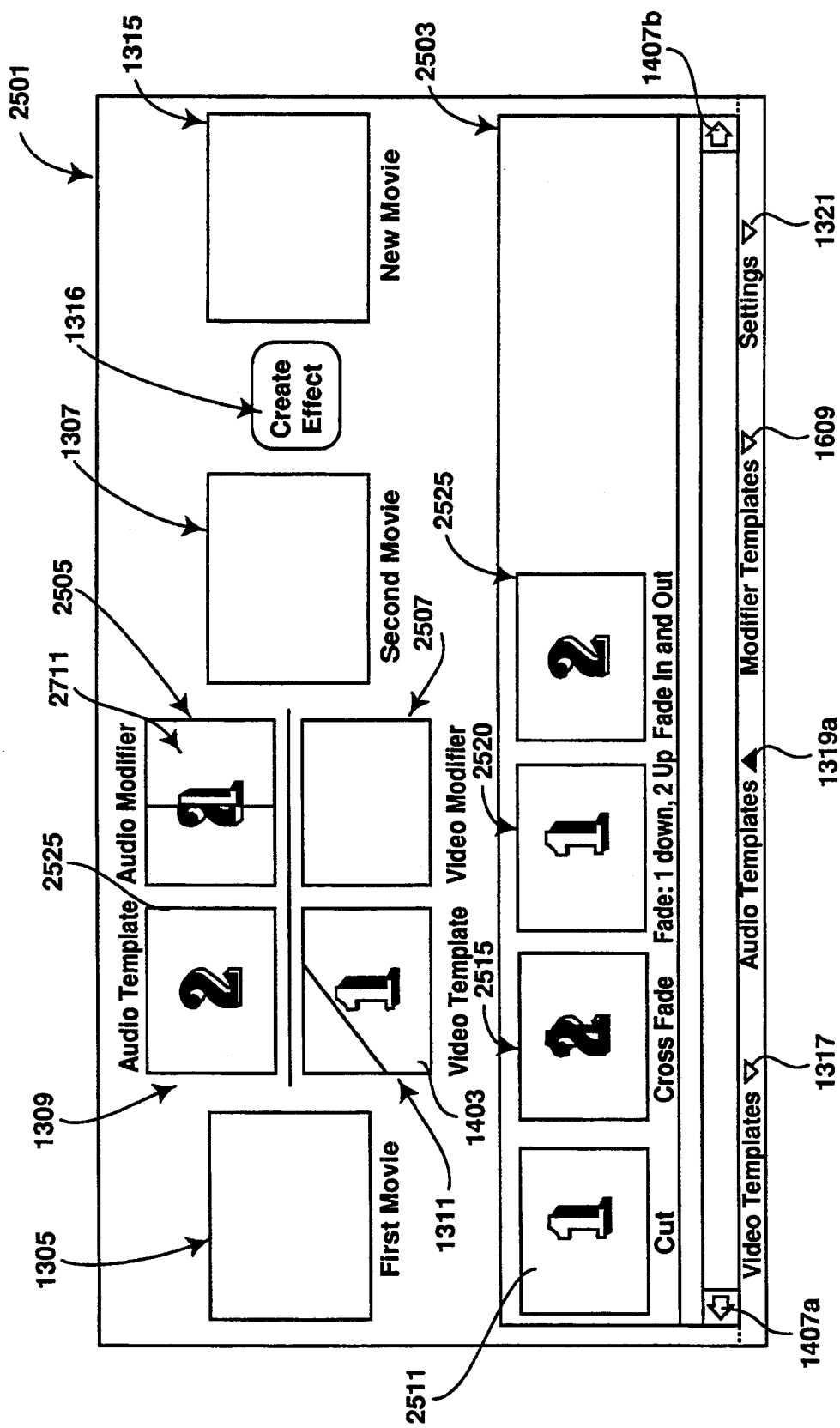
FIG. 25 shows the preferred visual representation of the audio templates of the present invention.

FIGS. 24 and 25 show examples of the preferred embodiment of the visual representations of various audio templates. These visual representations use various shades of colors (along with a "1" or a "2") to show the relative amounts of the first and second audio streams (this is shown in analogous from with grayscale in FIG. 24, where visual representation 2401 represents one extreme in color and visual representation 2404 represents another extreme in color). The colors change over time (during the transition) in order to reflect the different mixes over time of the two audio streams (FIG. 24 shows various states of an audio template's visual representation over time). Red is used in the preferred embodiment to represent the intensity (i.e. the percentage to use) of the first audio stream, and blue is used in the preferred embodiment to represent the intensity (the percentage to use) of the second audio stream. The intensity (saturation) of the red which is shown within the visual representation of the selected audio template is directly proportional to the percentage applied to the first audio stream in the manner described above in conjunction with FIGS. 15a, 15b and 15c. The intensity (saturation) of the blue which is shown within the visual representation of the selected audio template is directly proportional to the percentage applied to the second audio stream in the manner described above in conjunction with FIGS. 15a, 15b, and 15c. Other colors, or other combinations of colors, may be used instead of red and blue in order to convey the effect to the user and to be aesthetically pleasing.

Figure 21A:
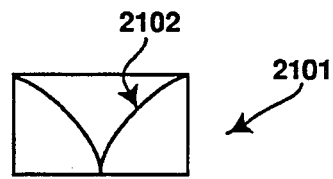
FIGS. 21a, 21b, 21c and 21d show four different rate transition templates.
Figure 21B:
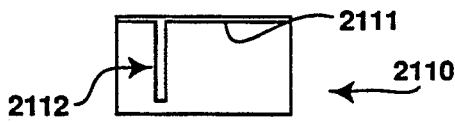
Figure 21C:
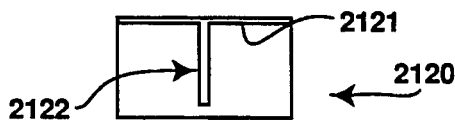
Figure 21D:
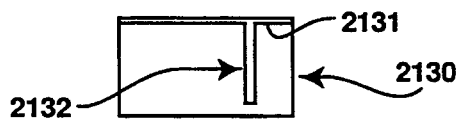
Figure 21F:
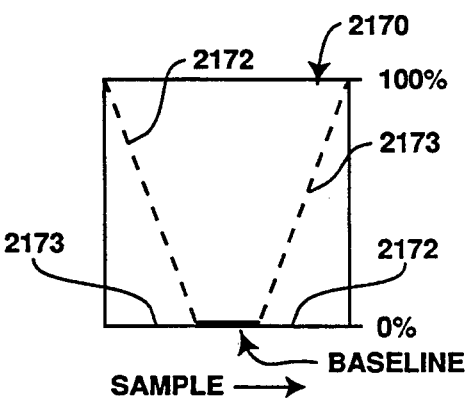
FIG. 21f shows the determining the audio percentages.

The actual graphs for determining the audio percentages are still those shown in FIGS. 15a, 15b, 15c and also FIG. 21f and these graphs, which correspond to the audio template resource, are used to also provide the intensity of the red and blue signals to an RGB display monitor to thereby indicate the colors of the visual representation of the audio template. In particular, the percentage determined on the "y" axis at each sample location is used to modify the audio signal and to modify the red and blue intensity values of the RGB values (green is set at zero), such that a y=0% value from the audio template for a sample in the first stream indicates a zero value (or otherwise minimum value) for the red of the RGB values while a y=100% value from the audio template for a sample in the first stream indicates a maximum red value. Similarly, a y=0% value from the audio template for a sample in the second stream indicates a zero value (or otherwise minimum value) for the blue of the RGB values while a y=100% value for the sample indicates a maximum blue value. It will be appreciated that in the center of a cross fade audio template (where first stream and second stream are both at 50%) then the red values will be one-half of maximum red and the blue value will be one-half of maximum blue which, using an RGB display, will produce a purple shade. If the audio template 2520 is selected (Fade 1 down and 2 up), a period of silence exists in the middle, where R and B will be zero (recall G=0) so that black will be displayed in the middle of the transition. Many ways of implementing this use of colors to visually represent an audio template will be apparent to those skilled in the art, including modifying the output of the commonly used color look-up tables found in typically RAMDAC's of video boards/cards of personal computers, which color look-up tables may be modified by software instructions to modify the output from a given pixel by (rather than modifying the pixel's RGB values in the frame buffer) modifying the output side of the color look-up table.

The appearance of the visual representations of these various audio templates will now be described by referring again to FIGS. 24 and 25. FIG. 25 shows four different audio templates in their static form within a audio template menu window 2503 which itself is within a transition window 2501. As before, a video template 1403 has been selected and placed within the video template window 1311 and the fade in and out audio template 2525 has been selected and placed within audio template window 1309. A video modifier window 2507 does not contain a video modifier, which is typically a rate transition template as described below, but the audio modifier window 2505 contains the visual representation of the steady rate transition 2711. Note that the four audio templates within menu window 2503 are in various states even though they are static. In particular, note that the cut template 2511 and the fade 1 down and 2 up template 2520 and the fade in and out template 2525 are in the beginning of the template's transition while the cross fade is nearing the end of its transition. The cut audio template's visual representation 2511 will begin in the most red state and remain in that state until passing the 50% point at which time the representation will dramatically change to the most intense (saturated) blue for the remainder of the transition. The cross fade's visual representation will begin with the most intense red which will then change over time to a reddish purple and then a bluish purple and finally to the most intense blue which will occur at the end of the cross fade transition. The visual representation 2520 of the down and up audio transition will begin with the most red proceeding to a lesser red and finally to a black which indicates silence and then to a lesser blue and finally the most saturated blue. The visual representation 2525 of the fade in and fade out template will begin with the most saturated blue and proceed to a purple and then to the most saturated red and then to a purple and finally back to the most intense blue.

In order to further assist the user in determining the effect of the audio template the numerals 1 and 2 may be displayed with the colors and these can be faded from the 1 to the 2 in accordance with the underlying graphical description of the audio template. In the same manner, the auditory representation of the audio template, which may be the two persons saying the numeral 1 and the numeral 2, may also be provided at the same time that the colors are changing during the transition. These three different feedbacks together make the whole greater than the sum of the parts in that the three different forms of feedback give the user a better feel for the behavior of the audio template than anyone of these components alone.

It is noted that a black and white/grey scale display may be used to provide the visual representation of the audio template where the black may represent the red and the white may represent the blue. However, this system has some problems with certain audio transitions, such as the 1 down and 2 up transition where silence occurs or where the sum of the first and second stream's percentages is less than a 100%.

Figure 17:
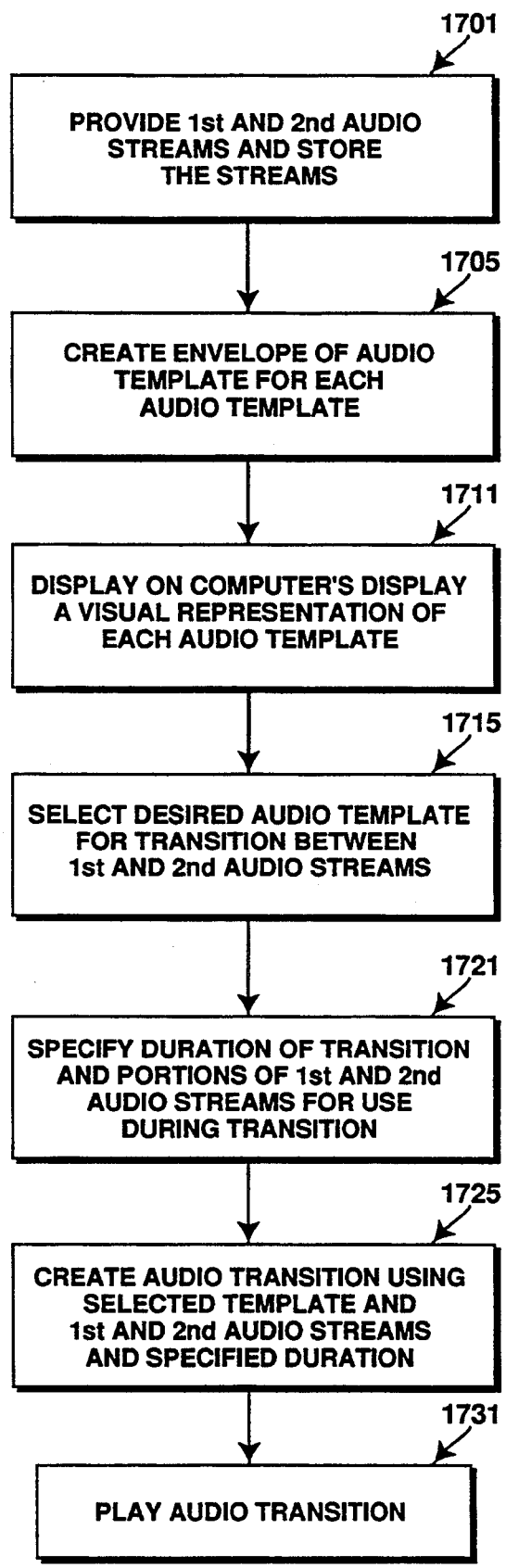
FIG. 17 shows a flow chart describing the method of the invention for producing an audio transition using audio templates.

The method of the present invention with respect to utilizing audio templates to create audio transitions between first and second streams of audio information will now be described by referring to FIG. 17. The method begins in step 1701 by providing a first and second audio stream and storing those streams. Then, in step 1705, an "envelope" which is descriptive of the audio template is created for each audio template. These "envelopes" have been described above, including the description which accompanies FIGS. 15a, 15b and 15c. The visual (iconic) representations of each of these audio templates or at least some of these audio templates are displayed on the computer's display means, such as a video display, in order to allow the user to see which audio templates are available for selection. As noted above, these audio templates are displayed in iconic and/or animated forms to suggest to the user their affect upon the transition. In step 1715, the user selects the desired audio template in the manner described above for transitioning between the first and second audio streams. The user also specifies the duration of the transition in step 1721 and specifies the portions of the first and second audio stream which are used during the transition. It is noted that step 1721 may occur before step 1715 and indeed many of the steps described in FIG. 17 may be taken in various sequences that are not necessarily dependent upon each other. In step 1725, the audio transition is created by using the selected template and by using the first and second audio streams in the specified duration in the manner described above. In step 1731, the user plays the audio transition which has been determined by the previous steps.

Figure 16:
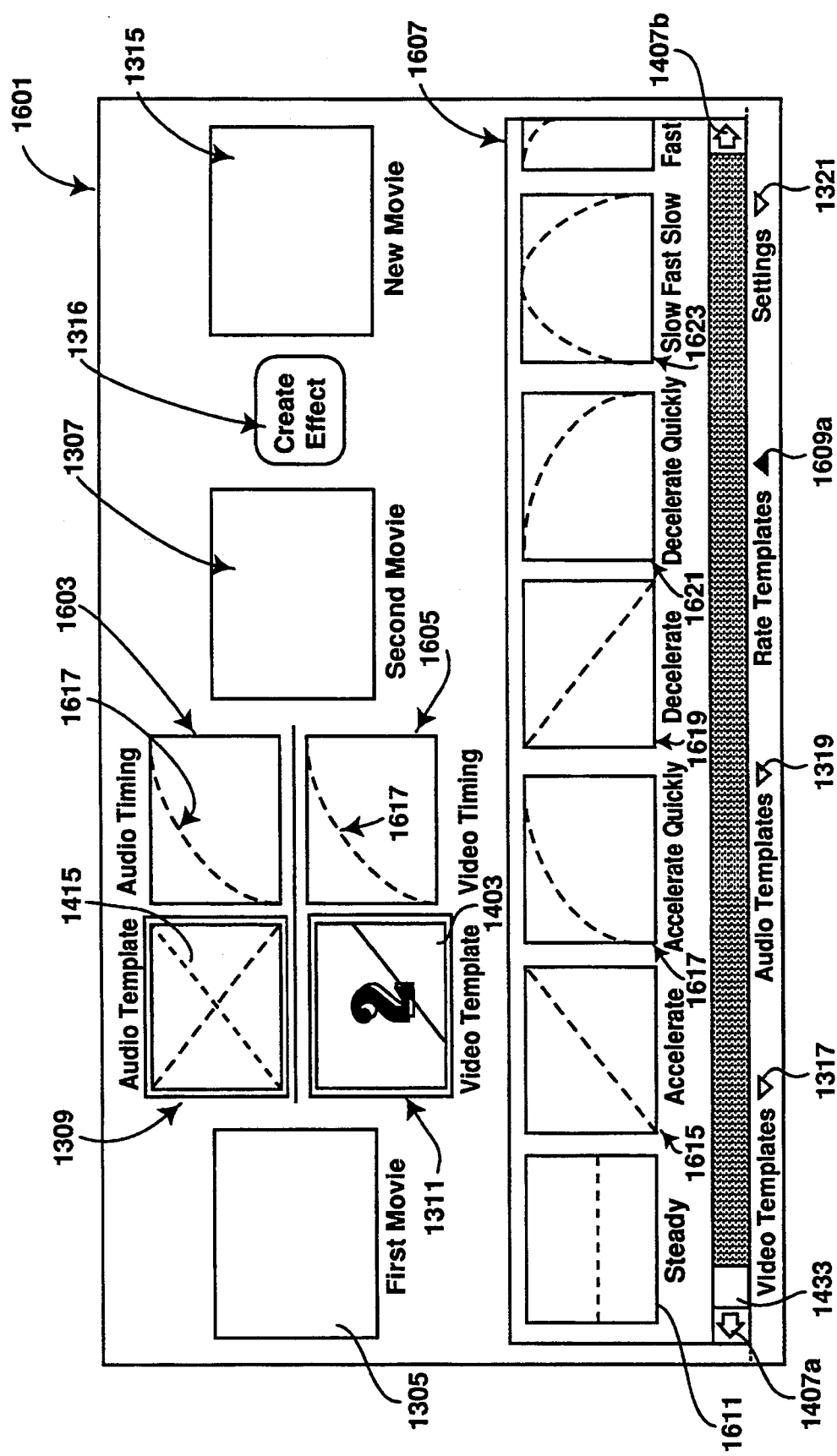
FIG. 16 shows a transition window containing representative rate transition templates.

The method and apparatus of the present for controlling the rate of transition between a first and a second sequence or stream of digital information will now be described. It should be noted that the dicon info box described above in conjunction with FIG. 7 does not provide an easy mechanism for modifying the rate of transition during a transition; while it allows the user to set the total duration of a transition, it does not provide the user with a convenient and suggestive mechanism for modifying the rate of transition during a transition and does not provide the user with easy access to a plurality of different "templates" which can regulate the rate of transition during a transition. FIG. 16 shows a plurality of rate transition templates in the rate transition template menu window 1607. In this case, the visual representations are essentially the same as the underlying graphical description which is used to determine the rate. In particular, six rate transition templates are shown in window 1607 and they are rate transition "steady" 1611, rate transition template "accelerate" 1615, rate transition template accelerate quickly 1617, rate transition template "decelerate" 1619, rate transition template "decelerate quickly" 1621, and rate transition template "slow fast slow" 1623. Other rate transition templates are shown in FIGS. 21a, 21b, 21c and 21d as well as an example in FIG. 21e of a preferred embodiment of the underlying graphical description of a rate transition template. The rate template menu window 1607 may be brought in view by selecting the rate template button 1609 to thereby activate it and to cause the appearance of the window 1607. A desired rate template may then be selected by dragging an iconic representation of the template, such as the iconic representation of the template steady which is shown as rate transition template 1611 in FIG. 16 to the video timing or the audio timing windows 1605 or 1603 respectively. Note that it is possible for the audio timing to be governed by a different rate transition template than the rate transition template which governs the video timing. This may be accomplished by selecting a different rate transition template for the video timing than for the audio timing. As shown in FIG. 16, the accelerate quickly rate template 1617 has been selected for both audio timing and video timing by positioning the cursor over the iconic representation of the accelerate quickly template 1617 and by dragging the iconic representation into the windows 1603 and 1605 (dragging refers to the prior art technique of positioning the cursor over an object and selecting the object by signalling the computer to select the object, usually by pressing the mouse button which controls the cursor, and by keeping the mouse button pressed down to thereby keep the object selected while moving the cursor which causes the object to move across the screen and appear to be "dragged").

The rate transition templates may be described in the same manner as the transition resources described above. For example, they may be described by key points along the curve with straight lines (or curved lines) connecting those key points each of those straight lines having known slopes. Alternatively, the rate templates may be described by equations which are stored in RAM or other storage means of the computer system and processed by the processing means. In each case, these rate transition templates are user modifiable by modifying parameters of the curves or modifying the key points along the curve. In the Macintosh computer system, available from Apple Computer, Inc. of Cupertino, Calif., a programmer may take advantage of the QuickDraw routines for describing curves by specifying the required data points and by specifying other parameters which indicate the curves according to the standards of programming under the well known QuickDraw subroutines of the Macintosh computer.

Figure 18:
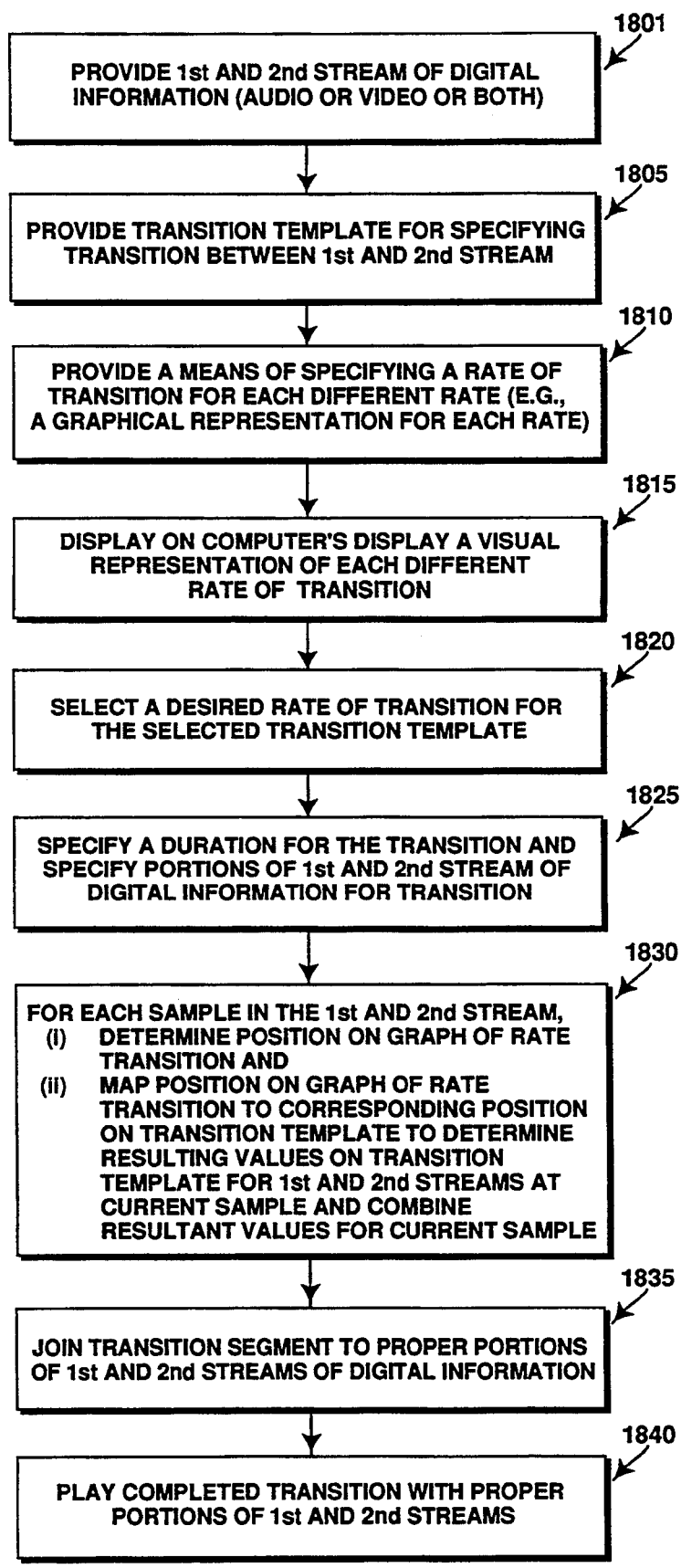
FIG. 18 shows a method of the invention for controlling the rate of transition of a transition by using rate transition templates.
Figure 27:
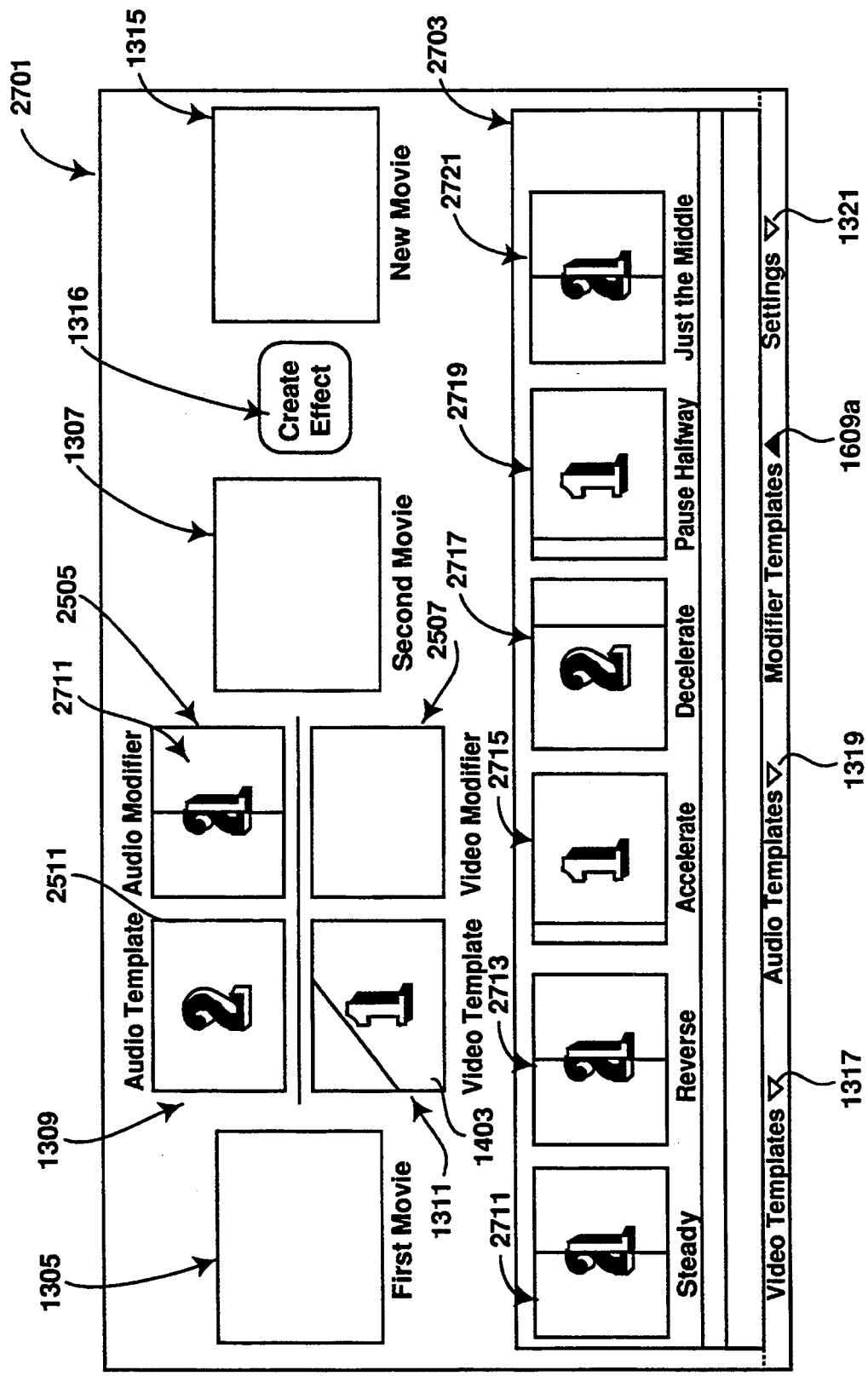
FIG. 27 shows various visual representations of rate transition templates, ("modifiers") according to the preferred embodiment.

The method of controlling the rate of transition between two streams will now be described by referring to FIG. 18. A first and a second stream of digital information is provided in step 1801. This information may be audio only or video only or both for either or both streams. In step 1805, a transition template of the type described above is provided, which template specifies the transition between the first and the second stream. This template may comprise an audio template in the case of a first and second stream of audio information and a video template in the case of a first and second stream of video information. In step 1810, a means of specifying a rate of transition for each different rate which a user may desire is then provided. This typically involves providing a resource containing the information for the rate transition control as well as a visual representation for each rate. In the preferred embodiment, graphs (e.g. the graphs of FIG. 28) are typically described in the resource of the rate transition template and a visual representation, such as those shown in FIG. 27, are also displayed on the computer's display. As shown in step 1815, at least a plurality of visual representations of different rate transitions are displayed, such as the various rate templates shown in FIG. 16. The user selects the desired rate of transition by selecting the appropriate iconic representation or animated representation associated with the rate transition template. In step 1825, the user specifies a duration for the transition and specifies which portions of the first and second stream will be used for the transition. Then in step 1830, the computer system determines the transition by mapping each sample location onto the graph of the rate transition and the corresponding position on that graph is then used to determine the resulting value from the transition template for the first and second streams at the current sample and these resultant values are combined for the current sample. This process is described in more detail below in conjunction with FIG. 19. After determining the resultant values in the transition, the resulting transition segment is joined to the proper portions of the first and second streams of digital information according to the manner specified by the user in the settings window shown in FIG. 20. In step 1840, the completed transition is played so that the user can observe the transition and determine whether or not it is desirable.

FIGS. 19a and 19b shows two streams of digital information, streams 1901 and 1902. A portion of each of these streams as been designated for use during the transition; specifically, the portion within the bars 1911 and 1912 for the stream 1901 will be used during the transition and the portion within the bars 1914 and 1915 within the stream 1902 will be used :for the transition. It will be appreciated that if a default mode is selected by activating button 2717 in FIG. 20, the portion used for the transition from the first stream will be the ending portion of the first stream (and thus the first stream will end at bar 1912) and the portion used in the second stream will be the beginning portion of the second stream (and thus the second stream will begin at bar 1914).

Three exemplarily samples from each of the two streams are shown in FIGS. 19a and 19b. These samples are labeled $a_1$ (1921), $b_1$ (1922), and $c_1$ (1923) for the first stream and $a_2$ (1925), $b_2$ (1926) and $c_2$ (1927) from the second stream. It will be appreciated that these streams may represent digital audio information as well as video information even though audio information is directly implied by FIGS. 19a and 19b. It will be appreciated that each sample in the case of video information will be a 2 dimensional pixel map which is a bit map of the image rather than a single value for the sample as shown in FIG. 19a and 19b. It will now be shown how the position of the sample during the transition maps to a particular position on the transition template thereby altering the rate of the transition. As shown in FIGS. 19a and 19b, samples $a_1$ and $a_2$ represent the second sample from each stream which is approximately 15% into the transition segment selected by the user; similarly, samples $b_1$ and $b_2$ represent the eighth sample for each of the two streams, and sample $c_1$ and $c_2$ represent an nth sample for both streams one and two. It is further assumed that b1 and c1, and of course b2 and c2, are 50% and 80% respectively through the transition segment of both streams.

Two rate transition templates 1903 and 1904 are shown in FIGS. 19c and 19d along with rate transition curves 1903a and 1904a. These curves may be determined by transition resources in the manner described above or in any other manner which would provide a way to map the position of the current sample to a modified location on the transition templates 1905 and 1906. As shown in FIGS. 19cand 19d, samples $a_1$ and $a_2$ fall on the X axis of the rate transition curves at 15% and this maps to a value of 20% in the manner described below which value of 20% is then used as the x input to the transition templates 1905 and 1906. As shown in FIGS. 19eand 19f, the value of 20% (as the x input to the templates 1905 and 1906) for the a1 and a2 samples results in a y value of 80% in the case of the transition template for the first stream shown in FIG. 19e and a value of 20% for the transition template for the second stream shown as curve 1958 in FIG. 19f. This means that the total value of the "a" sample of the transition is 80% of the function $Y_1$ at the $a_1$ input and 20% of the function $y_2$ at the $a_2$ input. It is understood that $Y_1(a_1)$ is the value of the audio stream at the $a_1$ sample. In a similar manner, the location of the sample b1 and b2 maps from the x coordinate of the rate transition curves to the y coordinate or to some other measure which then provides the x input to the transition template for the first and second streams and that x inputs specifies the resultant value at the given input. In the embodiment shown in FIGS. 19c and 19d, it is the area above and to the left of a given point on the rate transition curve which determines the x input to the transition template shown in FIGS. 19e and 19f. For example, the area above and to the left of point $a_1$ on the rate transition curve 1903a determines the x input to the transition template 1957 for the first stream at point $a_1$. Similarly, the area above and to the left of the rate transition curve 1903a at a given sample determines the x input value to the transition template for the given sample from the first stream given by the curve 1957. In a similar manner, the area above and to the left of the rate transition curve 1904a at any given point determines the x coordinate input value to the transition template for the second stream given by the transition template curve 1958. Alternatively, the area under the curve may be used to map the x input of the transition template, although slightly different results will be obtained. It will be apparent to those skilled in the art that many techniques are available for determining the are above and to the left at a given point on the rate transition curves; these techniques include numeric approximation as well as other techniques.

It can be seen that the total area of each of the rate transition boxes ("TA box") in FIG. 19 is 100×100 (=10,000 units squared); i.e., $TA_{box} = 100^2$. It will also be appreciated that the total area above each graph ("$TA_a$") is: $TA_{box}$-TAbelow, where TAbelow is the area below the graph, which is $$\int_0^{100} (fct)dx,$$

where (fct) is the function which specifies the curve of the graph. Thus, it can be seen that the area above and to the left of the rate graph at a given "x" ("areaAL(x)") is given by:

$$100x - \int_0^x (fct)dx,$$

where 100x represents the entire rectangular area with the box to the left of the given x. According to this embodiment of the invention, the area above and to the left (areaAL) is then used to map the current sample to the proper location on the transition template, such as template 1095. In other words, the areaAL for a given x of the current sample specifies (maps to) the X location on the transition template ("x of TT"). It can be seen from FIG. 19 that this mapping to the X location on the transition template is given by:

$$\chi \text{ of } TT = \left( \frac{\text{areaAL}(x)}{TAa} \right) 100.$$

Thus, the areaAL at $a_1$ (point 1931) on the rate transition curve 1903 of FIG. 19 maps to the 20% x location of point 1951 of the template curve 1905 of FIG. 19. Similarly, the areaAL at b1 (point 1932) on the rate transition curve 1903 maps to the 70% x location of point 1952 of the transition template 1905. This X location on the transition template is used to determine the corresponding "y" value from the transition template, as described above. For example, as shown on the template 1905 of FIG. 19, the X at 20% corresponds to the value of 80% of the "y" value of the template 1905, and the x at 70% of template 1905 corresponds to the value of 30% of the "y" value of the template 1905. Also as shown in FIG. 19, the X at 70% of the template 1906 corresponds to the value of 70% of the "y" value of the template 1906. The combined signals at 3 exemplary points of transition are:

$$a_{total} = 0.8Y_1(a_1) + 0.2Y_2(a_2)$$

$$b_{total} = 0.3Y_1(b_1) + 0.7Y_2(b_2)$$

$$c_{total} = 0.1Y_1(c_1) + 0.9Y_2(c_2)$$

Figure 21E:
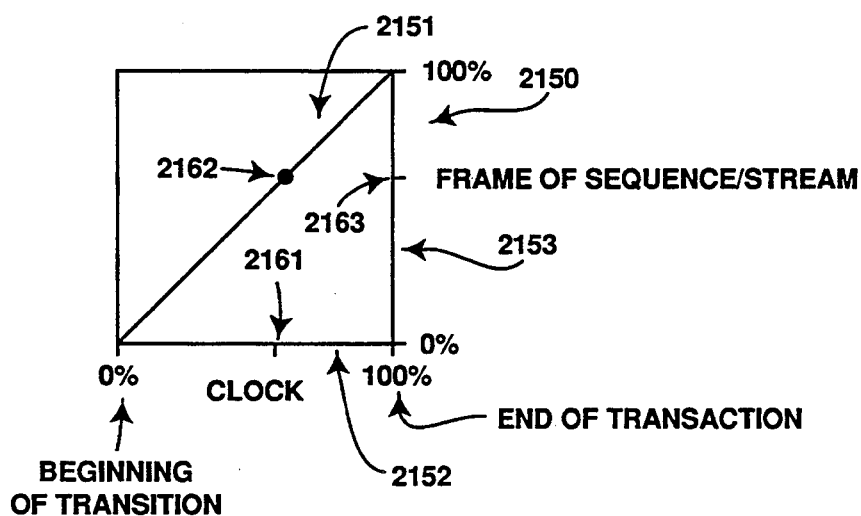
FIG. 21e shows an embodiment of a rate transition template represented in a graphical manner.

FIG. 21e shows a preferred implementation of a rate transition template where the x value represents the real clock time of the transition and the y value represents the frame number of the sample in the stream in the transition. The rate transition template 2151 represents a steady rate transition, and note that this transition template as shown in the manner of FIG. 21e presents a different suggestion to the user than the iconic representation of the steady rate transition template 1611 shown in FIG. 16.

Figure 26:
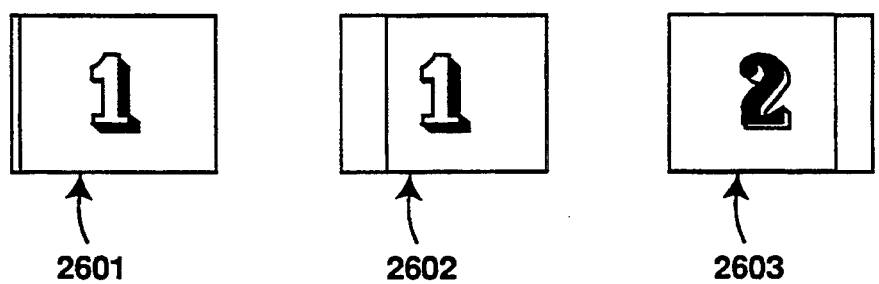
FIG. 26 shows samples, at various temporal states, of the preferred visual representation of the rate transition templates.
Figure 28:
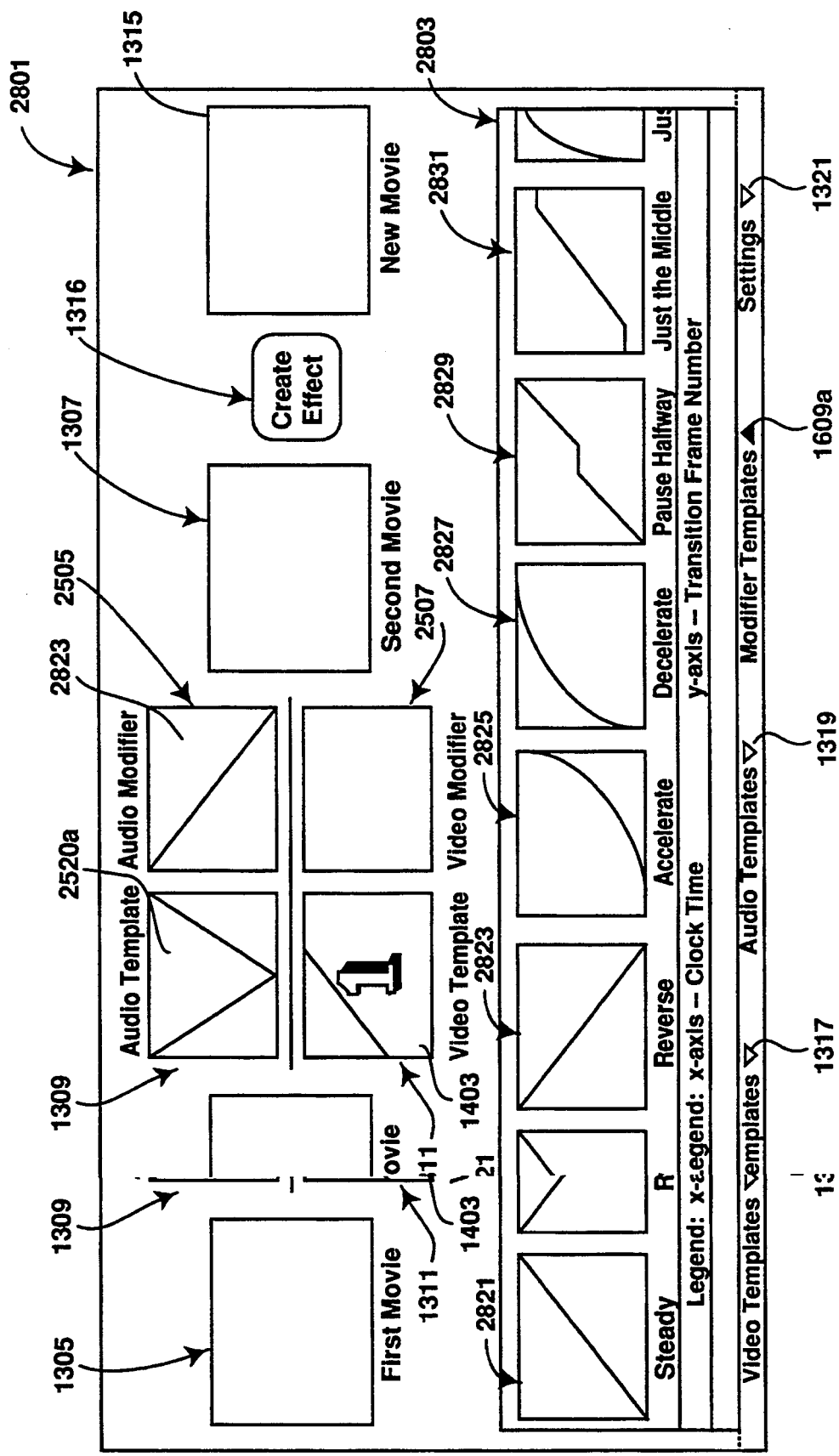
FIG. 28 shows the various preferred graphical descriptions for the rate transition templates of FIG. 27.

The preferred rate transition templates will now be described by referring to FIGS. 26, 27 and 28 as well as FIG. 21e. FIG. 27 shows the preferred visual representations of various typical rate transition templates in the rate transition template menu window 2703 although the preferred representations do not include the numerals "1" or "2". FIG. 8 shows various graphs which provide the graphical description of the various rate transition templates shown in FIG. 27. FIG. 26 shows three different visual representations of the same audio template taken at three different times during a transition.

The visual representations 2711, 2713, 2715, 2717, 2719, and 2721 for the steady rate transition, the reverse rate transition, the accelerate rate transition, the decelerate rate transition, the pause half way rate transition, and the just the middle rate transition respectively are shown in menu window 2703 of FIG. 27. Each of these may be selected in the manner described above by dragging the iconic representation from the menu window and placing it into either the audio modifier window 2505 or the video modifier window 2507. Underlying and associated with each of these visual representations is a rate transition resource which may be implemented in the manner described above such as a graph and indeed the resource may be considered a graph such as the graphs 2821, 2823, 2825, 2827, 2829, and 2831 for the steady, reverse, accelerate, decelerate, pause half way, and just the middle rate transitions shown in window 2803. The operation of the underlying graphical description of the rate transition template will be described after describing the user interface of the rate transition template which is shown in FIG. 27.

A simple wipe right video transition template is used and the rate of that template is modified according to the rate transition template which is selected. In other words, each visual representation within window 2703, such as visual representation 2711, is a simple wipe right video transition template modified by a rate transition template resource, such as the graphs shown in window 2803. For example, the representation 2711 (the steady transition) is a wipe right video template modified by the steady rate transition template 2821 of FIG. 28 (also shown in more detail in FIG. 21e). The wipe right transition has its rate modified by observing at each frame the y value of the rate transition graphical resource, which y value is dependent on the clock count within the transition, the clock count being on the "x" axis 2152. For example, as shown in FIG. 21e, at the clock count corresponding to location 2161 of FIG. 21e, the frame corresponding to the location 2163 of FIG. 21e is displayed within the transition at that clock count and the "x" value of the next clock count on axis 2152 determines the next frame number which is displayed. In other words, each succeeding clock count along the axis 2152 of FIG. 21e corresponds to a particular frame in the sequence of frames in the transitions, which in this case is the simple wipe right video transition. In effect, the position of the leading edge in the wipe right transition may be considered the y axis value at a given clock in FIG. 21e and the clock count during the transition, which is on the axis 2152, determines the position of the leading edge of the wipe right transition. In this manner, the particular rate transition resource, such as those shown within window 2803, modifies the video template (a wipe right) which is used as a visual representation of the rate transition templates shown in menu window 2703.

The visual appearance of these rate transitions may be tested by placing the selected transition in a test mode, which is described above and may be done by double clicking on the visual representation within window 2703.

The operation of some of the rate transition resources shown in FIG. 28 will be described in conjunction with the operation and appearance of the visual representations of these templates as shown in FIG. 27. The accelerate transition template 2825 will cause the wipe right transition to begin slowly such that a considerable amount of the transition's duration will pass and only a small portion of the black edge will have wiped to the right. This is shown in FIG. 26 where stage 2601 represents approximately 20% of the duration's time and stage 2602 represents approximately 65% of the duration's time. However, as the duration of the transition approaches its end the rate of transition quickly increases as shown by the resource 2825. In other words, near the end of the transition a movement of a few clocks along the x axis will result in the movement of many more frame numbers along the y axis causing the appearance of the wipe to move faster and faster as it approaches the end of the transition. In the pause half way transition 2829, the transition proceeds at a steady state until the middle at which time many clock counts on the x axis result in the same frame being shown since the y value is constant over the period of clock counts in the middle where the curve is flat and horizontal (slope=0). Note that the transition resource "just the middle" 2831 skips frames in the beginning and frames at the end of the transition and shows "just the middle" of the transition. Again, of course the rate transition curve (e.g. steady rate transition graph 2821) as described above modifies by a mapping operation the location of the current sample on the transition template which is used to cause the transition.

For example, the steady rate transition graph 2821 (also shown in FIG. 21e) uses the clock count (x axis) to determine the corresponding y value (based on the graph 2151 of the rate template resource). Thus, clock count 2161 "maps" to the frame at 2163. The y value (frame number) is then used as the "x" input to the transition template which then is used to determine the "y" value of the template to specify the actual location in the transition template at the current clock count of the transition. In this manner, the current clock count maps to an output (y) value of the rate transition resource (e.g. graph) which is then used to map to an input of the selected transition template, and the output of the transition template specifies the state of the transition effect at the current clock. This is similar to the mappings shown in FIG. 19.

Thus, a method and apparatus for defining and creating transitions between sequences of digital information is described. Utilizing a transition resource means which selects, maps and interpolates a transition resource data element to create a transition template, user definable transitions are achieved. A transition rate resource and an audio transition resource enhance the user definability of transitions by allowing direct and intuitive control of the rate of the transition during the transition and of the audio portion of the transition. Further, through the use of an interface that is familiar to users of computer systems, the learning curve to utilize the functionality of the present invention is minimized.

I claim:

1. In a computer controlled display system, a method for transitioning between a first stream of digital audio information and a second stream of digital audio information, said method comprising the steps of:
   providing said first stream and said second stream to said computer system;
   creating a means for modifying an audio signal during a transition from said first stream to said second stream said audio signal generated from at least one of said first stream and said second stream;
   specifying the duration of said transition and at least a portion of said first and said second streams for said transition;
   creating an audio transition using said means for modifying an audio signal and said portion of said first and said second streams.

2. A method as in claim 1 further comprising storing said first and said second streams and wherein said means for modifying an audio signal provides a first envelope for processing an audio signal to provide a first modification and a second envelope for processing an audio signal to provide a second modification and further comprising selecting one of said first and second envelopes according to a desired modification.

3. A method as in claim 2 further comprising providing a representation having at least one of a visual representation and an auditory representation and a temporal representation of said first envelope and said second envelope in a transition control window on a display coupled to said computer system and wherein said selecting step comprises positioning a cursor on said display over said one of said first and second envelope to select the modification desired.

4. A method as in claim 1 further comprising playing said audio transition and wherein said means for modifying an audio signal is an audio template which provides instructions for processing an audio signal and wherein said step of creating an audio transition comprises determining for each sample in said portion of said first stream a first resultant value based on said audio template and determining for each sample in said portion of said second stream a second resultant value based on said audio template and combining the resultant values for said portion of said first and said portion of said second stream of each sample.

5. A computer controlled display system for creating a transition between a first stream of digital audio information and a second stream of digital audio information, said system comprising:
- a first storage means for storing said first stream and said second stream;
- a second storage means for storing transition information specifying how to combine at least a portion of said first stream and at least a portion of said second stream for each transition;
- a processing means for combining said portion of said first stream and said portion of said second stream according to said transition information, said processing means being coupled to said first and said second storage means;
- a sound generation means to produce the sounds of the combination of said portion of said first stream and said portion of said second stream, said sound generation means being coupled to said processing means.

6. An apparatus as in claim 5 further comprising a means for specifying the duration of said transition, said means for specifying being coupled to said processing means, said second storage means storing transition information for a first modification to a first audio signal generated from said first stream and storing transition information for a second modification to a second audio signal generated from said second stream and further comprising a means for selecting one of said transition information for a first modification and said transition information for a second modification, said means for selecting being coupled to said processing means.

7. An apparatus as in claim 6 further comprising a display means coupled to said computer system, and wherein at least one of a visual representation and an auditory representation and a temporal representation of said first modification and at least one of a visual representation and an auditory representation and a temporal representation of said second modification are provided and wherein said means for selecting is used to select the desired modification by positioning a cursor on said display over said one of said first modification and said second modification.

8. An apparatus as in claim 7 wherein said processing means determines for each sample in said portion of said first stream a resultant value based on said desired modification and determines for each sample in said portion of second stream a resultant value based on said desired modification and combines the resultant values for said portion of said first and said portion of said second stream.

9. In a computer controlled display system, a method for controlling a rate of transition between a first sequence of digital information and a second sequence of digital information, said method comprising:
providing said first sequence and said second sequence to said computer system;
providing a rate transition control means for specifying said rate of transition during said transition;
specifying a duration of said transition and at least a portion of said first and said second sequences for said transition;
creating said transition using said rate transition control means and said portions of said first and said second sequences, wherein said rate transition control means includes a visual representation of said rate of transition over said duration of said transition.

10. A method as in claim 9 wherein a plurality of rate transition control means are provided, each of said plurality specifying a different rate of transition during said transition and further comprising selecting one of said plurality of rate transition control means to control the rate of said transition.

11. A method as in claim 10 wherein each of said rate transition control means includes a visual representation of the rate of transition during the duration of a transition controlled by said each of said rate transition control means and wherein at least some of said visual plurality of rate transition control means are displayed on a display device coupled to said computer system and said selecting step comprises positioning a cursor over the visual representation of the desired rate transition control means and signalling to said computer system to select said desired rate transition control means.

12. A method as in claim 10 wherein said first and said second sequence comprises digital audio information.

13. A method as in claim 10 wherein said first and said second sequence comprises digital video information for images.

14. A method as in claim 10 wherein said first sequence comprises digital audio information and/or digital video information for images and said second sequence comprises digital audio information and/or digital video information for images.

15. A method as in claim 10 further comprising providing a transition template for specifying the transition between said first sequence and said second sequence and wherein each of said rate transition control means includes a graphical description of said each of said rate transition control means, and wherein said transition is created by, for each sample in said first sequence and said second sequence, mapping the position of said each sample in the respective sequence to a position on said graphical descriptive of the selected rate transition control means to determine a corresponding position on said transition template.

16. A computer controlled display system for controlling a rate of transition between a first sequence of digital information and a second sequence of digital information, said system comprising:
- a first storage means for storing said first and said second sequence;
- a second storage means for storing rate transition control information for specifying said rate of transition during said transition, said rate transition control information including a visual representation of said rate of transition over a duration of said transition;
- a means for specifying said duration of said transition and at least a portion of said first and said second sequences for said transition;
- a processing means for combining at least said portions of said first sequence and said second sequence according to said rate transition control information, said processing means being coupled to said first and said second storage means and being coupled to said means for specifying said duration.

17. An apparatus as in claim 16 further comprising a transition template means for specifying the transition.

18. In a computer controlled display system, a method for controlling a rate of transition between a first sequence of digital information and a second sequence of digital information, said method comprising:

providing said first sequence and said second sequence to said computer system;

providing a rate transition control template for specifying said rate of transition during said transition;

specifying a duration of said transition and at least a portion of said first and said second sequences for said transition;

creating said transition using said rate transition control template and said portions of said first and said second sequences, wherein said rate transition control template includes a visual representation of said rate of transition over said duration of said transition.

* * * * *